(12) United States Patent
Munetsugu et al.

(10) Patent No.: US 7,877,676 B2
(45) Date of Patent: *Jan. 25, 2011

(54) DATA PROCESSING DEVICE AND METHOD FOR SELECTING MEDIA SEGMENTS ON THE BASIS OF A SCORE

(75) Inventors: Toshihiko Munetsugu, Osaka (JP); Minoru Etoh, Kanagawa (JP); Shoichi Araki, Osaka (JP); Koichi Emura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1083 days.

This patent is subject to a terminal disclaimer.

(21) Appl. No.: 11/483,461

(22) Filed: Jul. 10, 2006

(65) Prior Publication Data

US 2006/0253780 A1 Nov. 9, 2006

Related U.S. Application Data

(63) Continuation of application No. 09/785,063, filed on Feb. 16, 2001, now Pat. No. 7,134,074, which is a continuation-in-part of application No. 09/467,231, filed on Dec. 20, 1999, now Pat. No. 7,552,382.

(30) Foreign Application Priority Data

| Dec. 25, 1998 | (JP) | ................................. 10-371483 |
| Sep. 24, 1999 | (JP) | ................................. 11-271404 |
| Dec. 9, 1999 | (JP) | ................................. 11-350479 |
| Mar. 16, 2000 | (JP) | ............................. 2000-074875 |
| Jun. 23, 2000 | (JP) | ............................. 2000-190008 |

(51) Int. Cl.
*G06F 3/00* (2006.01)
*G06F 17/00* (2006.01)

(52) U.S. Cl. ..................... 715/204; 715/234; 715/273; 715/719; 715/723; 707/999.003; 707/E17.028

(58) Field of Classification Search ................. 715/200, 715/204, 205, 207, 234, 255, 256, 273, 713, 715/719, 723, 730, 732, 760, 853, 968, FOR. 211, 715/FOR. 223; 707/2, 3, 7, 100, 103 R, 200, 707/E17.013, E17.014, E17.015, E17.103, 707/E17.118, 602, 999.003, E17.028
See application file for complete search history.

(56) References Cited

U.S. PATENT DOCUMENTS 5,537,528 A * 7/1996 Takahashi et al. ........... 715/255

(Continued)

FOREIGN PATENT DOCUMENTS

EP 0597450 5/1994

(Continued)

OTHER PUBLICATIONS

English translation of Japanese Office action.

(Continued)

*Primary Examiner*—Laurie Ries
*Assistant Examiner*—Maikhanh Nguyen
(74) *Attorney, Agent, or Firm*—Pearne & Gordon LLP

(57) ABSTRACT

A context of media content is represented by context description data having a hierarchical stratum where the lowest hierarchical layer is formed from an element representing a segment of media content which corresponds to a change between scenes of video data or a change in audible tones. A score relating to the context is appended, as an attribute, to individual elements in the lowest hierarchical layer. In a selection step of a data processing method, the context of the media content is expressed, and one or a plurality of scenes of the media content is or are selected on the basis of the score of the context description data.

20 Claims, 78 Drawing Sheets

U.S. PATENT DOCUMENTS

| | | | |
|---|---|---|---|
| 5,664,227 A | 9/1997 | Mauldin et al. ............. 715/516 |
| 5,729,471 A | 3/1998 | Jain et al. .................. 725/131 |
| 5,818,439 A | 10/1998 | Nagasaka et al. |
| 5,872,865 A * | 2/1999 | Normile et al. ............. 382/224 |
| 5,889,746 A | 3/1999 | Moriyama et al. ....... 369/30.03 |
| 5,907,658 A | 5/1999 | Murase et al. |
| 6,031,859 A | 2/2000 | Nambu ........................ 372/50 |
| 6,032,156 A | 2/2000 | Marcus ................... 707/104.1 |
| 6,195,458 B1 * | 2/2001 | Warnick et al. ............. 382/173 |
| 6,219,837 B1 * | 4/2001 | Yeo et al. ...................... 725/38 |
| 6,266,053 B1 | 7/2001 | French et al. ............ 715/500.1 |
| 6,278,446 B1 * | 8/2001 | Liou et al. .................. 715/700 |
| 6,449,422 B1 | 9/2002 | Ebisawa |
| 6,526,215 B2 * | 2/2003 | Hirai et al. ..................... 386/52 |
| 6,535,639 B1 | 3/2003 | Uchihachi et al. ........... 382/225 |
| 6,771,875 B1 | 8/2004 | Kunieda et al. |
| 7,277,621 B2 | 10/2007 | Kunieda et al. |

FOREIGN PATENT DOCUMENTS

| | | |
|---|---|---|
| EP | 1 014 280 A2 | 6/2000 |
| EP | 1 246 070 A1 | 10/2002 |
| JP | 05-282379 A | 10/1993 |
| JP | 07-306866 A | 11/1995 |
| JP | 08255171 A | 1/1996 |
| JP | 08-110912 A | 4/1996 |
| JP | 08-292965 A | 11/1996 |
| JP | 09-081306 | 3/1997 |
| JP | 11/126205 | 5/1999 |
| JP | 11-126205 | 5/1999 |
| JP | 11-288424 A | 10/1999 |
| WO | 9707504 | 2/1997 |
| WO | 98/14895 | 4/1998 |
| WO | 9823089 | 5/1998 |
| WO | 01/27876 A1 | 4/2001 |

OTHER PUBLICATIONS

European Office Action Dated Jul. 31, 2007.
Japanese Office Action.
Shibata at al., "Video Indexing for the Broadcasting Media", NHK Giken R&D, Japan, Japan Broadcasting Co., Ltd., Aug. 1996, pp. 1-7.
Patent Abstracts of Japan, Ishikawa Hiroshi, "Multimedia Data Presentation System and Storage Medium Stored with Program Realizing It", Publication No. 11126205, Publication Date May 11, 1999, 1 page.
Peter van Beek, Ana B. Benitez, Joerg Heuer, Jose Martinez, Philippe Salembier, John Smith and Toby Walker, "International Organization for Standardization Organization Internationale Normalization ISO/IEC29/WG11 Coding of Moving Pictures and Radio", Mar. 2000, pp. 1-138.
Wilcox et al., "Annotation and segmentation for multimedia indexing and retrieval", Systems Science 1998, Jan. 9, 1998, pp. 259-266, vol. 2.
Ozsoyoglu et al., "Automating the assembly of presentations from multimedia database", Case Western Reserve University, IEEE Mar. 1996, pp. 539-601.

* cited by examiner

FIG. 8
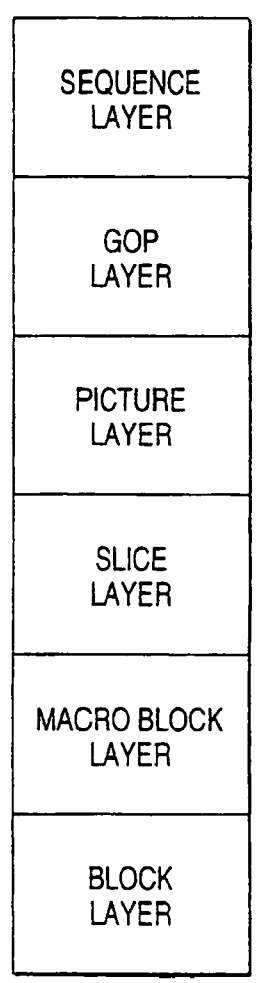
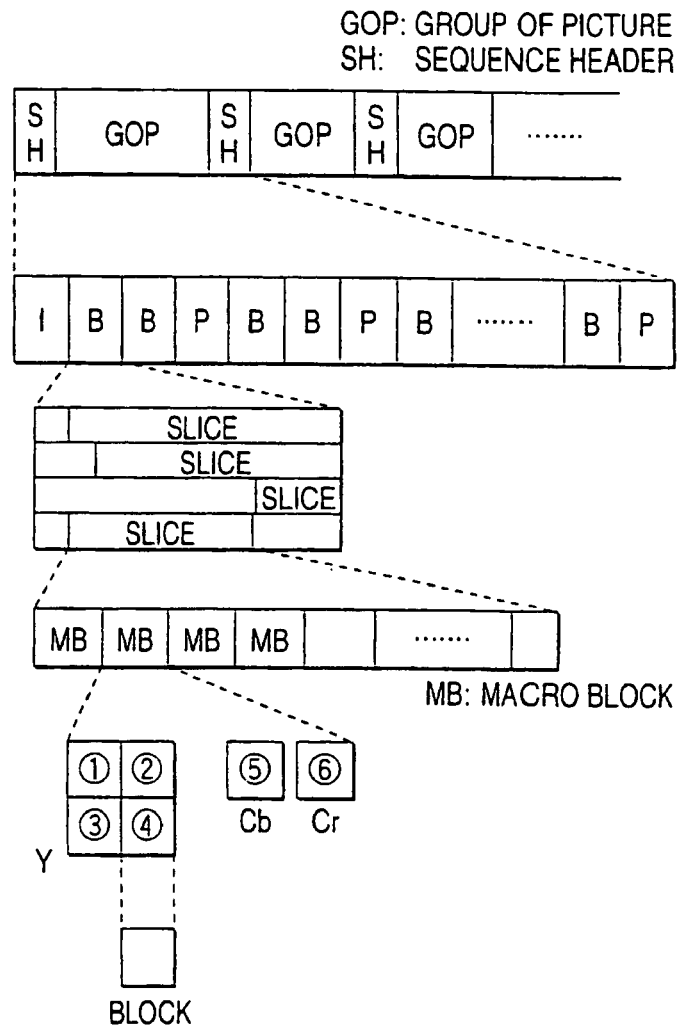

SINGLE FRAME
= (NUMBER OF FIXED SAMPLES) x BIT RATE/SAMPLING FREQUENCY (BIT)

FIG. 66

{ VIEW1, VIEW2, VIEW3, ⋯, VIEWn }

DATA PROCESSING DEVICE AND METHOD FOR SELECTING MEDIA SEGMENTS ON THE BASIS OF A SCORE

CROSS-REFERENCE TO RELATED APPLICATIONS

This application is a continuation of U.S. patent application Ser. No. 09/785,063 filed Feb. 16, 2001, now U.S. Pat. No. 7,134,074, which is a Continuation-in-Part of U.S. patent application Ser. No. 09/467,231 filed Dec. 20, 1999, now U.S. Pat. No. 7,552,382, the entire contents of which are incorporated herein by reference in their entirety.

The disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

REFERENCE TO COMPUTER PROGRAM LISTING

A computer program listing is included as an appendix to this disclosure in the form of two identical compact discs labeled COPY 1 and COPY 2 respectively, created on Oct. 4, 2004, in MS-Windows format, each containing the computer program modules as listed below, said modules in ASCII text format, with sizes and creation dates as listed below. This Computer Program Listing Appendix on CD ROM is incorporated by reference in its entirety.

| Filename | Size | Creation Date |
| --- | --- | --- |
| program01.dtd | 407 Bytes | Oct. 4, 2004 |
| program01.xml | 6,938 Bytes | Oct. 4, 2004 |
| program02.dtd | 407 Bytes | Oct. 4, 2004 |
| program02.xml | 14,360 Bytes | Oct. 4, 2004 |
| program03.dtd | 617 Bytes | Oct. 4, 2004 |
| program03.xml | 16,407 Bytes | Oct. 4, 2004 |
| program04.dtd | 657 Bytes | Oct. 4, 2004 |
| program04.xml | 24,131 Bytes | Oct. 4, 2004 |
| program05.dtd | 934 Bytes | Oct. 4, 2004 |
| program05.xml | 1,649 Bytes | Oct. 4, 2004 |
| program06.dtd | 505 Bytes | Oct. 4, 2004 |
| program06.xml | 411 Bytes | Oct. 4, 2004 |
| program07.dtd | 490 Bytes | Oct. 4, 2004 |
| program07.xml | 7,301 Bytes | Oct. 4, 2004 |
| program07.out | 396 Bytes | Oct. 4, 2004 |
| program07.res | 361 Bytes | Oct. 4, 2004 |
| program08.dtd | 559 Bytes | Oct. 4, 2004 |
| program08.xml | 14,819 Bytes | Oct. 4, 2004 |
| program09.dtd | 1,166 Bytes | Oct. 4, 2004 |
| program09.xml | 8,336 Bytes | Oct. 4, 2004 |
| program10.dtd | 654 Bytes | Oct. 4, 2004 |
| program10.xml | 36,460 Bytes | Oct. 4, 2004 |
| program11.dtd | 833 Bytes | Oct. 4, 2004 |
| program11.xml | 44,858 Bytes | Oct. 4, 2004 |
| program12.dtd | 561 Bytes | Oct. 4, 2004 |
| program12.xml | 33,320 Bytes | Oct. 4, 2004 |
| program13.dtd | 740 Bytes | Oct. 4, 2004 |
| program13.xml | 41,727 Bytes | Oct. 4, 2004 |

BACKGROUND OF THE INVENTION

The present invention relates to a media content data processing method, a storage medium, and a program, all being related to viewing, playback, and delivery of continuous audio-visual data (media content), such as a motion picture, a video program, or an audio program, wherein the synopsis or a highlight scene of media content or only a scene of media content desired by the audience is played back and delivered.

Conventional media content has conventionally been played back, delivered, or stored on the basis of individual files storing media content.

As described in Japanese Patent Laid-Open No. Hei-10-111872, according to a method of retrieving a specific scene of a motion picture, a change between scenes of the motion picture (hereinafter referred to as a "scene cut") is detected. To each scene cut are added additional data, such as a time code of the start frame, a time code of the end frame, and a keyword of the scene.

As an alternative method, Carnegie Mellon University (CMU) has attempted to summarize a motion picture by detecting scene cuts of a motion picture, detecting a human face or a caption, and detecting a key phrase through speech recognition.

When the motion picture is played back on a per-file basis, reviewing the synopsis of the motion picture has been impossible. Further, even when a highlight scene or scenes desired by the user are retrieved, the scene or scenes must be searched from the head of media content. Further, in the case of delivery of a motion picture, all the data sets of a file are transmitted, thus requiring a very long transmission time.

According to the method described in Japanese Patent Application Laid-Open No. Hei-10-111872, scenes can be retrieved through use of a keyword, thus facilitating retrieval of scenes desired by the user. The additional data do not include a relationship or connection between the scenes. For this reason, the method encounters difficulty in retrieving, e.g., one subplot of a story. Further, when retrieving scenes based on only a keyword, the user encounters difficulty in gaining awareness of which scenes are contextually important. Therefore, preparation of a synopsis or highlight scenes becomes difficult.

The method developed by CMU enables summarization of a motion picture. However, summarization results in a digest of a single, fixed pattern. For this reason, summarization of a motion picture into a digest which requires a different playback time; for example, a digest whose playback time assumes a length of three or five minutes, is difficult. Further, summarization of a motion picture desired by the user; such as selection of scenes including a specific character, is also difficult.

SUMMARY OF THE INVENTION

The object of the present invention is to provide means for selecting, playing back, and delivering only a synopsis, a highlight scene, or a scene desired by the audience, at the time of playback of media content.

Another object of the present invention is to provide means for playing back a synopsis, a highlight scene, or a scene desired by the audience within a period of time desired by the user, at the time of selection of the synopsis, the highlight scene, or the desired scene.

Still another object of the present invention is to provide means for delivering only a synopsis, a collection of highlight scenes, or a scene desired by the user, within a period of time desired by the user, at the request of the user during the delivery of media content.

Yet another object of the present invention is to provide means for controlling the amount of data to be delivered, in accordance with the traffic volume of a line through which the user establishes communication with a server.

To solve problems of the prior art, according to one aspect of the present invention, there is provided a data processing method comprising the steps of: inputting context description data described in a hierarchical structure, wherein the hierarchical structure comprises the highest hierarchical layer in which time-varying media content and the context of the media content are formed into a single element representing media content; the lowest hierarchical layer in which an element represents a media segment formed by dividing the media content and is assigned, as an attribute, time information relating to a corresponding media segment and a score; and other hierarchical layers include elements which are directly or indirectly associated with at least one of the media segments and which represent scenes or a set of scenes; and selecting at least one segment from the media content, on the basis of the score assigned to the context description data.

Preferably, the data processing method further comprises an extraction step for extracting only data corresponding to the segment selected by the selection step, from the media content.

Preferably, the data processing method further comprises a playback step for playing back only data corresponding to the segment selected by the selection step, from the media content.

Preferably, the score represents a contextual importance of media content.

Preferably, the score represents the degree of contextual importance of a scene of interest from the viewpoint of a keyword, and in the selection step there is selected a scene in which the score is used from at least one viewpoint.

Preferably, the media content corresponds video data or audio data.

Preferably, the media content corresponds to data comprising video data and audio data, which are mutually synchronized.

Preferably, the context description data describe the configuration of video data or audio data.

Preferably, the context description data describe the configuration of each of video data sets and audio data sets.

Preferably, in the selection step, a scene is selected by reference to context description data pertaining to video data or audio data.

Preferably, the selection step comprises a video selection step for selecting a scene of video data by reference to context description data of video data or an audio selection step for selecting a scene of audio data by reference to context description data of audio data.

Preferably, the selection step comprises a video the selection step for selecting a scene of video data by reference to context description data of video data, and an audio selection step for selecting a scene of audio data by reference to context description data of audio data.

Preferably, the data to be extracted in the extraction step correspond to video data or audio data.

Preferably, the data to be extracted in the extraction step correspond to data comprising video data and audio data, which are mutually synchronized.

Preferably, media content comprises a plurality of different media data sets within a single period of time. Further, the data processing method comprises a determination step of receiving structure description data having a data configuration of the media content described therein and determining which one of the media data sets is to be taken as an object of selection, on the basis of determination conditions to be used for determining data as an object of selection. Further, in the selection step, data are selected from only the data sets, which have been determined as objects of selection by the determination means, by reference to the structure description data.

Preferably, the data processing method further comprises: a determination for receiving structure description data having a data configuration of the media content described therein and determines whether only video data, only audio data, or both video data and audio data are taken as an object of selection, on the basis of determination conditions to be used for determining data as an object of selection. Further, in the selection step, data are selected from only the data sets determined as objects of selection by the determination step, by reference to the structure description data.

Preferably, media content comprises a plurality of different media data sets within a single period of time. Preferably, in the determination step, there are received structure description data having a data configuration of the media content described therein, and a determination is made as to which one of the video data sets and/or audio data sets is to be taken as an object of selection. Further, in the selection step, data are selected from only the data sets determined as objects of selection by the determination step, by reference to the structure description data.

Preferably, representative data pertaining to a corresponding media segment are added, as an attribute, to individual elements of context description data in the lowest hierarchical layer; and in the selection step, there are selected the entire data pertaining to the media segment and/or representative data pertaining to a corresponding media segment.

Preferably, the entire data pertaining to the media segment correspond to media data, and the media content comprises a plurality of different media data sets within a single period of time. Preferably, the data processing method further comprises a determination step for receiving structure description data having a data configuration of the media content described therein and determining which one of the media data sets and/or representative data sets is to be taken as an object of selection. Further, in the selection step, data are selected from only the data sets determined as objects of selection by the determination step, by reference to the structure description data.

Preferably, the data processing method further comprises: a determination step for receiving structure description data having a data configuration of the media content described therein and determining whether only the entire data pertaining to the media segment, only the representative data pertaining to the media segment, or both the entire data and the representative data pertaining to a corresponding media segment are to be taken as objects of selection, on the basis of determination conditions to be used for determining data as an object of selection. Further, in the selection step, data are selected from only the data sets determined as objects of selection by the determination means, by reference to the structure description data.

Preferably, the determination conditions comprise at least one of the capability of a receiving terminal, the traffic volume of a delivery line, a user request, and a user's taste, or a combination thereof.

Preferably, the data processing method further comprises a formation step for forming a stream of media content from the data extracted by the extraction step.

Preferably, the data processing method further comprises a delivery step for delivering the stream formed by the formation step over a line.

Preferably, the data processing method further comprises a recording step for recording the stream formed by the formation step on a data recording medium.

Preferably, the data processing method further comprises a data recording medium management step for re-organizing the media content that has already been stored and/or media content to be newly stored, according to the available disk space of the data recording medium.

Preferably, the data processing method further comprises a stored content management step for re-organizing the media content stored in the data recording medium according to the period of storage of the media content.

According to yet another aspect of the present invention, there is provided a computer-readable recording medium on which the previously-described data processing method is recorded in the form of a program to be performed by a computer.

According to still another aspect of the present invention, there is provided a program for causing a computer to perform the previously-described data processing method.

In the data processing method, the recording medium, and the program of the present invention, selection means (corresponding to a selection step) selects at least one segment from a media content on the basis of a score appended, as an attribute, to the lowest hierarchical layer or other hierarchical layers of context description data, through use of context description data of hierarchical stratum which comprises the highest hierarchical layer, the lowest hierarchical layer, and other hierarchical layers obtained by input means (corresponding to an input step).

Particularly, the extraction means (corresponding to the extraction step) extracts only the data pertaining to a segment selected by the selection means (corresponding to the selection step).

Particularly, the playback means (corresponding to the playback step) plays back only the data pertaining to the segment selected by the selection means (corresponding to the selection step) are played back.

Accordingly, a more important scene can be freely selected from the media content, and the thus-selected important segment can be extracted or played back. Further, the context description data assume a hierarchical stratum comprising the highest hierarchical layer, the lowest hierarchical layer, and other hierarchical layers. Scenes can be selected in arbitrary units, such as on a per-chapter basis or a per-section basis. There may be employed various selection formats, such as selection of a certain chapter and deletion of unnecessary paragraphs from the chapter.

In the data processing method, the recording medium, and the program of the present invention, a score represents the degree of contextual importance of media content. So long as the score is set so as to select important scenes, a collection of important scenes of a program, for example, can be readily prepared.

Further, so long as the score is set so as to represent the importance of a scene of interest from the viewpoint of keyword, segments can be selected with a high degree of freedom by determination of a keyword. For example, so long as a keyword is determined from a specific viewpoint, such as a character or an event, only the scenes desired by the user can be selected.

In the data processing method, the recording medium, and the program of the present invention, the media content corresponds to video data and/or audio data, and the context description data describe the configuration of respective video data sets and/or audio data sets. The video selection means (corresponding to the video the selection step) selects a scene by reference to the context description data pertaining to video data. The audio selection means (corresponding to the audio the selection step) selects a scene by reference to the context description data pertaining to audio data.

Further, the extraction means (corresponding to the extraction step) extracts video data and/or audio data.

An important segment can be selected from the video data and/or audio data, and video data and/or audio data pertaining to the thus-selected segment can be extracted.

In the data processing method, the recording medium, and the program of the present invention, in a case where media content comprises a plurality of different media data sets within a single period of time, the determination means (corresponding to the determination step) determines which of the media data sets is to be taken as an object of selection, on the basis of determination conditions to be used for determining data as an object of selection. The selection means (corresponding to the selection step) selects data set from only the data determined by the determination means (corresponding to the determination step).

The determination conditions comprise at least one of the capability of a receiving terminal, the traffic volume of a delivery line, a user request, and a user's taste, or a combination thereof. For instance, the capability of a receiving terminal corresponds to video display capability, audio playback capability, or a rate at which compressed data are to be decompressed. The traffic volume of a delivery line corresponds to the degree of congestion of a line.

In a case where media content is divided into; for example, channels and layers and different media data sets are assigned to the channels and layers, the determination means (corresponding to the determination step) can determine media data pertaining to an optimum segment according to determination conditions. Accordingly, the selection means (corresponding to the selection step) can select an appropriate amount of media data. In a case where channels and layers are employed as optimum segments, video data having a standard resolution may be assigned to a channel-1/layer-1 for transporting a motion picture, and video data having a high resolution may be assigned to a channel-1/layer-2. Further, stereophonic data may be assigned to a channel-1 for transporting sound data, and monophonic data may be assigned to a channel-2.

In the data processing method, the recording medium, and the program of the present invention, the determination means (corresponding to the determination step) determines whether only the video data, only the audio data, or both video and audio data are to be taken as an object of selection, on the basis of the determination conditions.

Before the selection means (corresponding to the selection step) selects a segment, the determination means (corresponding to the determination step) determines which one of the media data sets is to be taken as an object of selection or whether only the video data, only the audio data, or both video and audio data are to be taken as an object of selection. As a result, the time required by the selection means (corresponding to the selection step) for selecting a segment can be shortened.

In the data processing method, the recording medium, and the program of the present invention, representative data are appended, as an attribute, to individual elements of the context description data in the lowest hierarchical layer, and the selection means selects the entire data pertaining to a media segment and/or representative data pertaining to a corresponding media segment.

In the data processing method, the recording medium, and the program of the present invention, the entire data pertaining to a media segment correspond to media data, and the media content comprises a plurality of different media data sets within a single period of time. The determination means (corresponding to the determination step) determines which one of the media data sets and/or representative data are to be taken as objects of selection, on the basis of structure description data and determination conditions.

The media content is divided into; for example, channels and layers, and different media data sets are assigned to the channels and layers. The determination means can determine media data pertaining to an optimum segment (channel or layer) according to these determination conditions.

In the data processing method, the recording medium, and the program of the present invention, the determination means (corresponding to the determination step) determines whether only the entire data pertaining to a corresponding media segment, only the representative data pertaining to the corresponding media segment, or both the entire data and the representative data pertaining to the corresponding media segment are to be taken as objects of selection, on the basis of determination conditions.

Before the selection means (corresponding to the selection step) selects a segment, the determination means (corresponding to the determination step) determines which one of the media data sets is to be taken as an object of selection or whether only the entire data or only the representative data, or both the entire data and the representative data are to be taken as objects of selection. As a result, the time required by the selection means (corresponding to the selection step) for selecting a segment can be shortened.

In the data processing method, the recording medium, and the program of the present invention, formation means (corresponding to the formation step) forms a stream of media content from the data extracted by the extraction means (corresponding to the extraction step). Accordingly, a stream or file which describes a piece of content corresponding to the thus-selected segment can be prepared.

In the data processing method, the recording medium, and the program of the present invention, the delivery means (corresponding to the delivery step) delivers the stream formed by the formation means (corresponding to the formation step) over a line. Therefore, data pertaining to only important segments can be delivered to the user.

In the data processing method, the recording medium, and the program of the present invention, the data recording medium management means (corresponding to the data recording medium management step) re-organizes the media content that has been stored so far and/or media content to be newly stored, according to the available disk space of the data recording medium. Particularly, in the data processing method, the recording medium, and the program of the present invention, the stored content management means (corresponding to the stored content storage step) re-organizes the media content stored in the data recording medium according to the period of storage of the content. Therefore, a larger amount of media content can be stored in the data recording medium.

BRIEF DESCRIPTION OF THE DRAWINGS

FIG. 8 is a schematic representation showing the configuration of an MPEG-1 video stream;

FIG. 66 is an illustration showing a viewpoint employed in the eleventh embodiment;

FIG. 67 is an illustration showing the degree of importance according to the eleventh embodiment;

DETAILED DESCRIPTION OF THE PREFERRED EMBODIMENTS

Embodiments of the present invention will be described hereinbelow by reference to the accompanying drawings.

First Embodiment

A first embodiment of the present invention will now be described. In the present embodiment, a motion picture of MPEG-1 system stream is taken as media content. In this case, a media segment corresponds to a single scene cut, and a score represents the objective degree of contextual importance of a scene of interest.

Figure 1:
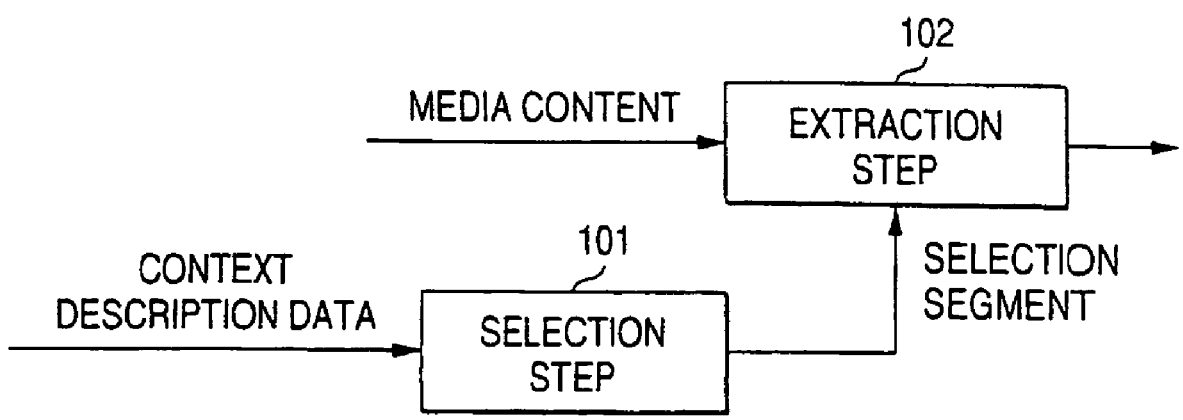
FIG. 1 is a block diagram showing a data processing method according to a first embodiment of the present invention.

FIG. 1 is a block diagram showing a data processing method according to the first embodiment of the present invention. In FIG. 1, reference numeral 101 designates the selection step; and 102 designates an extraction step. In the selection step 101, a scene of media content is selected from context description data, and the start time and the end time of the scene are output. In the extraction step 102, data pertaining to a segment of media content defined by the start time and the end time output in the selection step 101 are extracted.

Figure 2:
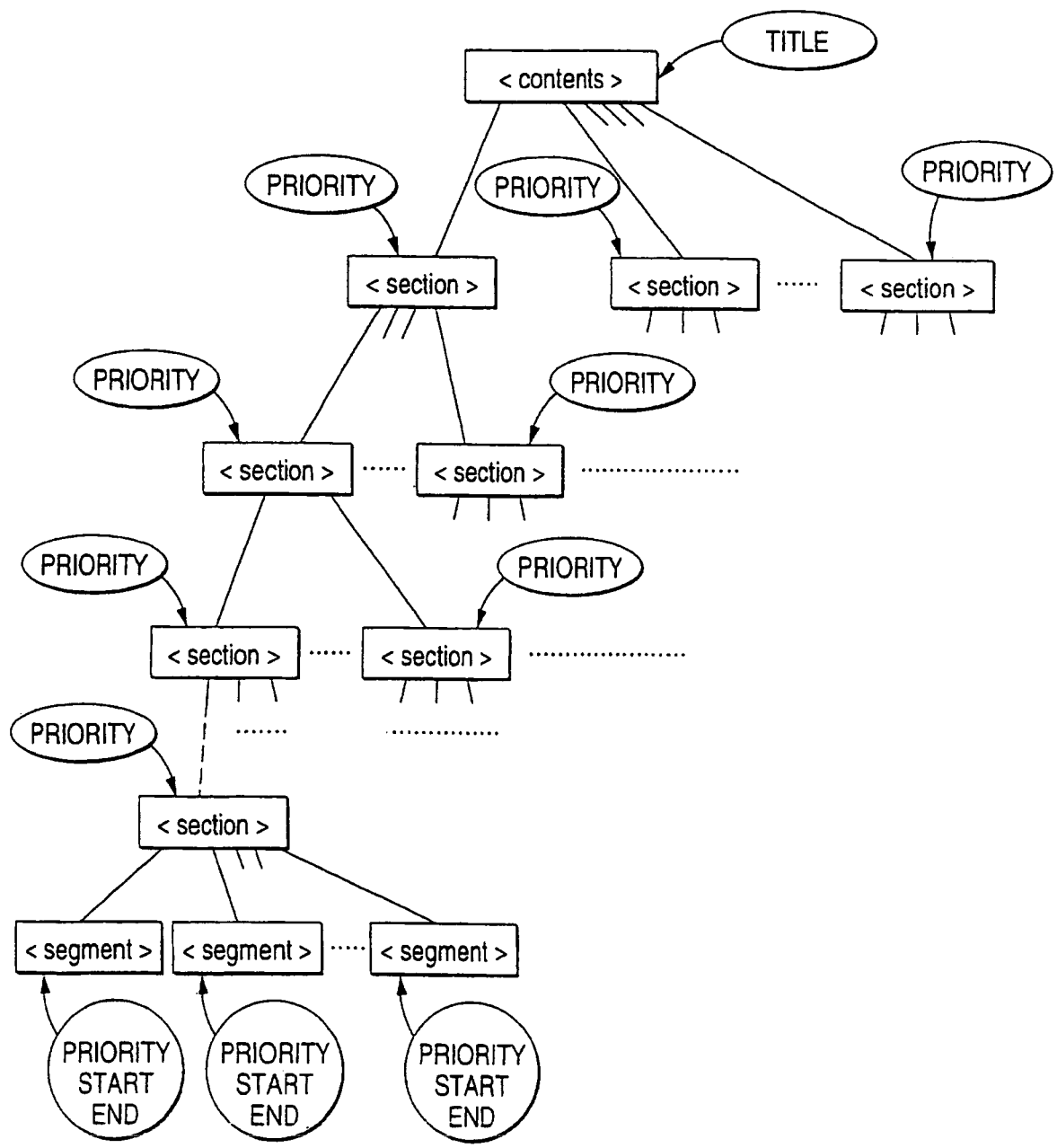
FIG. 2 is a diagram showing the structure of context description data according to the first embodiment.

FIG. 2 shows the configuration of the context description data according to the first embodiment. In the present embodiment, the context is described according to a tree structure. Elements within the tree structure are arranged in chronological sequence from left to right. In FIG. 2, the root of the tree designated <contents> represents a single portion of content, and the title of the content is assigned to the root as an attribute.

Children of <program> are designated by <section>. Priority representing the degree of contextual importance of a scene of interest is appended to the element <section> as an attribute. The degree of importance assumes an integral value ranging from 1 to 5, where 1 designates the least degree of importance and 5 designates the greatest degree of importance.

Children of <section> are designated by <section> or <segment>. Here, an element <section> per se can be taken as a child of another child <section>. However, a single element <section> cannot have a mixture of children <section> and children <segment>.

An element <segment> represents a single scene cut and is assigned a priority identical with that assigned to its parent <section>. Attributes appended to <segment> are "start" representing the start time and "end" representing the end time. Scenes may be cut through use of commercially-available software or software available over a network. Alternatively, scenes may be cut manually. Although in the present embodiment time information is expressed in terms of the start time and the end time of a scene cut, a similar result is realized when time information is expressed in terms of the start time of the scene of interest and the duration of the scene of interest. In this case, the end time of the scene of interest is obtained by addition of the duration to the start time.

In the case of a story such as a movie, chapters, sections, and paragraphs of the story can be described on the basis of the context description data, through use of elements <section> within a multilayer hierarchical stratum. In another example, when a baseball game is described, elements <section> in the highest hierarchical level may be used for describing innings, and their children <section> may be used for describing half innings. Further, second-generation descendant <section> of the elements <section> may be used for describing at-bats of respective batters, and third-generation descendant <section> of the elements <section> are also used for describing each pitch, a time period between pitches, and batting results.

The context description data having such a configuration may be expressed in a computer through use of, e.g., Extensible Markup Language (XML). XML is a data description language whose standardization is pursued by the World Wide Web Consortium. Recommendations Ver. 1.0 were submitted on Feb. 10, 1998. Specifications of XML Ver. 1.0 can be acquired from www.w3.org/TR/1998/REC-xml-19980210. The computer program listing appendix includes sample programs containing examples of Document Type Definition (DTD) and XML files. Each program consists of two modules, a DTD file and a XML file, named respectively. For example, programX (where "X" is a number) contains modules programX.dtd and programX.xml. Program 01 shows one example of Document Type Definition (DTD) used for describing the context description data according to the present embodiment through use of XML, and one example of context description data described through use of DTD. Program 03 shows one example of context description data prepared by addition of representative data (dominant-data) of a media segment, such as a representative image (i.e., video data) and a keyword (audio data), to the context description data shown in Program 01, and a DTD used for describing the context description data through use of XML.

Figure 3:
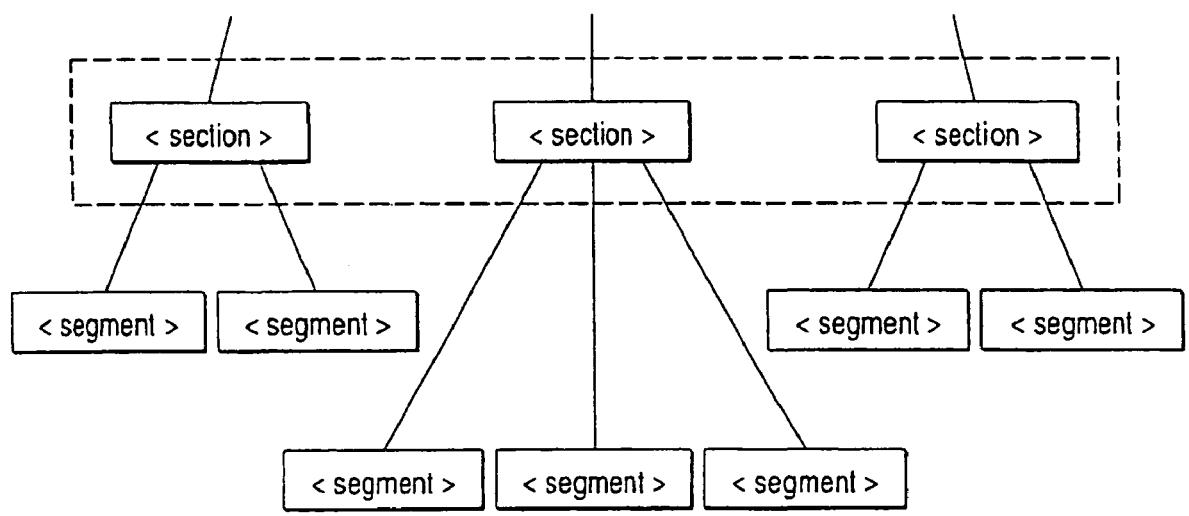
FIG. 3 is a descriptive view for describing a method of assigning the degree of importance according to the first embodiment.
Figure 4:
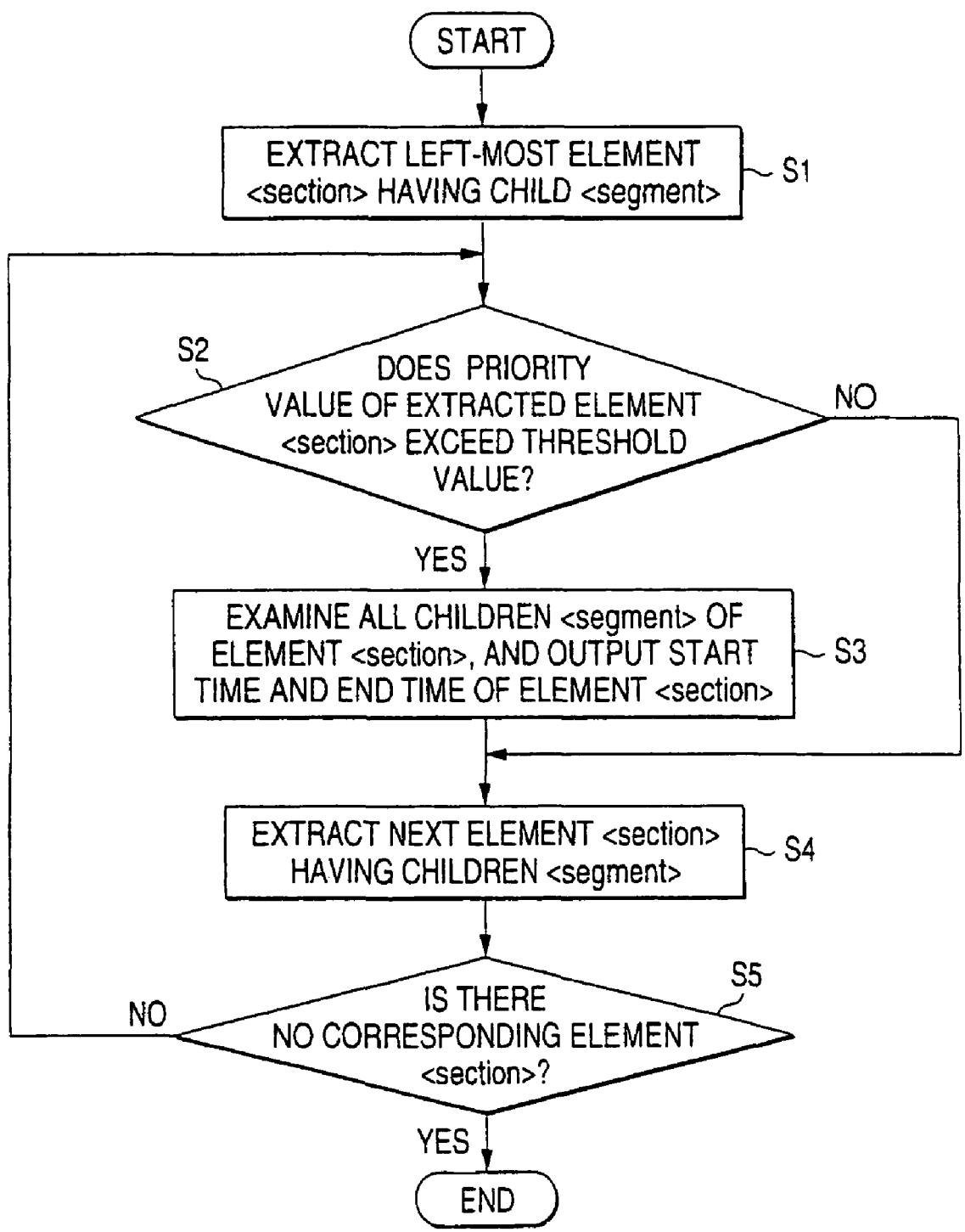
FIG. 4 is a flowchart showing processing relating to the selection step according to the first embodiment.

Processing relating to the selection step 101 will now be described. Processing pertaining to the selection step 101 closely relates to the format of context description data and a method of assigning a score to contents of a context of each scene. In the present embodiment, processing pertaining to the selection step 101 is effected by focusing on only elements <section> having children <segment>, as shown in FIG. 3 (steps S1, S4, and S5 shown in FIG. 4). An element <section> whose priority exceeds a certain threshold value is selected (step S2 shown in FIG. 4), and the start time and end time of the thus-selected element <section> are output (step S3 shown in FIG. 4). The priority assigned to the element <section> having children <segment> corresponds to the degree of importance shared among all the elements <section>, each of which has children <segment>, within the content. More specifically, the degree of importance shared among the elements <section> enclosed by a dotted line shown in FIG. 3 is set as priority. Priority assigned to elements <section> and <segment> other than the foregoing elements <section> is set arbitrarily. The degree of importance are not necessarily set so as to assume unique values, and the same degree of importance may be assigned to different elements. FIG. 4 is a flowchart showing processing relating to the selection step 101 according to the first embodiment. With regard to the thus-selected element <section>, the start time and end time of scene expressed by the element <section> are determined from elements <segment>, which are children of the thus-selected element <section>. The thus-determined start time and end time are output.

Although in the present embodiment selection is effected by focusing on the elements <section>, each of which has children <segment>, selection may be effected by focusing on elements <segment>. In this case, priority corresponds to the degree of importance shared among all the elements <segment> within the content. Alternatively, selection may be effected by focusing on elements <section> of the same hierarchical level from among the elements <section> of higher hierarchical levels having no children <segment>. More specifically, selection may be effected by focusing on the elements <section> in the same path number, which is counted from a given parent <contents> or a given child <segment>.

Figure 5:
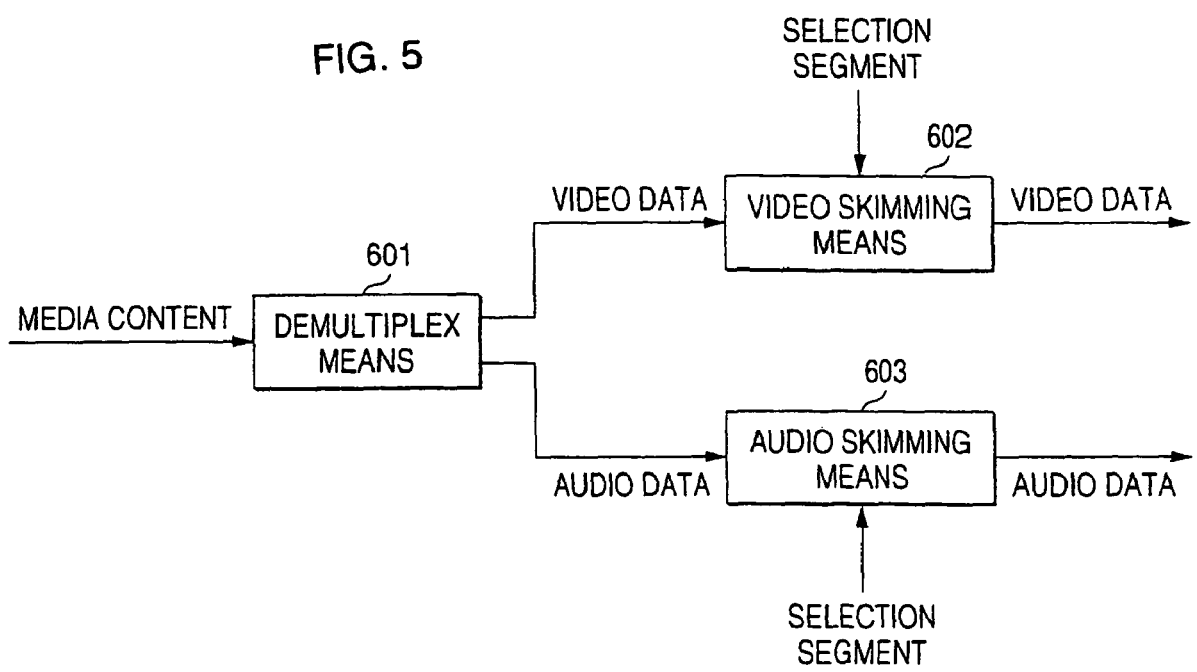
FIG. 5 is a block diagram showing the configuration of the extraction step according to the first embodiment.

Processing relating to the extraction step 102 will now be described by reference to FIG. 5. FIG. 5 is a block diagram showing the extraction step 102 according to the first embodiment. As shown in FIG. 5, the extraction step 102 according to the first embodiment is realized by demultiplex means 601, video skimming means 602, and audio skimming means 603. In the present embodiment, an MPEG-1 system stream is taken as media content. The MPEG-1 system stream is formed by multiplexing a video stream and an audio stream into a single stream. The demultiplex means 601 separates the video stream and the audio stream from the multiplexed system stream. The video skimming means 602 receives the thus-separated video stream and a segment selected in the selection step 101, and from the received video stream outputs only data pertaining to the thus-selected segment. The audio skimming means 603 receives the separated audio stream and the segment selected in the selection step 101, and from the received audio stream outputs only data pertaining to the selected segment.

Figure 6:
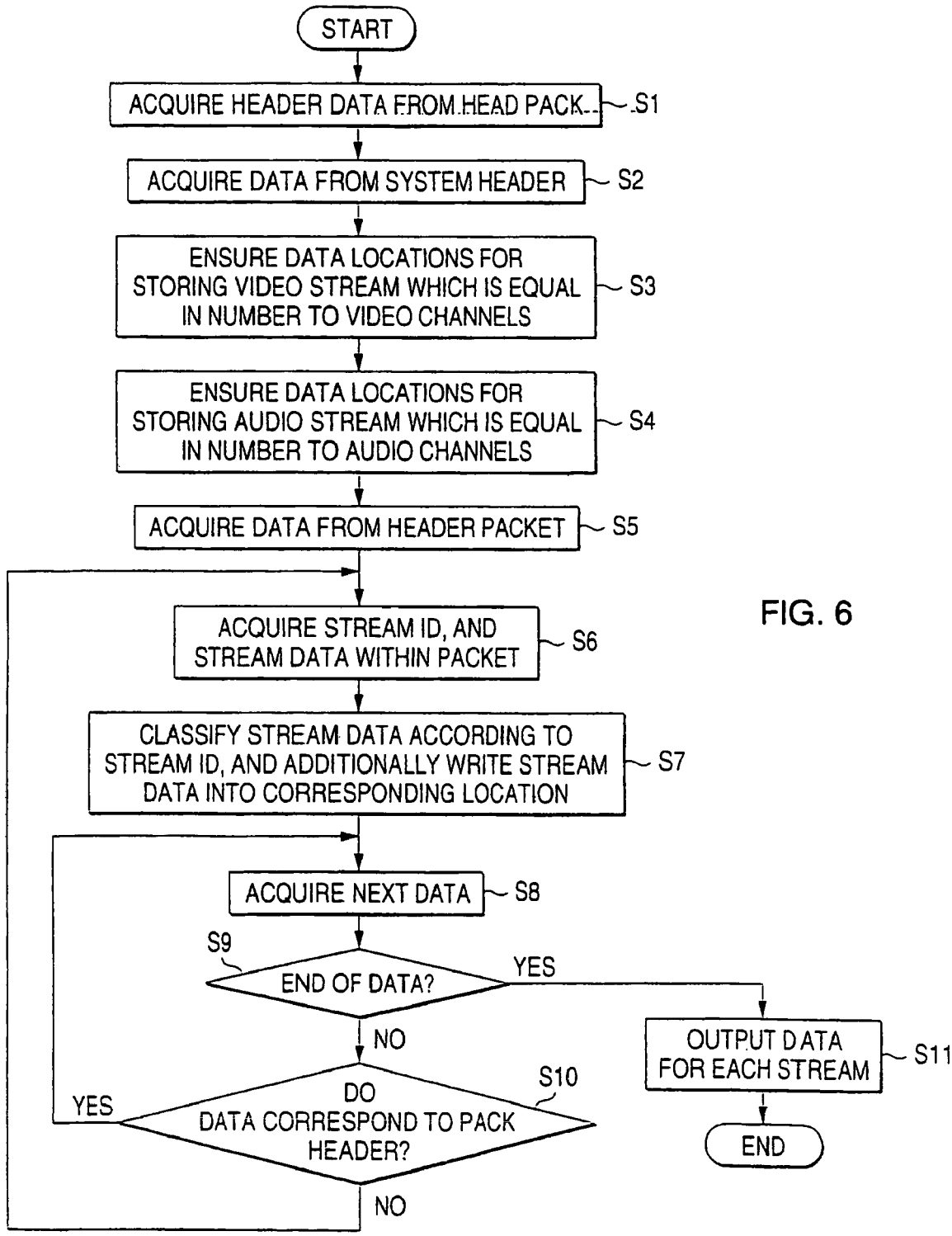
FIG. 6 is a flowchart showing processing effected by demultiplexd means in the extraction step according to the first embodiment.

The processing performed by the demultiplex means 601 will now be described by reference to the accompanying drawings. FIG. 6 is a flowchart relating to processing effected by the demultiplex means 610. The method of multiplexing the MPEG-1 system stream is standardized under International Standard ISO/IEC IS 11172-1. A video stream and an audio stream are multiplexed into packets by means of dividing the video and audio streams into streams of appropriate length called packets and by appending additional information, such as a header, to each of the packets. A plurality of video streams and a plurality of audio streams may also be multiplexed into a single signal in the same manner. In the header of each packet, there are described a stream ID for identifying a packet as a video stream or an audio stream, and a time stamp for bringing video data into synchronization with audio data. The stream ID is not limited to use for identifying a packet as a video stream or an audio stream. When a plurality of video streams are multiplexed, the stream ID can be used for identifying, from a plurality of video streams, the video stream to which a packet of interest belongs. Similarly, when a plurality of audio streams are multiplexed, the stream ID can be used for identifying, from a plurality of audio streams, the audio stream which a packet of interest belongs. In the MPEG-1 system, a plurality of packets are bundled into a single pack, and to the pack is appended, as a header, a multiplex rate and additional information for use as a reference time used for effecting synchronous playback. Further, additional information relating to the number of multiplexed video and audio streams is appended, as a system header, to the head pack. The demultiplex means 601 reads the number of multiplexed video and audio streams from the system header of the head pack (S1 and S2) and ensures data locations for storing data sets of the respective streams (S3 and S4). Subsequently, the demultiplex means 601 examines the stream ID of each of the packets and writes the data included in the packet into the data location where the stream specified by the stream ID is stored (S5 and S6). All the packets are subjected to the foregoing processing (S8, S9, and S10). After all the packets have been subjected to the processing, the video streams are output to the video skimming means 602 on a per-stream basis, and the audio streams are output to the audio skimming means 603 in the same manner (S11).

Figure 7:
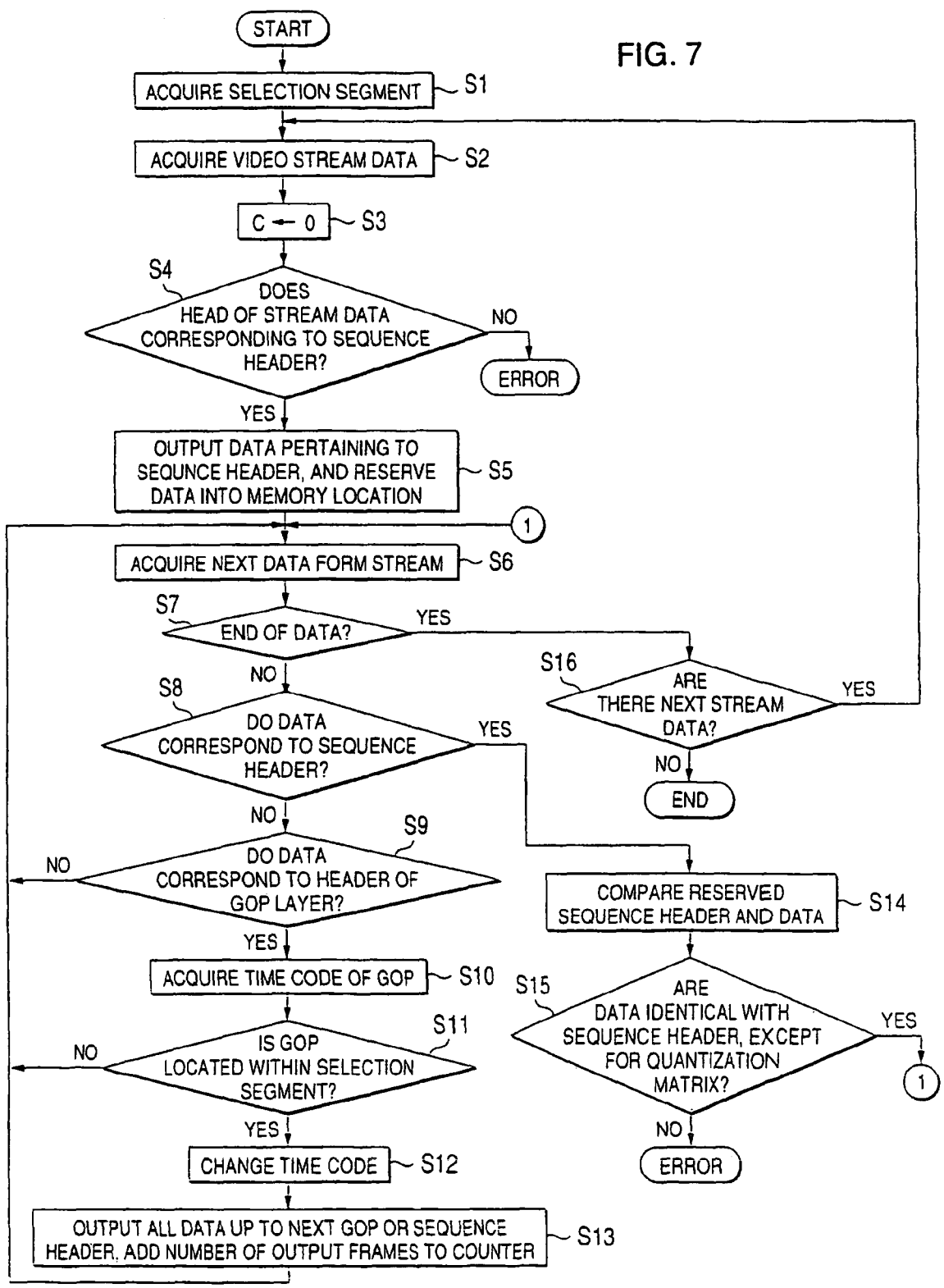
FIG. 7 is a flowchart showing processing effected by video skimming means in the extraction step according to the first embodiment.

The operation of the video skimming means 602 will be described hereinbelow. FIG. 7 is a flowchart relating to processing effected by the video skimming means 602. The MPEG-1 system stream is standardized under International Standard ISO/IEC IS 11172-2. As shown in FIG. 8, the video stream comprises a sequence layer, a group-of-pictures (GOP) layer, a picture layer, a slice layer, a macro block layer, and a block layer. Random access is made on the basis of GOP layer, which is the minimum unit, and each layer included in the picture layer corresponds to a single frame. The video skimming means 602 processes data on a per-GOP basis. A counter C for counting the number of output frame is initialized to 0 (S3). First, the video skimming means 602 acknowledges that the header of the video stream corresponds to the header of the sequence layer (S2 and S4) and stores data included in the header (S5). Subsequently, video skimming means outputs the data. The header of the sequence layer may appear during subsequent processes. The value of the header is not allowed to be changed unless the value is relevant to a quantization matrix. Therefore, every time the sequence header is input, the value of the input header is compared with the value of the stored header (S8 and S14). If the input header differs from the stored header in terms of a value other than the value relevant to the quantization matrix, the input header is considered an error (S15). Subsequently, the video skimming means 602 detects the header of the GOP layer of the input data (S9). Data pertaining to a time code are described in the header of the GOP layer (S10), and the time code describes the period of time which has elapsed from the head of the sequence. The video skimming means 602 compares the time code with the segment output in the selection step 101 (S1) (S11). If the time code is determined not to be included in the segment, the video skimming means 602 discards all the data sets appearing before the next GOP layer of the sequence layer. In contrast, if the time code is included in the selected segment, the video skimming means 602 outputs all the data sets appearing before the next GOP layer of the sequence layer (S13). In order to ensure continuity the data sets which have already been output, and the data sets currently being output, the time code of the GOP layer must be changed (S12). A value to which the time code of the GOP layer is to be changed is computed through use of the value of the counter C. The counter C retains the number of frames which have already been output. In accordance with Eq. 1, the time Tv at which the header frame of the GOP layer to be currently output is displayed is computed from C, as well as from a picture rate "pr" which is described in the sequence header and represents the number of frames to be displayed per second.

$$Tv = \frac{C}{pr} \quad (1)$$

"Tv" designates a value in units of 1/pr sec, and hence the value of Tv is converted in accordance with the format of the time code of the MPEG-1. the thus-converted value is set in the time code of the GOP layer which is to be output at this time. When the data pertaining to the GOP layer are output, the number of output picture layers is added to the value of the counter C. The foregoing processing is performed repeatedly until the end of the video stream (S7 and S16). In a case where the demultiplex means 601 outputs a plurality of video streams, the processing is performed for each of the video streams.

Figure 9:
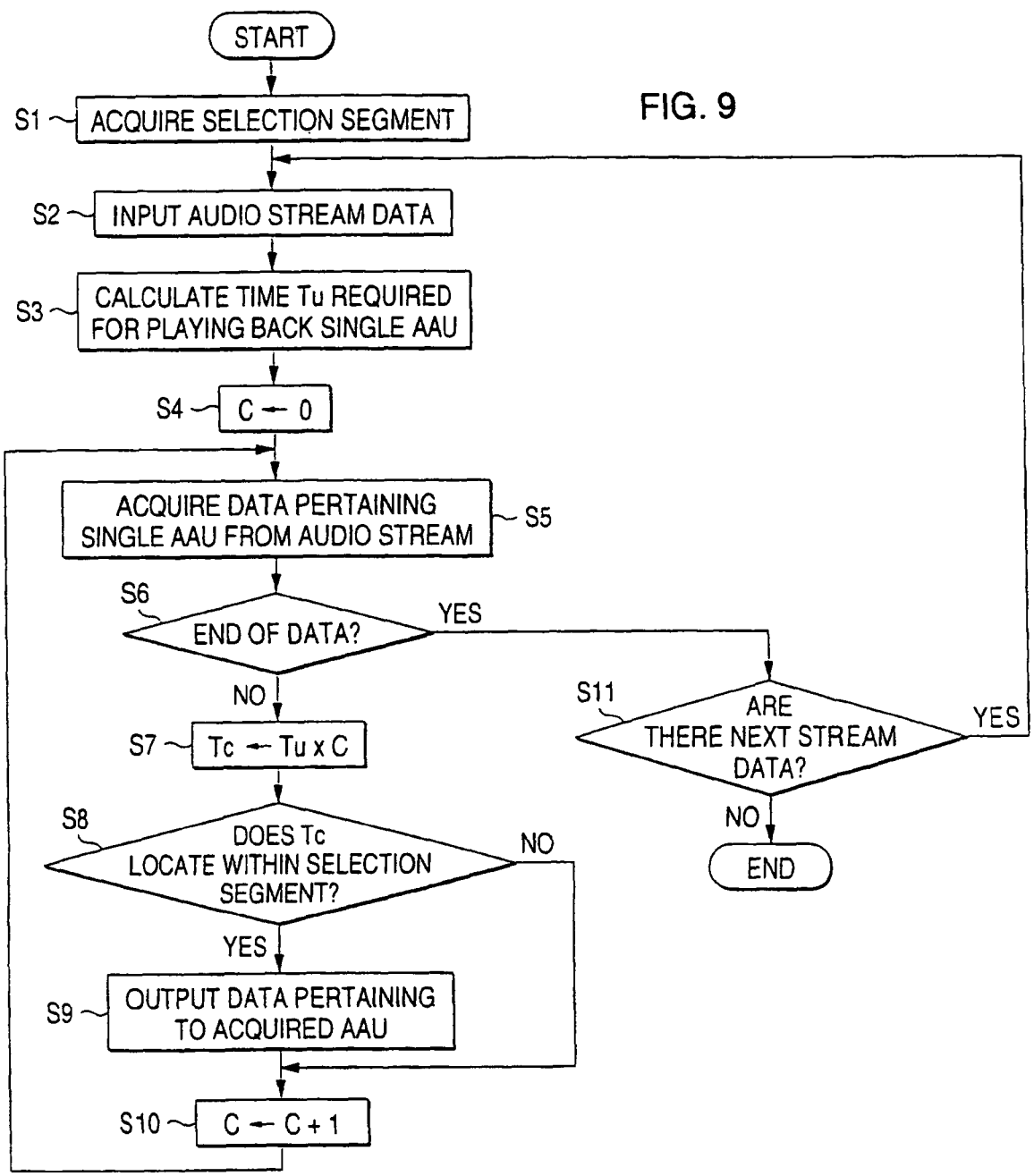
FIG. 9 is a flowchart showing processing effected by audio skimming means in the extraction step according to the first embodiment.
Figure 10:
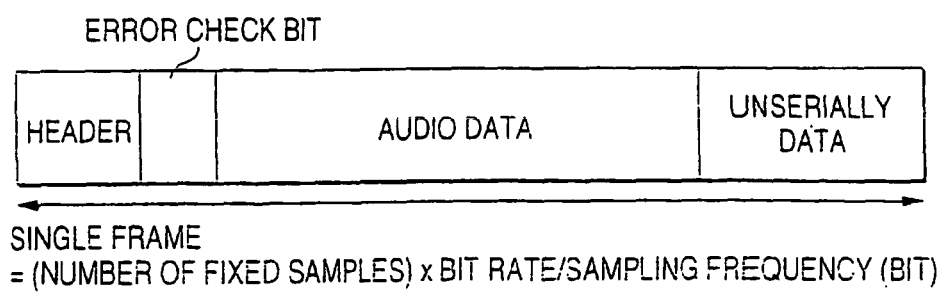
FIG. 10 is a schematic representation showing the configuration of AAUs of the MPEG-1 audio stream.

Processing of the audio skimming means 603 will now be described. FIG. 9 is a flowchart relating to processing effected by the audio skimming means 603. The MPEG-1 audio stream is standardized under International Standard ISO/IEC IS 11172-3. The audio stream is formed from a series of frames called audio access units (AAUS). FIG. 10 shows the structure of an AAU. The AAU is the minimum unit at which audio data can be decoded independently and comprises a given number of sampled data sets Sn. The playback time of a single AAU can be computed from a bit rate "br" representing the transmission rate; a sampling frequency Fs; and the number of bits, L, of the AAU. First, the header of the AAU included in the audio stream is detected (S2 and S5), thereby obtaining the number of bits, L, of a single AAU. Further, the bit rate "br" and the sampling frequency Fs are described in the header of the AAU. The number of samples, Sn, of a single AAU is calculated in accordance with Eq. 2.

$$Sn = \frac{L \times Fs}{br} \quad (2)$$

The playback time Tu of a single AUU is computed in accordance with Eq. 3.

$$Tu = \frac{Sn}{Fs} = \frac{L}{br} \quad (3)$$

So long as the value of Tu is computed, the time which has elapsed from the head of the stream can be obtained by counting the number of AAUS. The audio skimming means 603 counts the number of AAUs which have already appeared and calculates the time which has elapsed from the head of the stream (S7). The thus-calculated time is compared with the segment output in the selection step 101 (S8). If the time at which the AAU appears is included in the selected segment, the audio skimming means 603 outputs all the data sets relating to that AAU (S9). In contrast, if the time at which the AAU appears is not included in the selected segment, the audio skimming means 603 discards the data sets pertaining to the AAU. The foregoing processing is performed repeatedly until the end of the audio stream (S6 and S11). When the demultiplex means 601 outputs a plurality of audio streams, each of the audio streams is subjected to the previously-described processing.

Figure 11:
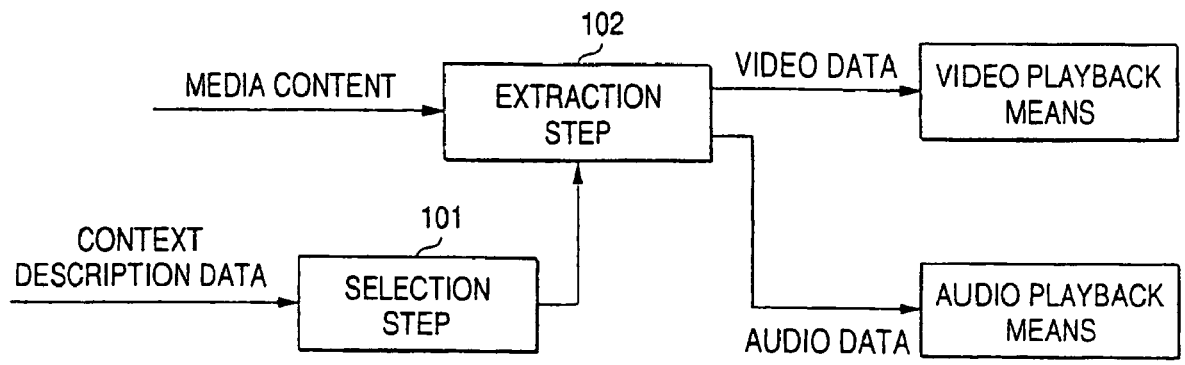
FIG. 11 is a block diagram showing an application of the media processing method according to the first embodiment.

As shown in FIG. 11, the video stream output from the extraction step 102 is input to video playback means, and the audio stream output from the extraction step 102 is input to audio playback means. The video stream and the audio stream are played back synchronously, thereby enabling playback of a synopsis or a highlight scene of media content. Further, the thus-produced video and audio streams are multiplexed, thereby enabling preparation of an MPEG-1 system stream relating to a synopsis of the media content or a collection of highlight scenes of the same.

Second Embodiment

A second embodiment of the present invention will now be described. The second embodiment differs from the first embodiment only in terms of processing relating to the selection step.

Figure 12:
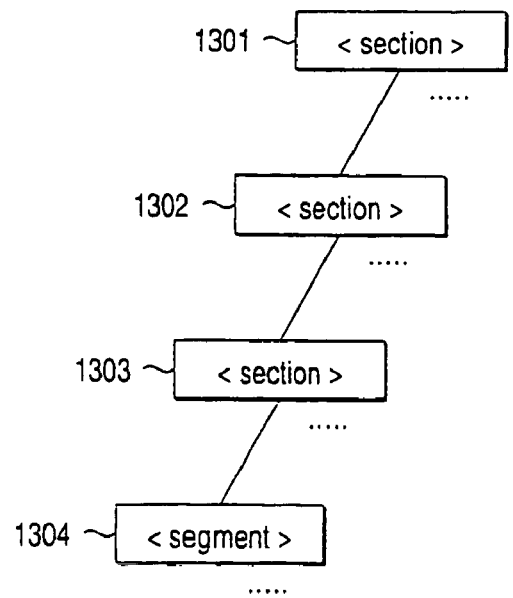
FIG. 12 is a descriptive view showing processing of the degree of importance according to a second embodiment of the present invention.

Processing relating to the selection step 101 according to the second embodiment will now be described by reference to the drawings. In the selection step 101 according to the second embodiment, the priority values assigned to all the elements ranging from <section> of the highest hierarchical level to leaves <segment> are utilized. The priority assigned to each of the elements <section> and <segment> represents the objective degree of contextual importance. Processing relating to the selection step 101 will now be described by reference to FIG. 12. In FIG. 12, reference numeral 1301 designates one of elements <section> of the highest hierarchical level included in the context description data; 1302 designates a child element <section> of the element <section> 1301; 1303 designates a child element <section> of the element <section> 1302; and 1304 designates a child element <segment> of the element <section> 1303. In the selection step 101 according to the second embodiment, an arithmetic mean of all the priority values assigned to the path extending from the leaf <segment> to its ancestor <section> of the highest hierarchical level is calculated. When arithmetic means of the path exceeds a threshold value, the element <segment> is selected. In the example shown in FIG. 9, an arithmetic mean "pa" of the attributes of elements: <segment> 1304, <section> 1303, <section> 1302, and <section> 1301; i.e., the arithmetic mean of their attribute priority values p4, p3, p2, and p1, is calculated. The arithmetic mean "pa" is calculated in accordance with Eq. 4.

$$pa = \frac{p1 + p2 + p3 + p4}{4} \quad (4)$$

Figure 13:
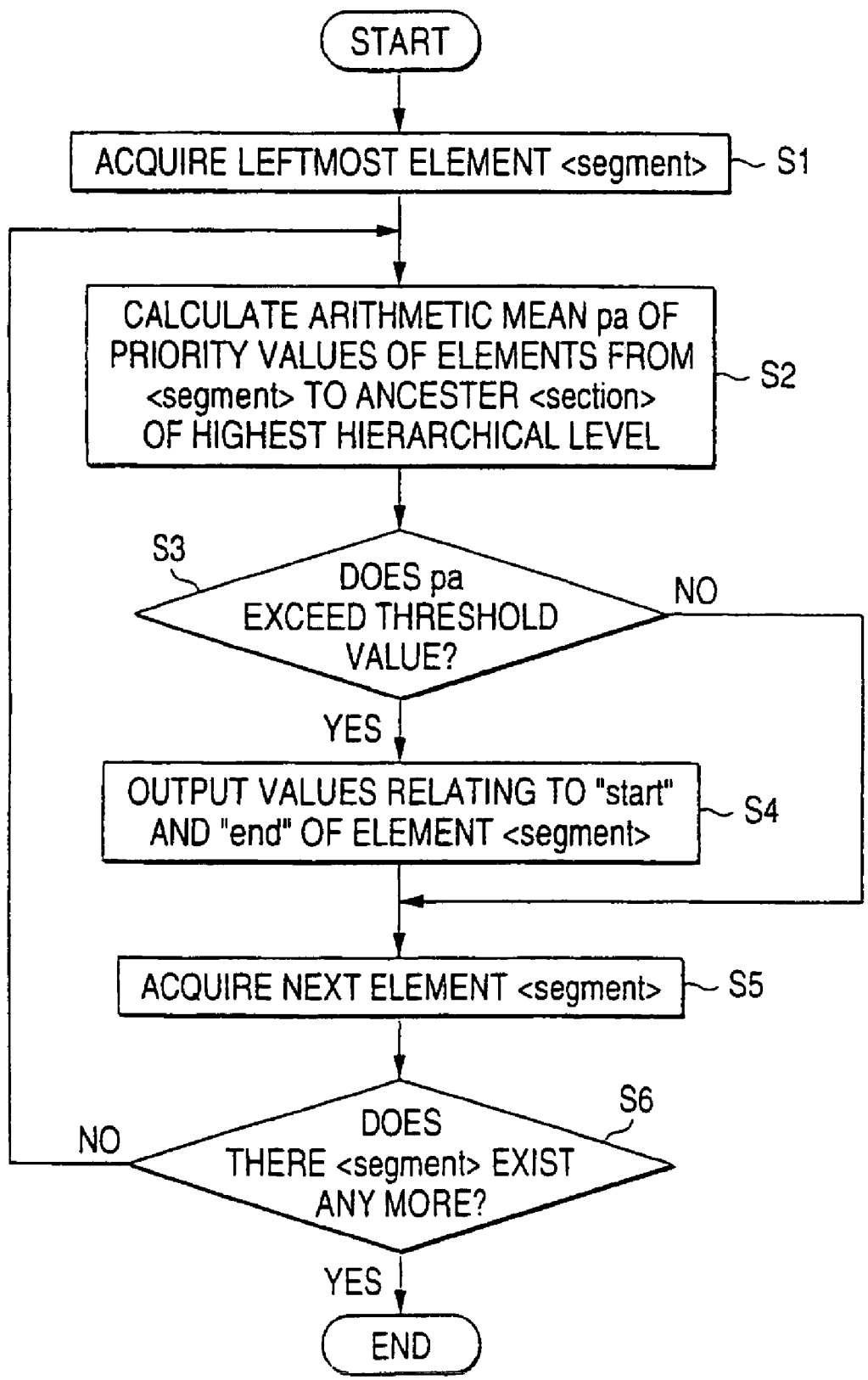
FIG. 13 is a flowchart showing processing relating to the selection step according to the second embodiment.

The thus-calculated "pa" is compared with the threshold value (S1 and S2). If "pa" exceeds the threshold value, <segment> 1304 is selected (S3), and the attribute values relating to "start" and "end" of <segment> 1304 are output as the start time and end time of the selected scene (S4). All the elements <segment> are subjected to the foregoing processing (S1 and S6). FIG. 13 is a flowchart showing processing relating to the selection step 101 according to the second embodiment.

In the second embodiment, an arithmetic mean of the priority value assigned to the <segment> of the lowest hierarchical level up to the priority value assigned to its ancestor <section> of the highest hierarchical level is calculated, and the leaf <segment> is selected on the basis of the thus-calculated arithmetic mean. Alternatively, there may be calculated an arithmetic mean of the priority values assigned to the element <section> having a child <segment> up to the priority value assigned to its ancestor <section> of the highest hierarchical level, and the element <section> having the child <segment> may be selected by comparing the thus-calculated arithmetic mean with the threshold value. Similarly, in another hierarchical stratum, an arithmetic mean of the priority value assigned to an element <section> up to the priority value assigned to its ancestor <section> of the highest hierarchical level is calculated, and the thus-calculated arithmetic mean is compared with the threshold value, whereby the element <section> in the hierarchical stratum may be selected.

Third Embodiment

A third embodiment of the present invention will now be described. The third embodiment differs from the first embodiment only in terms of the processing relating to the selection step.

Figure 14:
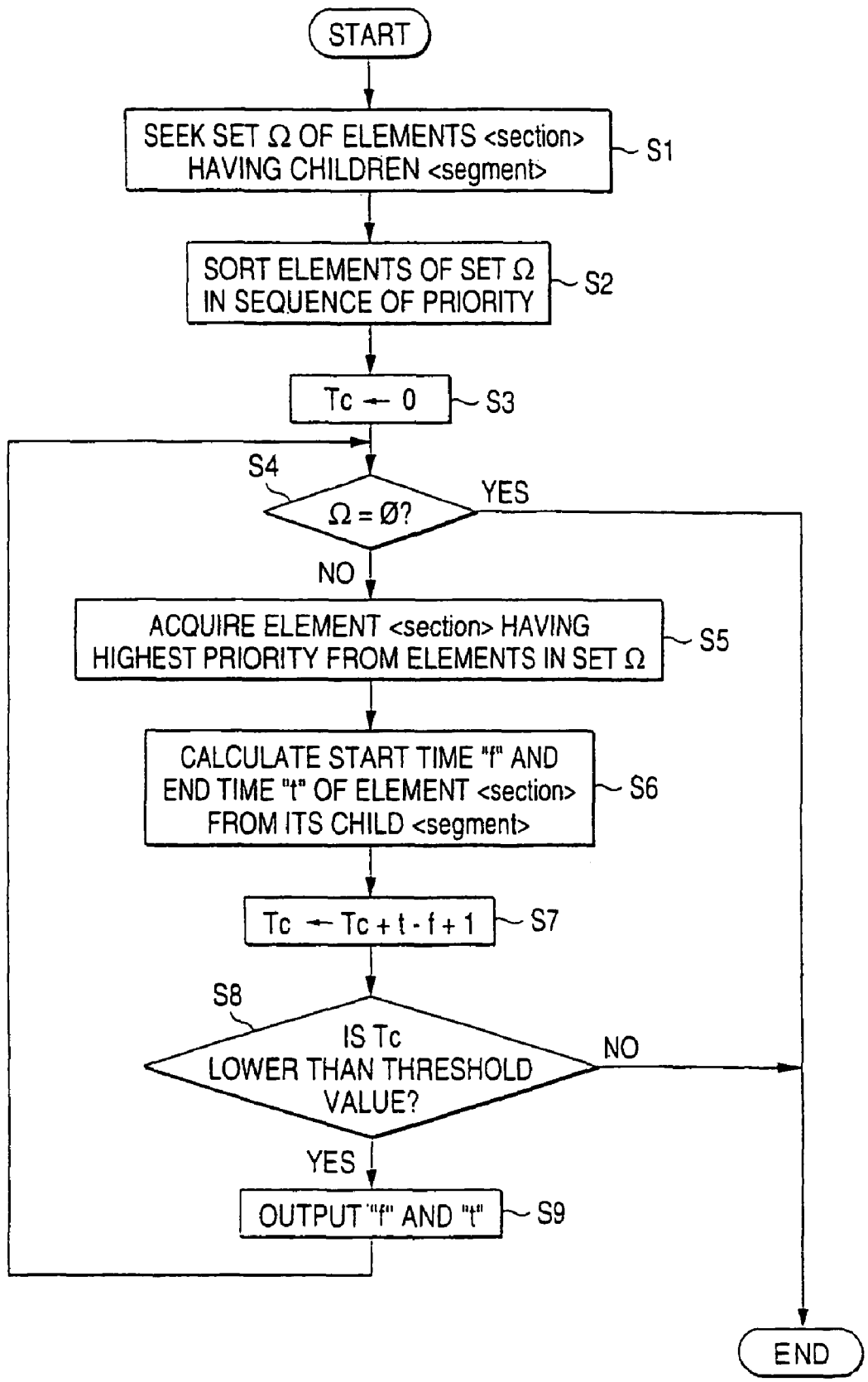
FIG. 14 is a flowchart showing processing relating to the selection step according to a third embodiment of the present invention.

The processing relating to the selection step 101 according to the third embodiment will be described by reference to the drawings. As in the case of the processing described in connection with the first embodiment, in the selection step 101 according to the third embodiment, selection is effected by focusing on only the elements <section>, each of which has a child <segment>. In the third embodiment, there is set a threshold value with regard to the sum of the duration periods of all the scenes to be selected. More specifically, elements <section> are selected in decreasing order of priority value, until the sum of the duration periods of the elements <section> that have been selected so far is maximized but remains smaller than the threshold value. FIG. 14 is a flowchart of processing pertaining to the selection step 101 according to the third embodiment. A collection of elements <section>, each of which has children <segment>, is taken as a set Ω (S1). The elements <section> of the set Ω are sorted in descending order of attributes priority (S2). The element <section> having the highest priority value is selected from the set Ω (S4 and S5), and the thus-selected element <section> is eliminated from the set Ω. The start time and end time of the thus-selected element <section> are obtained by examination of all the children <segment> of the element <section>, and a duration of the element <section> is calculated (S6). The sum of the duration periods of the elements <section> which have been selected so far is calculated (S7). If the sum exceeds the threshold value, processing is completed (S8). If the sum is lower than the threshold value, the start time and the end time of the element <section> selected this time are output (S9). Processing then returns to a step in which the element <section> having the highest priority value is selected from the set Ω. The above-described processing is repeated until the sum of duration periods of the selected elements <section> exceeds the threshold value or the set Ω becomes empty (S4 and S8).

In the third embodiment, selection is effected by focusing on the element <section> having children <segment>. However, selection may be effected by focusing on elements <segment> in place of the elements <section>. In this case, a priority value corresponds to the degree of importance shared among all the elements <segment> within the media content. Further, selection may be effected by focusing on the elements <section> having no children <segment> within the same hierarchical level. More specifically, selection may be effected by focusing on the elements <section> located in the same path, which is counted from the ancestor <contents> or a leaf <segment>.

As in the case of the second embodiment, the priority values assigned to the respective elements <section> and <segment> are taken as the objective degree of contextual importance, and the arithmetic mean "pa" of all the priority values assigned to the element <segment> up to its ancestor <section> of the highest hierarchical level is calculated. Elements <section>, each having children <segment>, or elements <segment> are selected in descending order of "pa" until the sum of duration periods is maximized but remains smaller than the threshold value. Even in this case, the same advantageous result as that yielded in the second embodiment is achieved.

Fourth Embodiment

A fourth embodiment of the present invention will now be described. The fourth embodiment differs from the first embodiment only in terms of the processing relating to the selection step.

Figure 15:
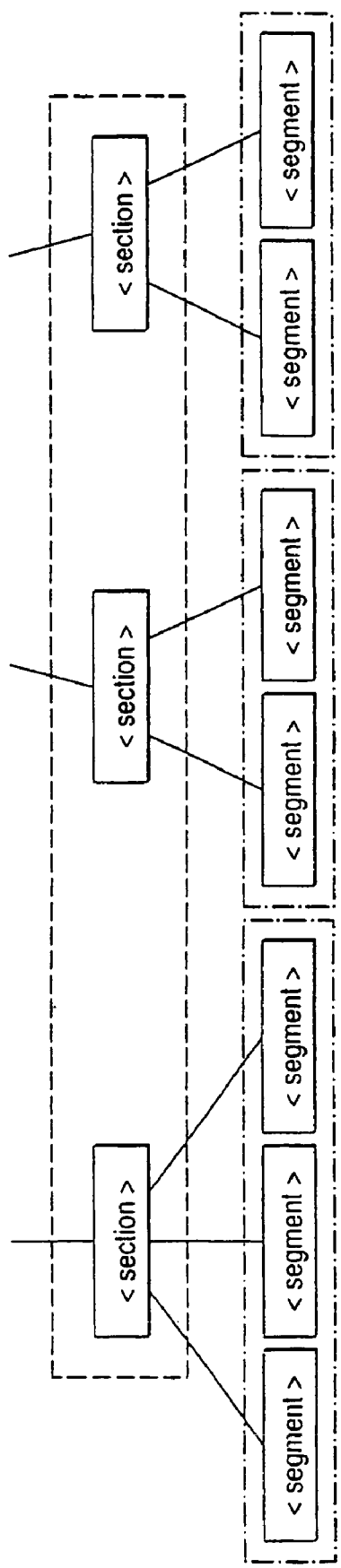
FIG. 15 is a descriptive view for describing a method of assigning the degree of importance according to a fourth embodiment of the present invention.

Processing relating to the selection step 101 according to the fourth embodiment will now be described by reference to the drawings. As in the case of the selection performed in the selection step 101 in the first embodiment, selection relating to the selection step 101 in the fourth embodiment is effected by focusing on an element <segment> and an element <section> having children <segment>. As in the case of the third embodiment, a threshold value is set with regard to the sum of duration periods of all scenes to be selected in the present embodiment. As in the case of the first embodiment, the priority value assigned to the element <section> having children <segment> corresponds to the degree of importance shared among all the elements <section>, each of which has children <segment>, within the media content. More specifically, the priority value is taken as a degree of importance shared among the elements <section> enclosed by a dotted line shown in FIG. 15. Further, the priority value assigned to the element <segment> corresponds to the degree of importance shared among the elements <segment> sharing the same parent element <section>; that is, the degree of importance shared among the elements <segment> enclosed by one of the dashed lines shown in FIG. 15.

Figure 16:
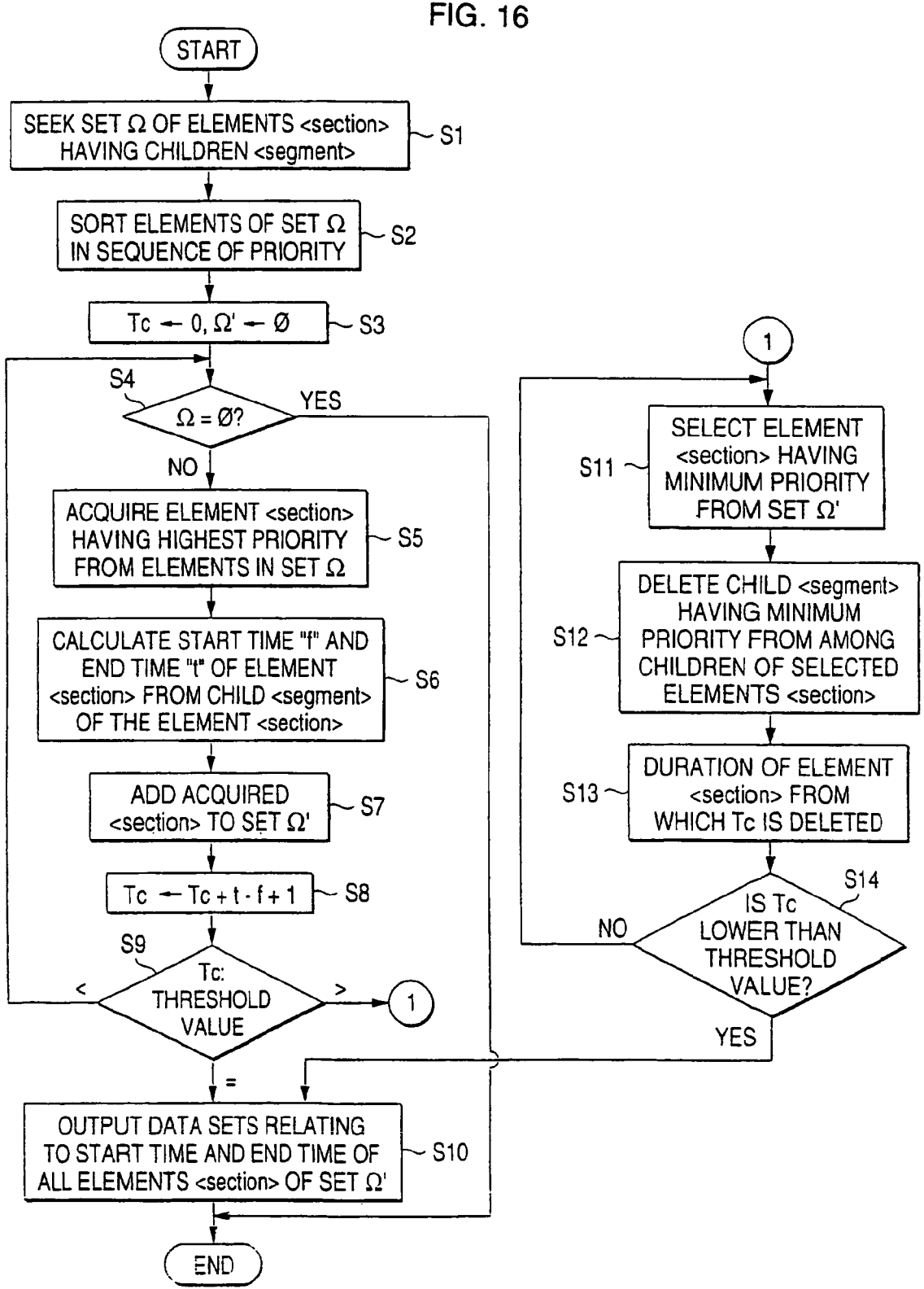
FIG. 16 is a flowchart showing processing relating to the selection step according to the fourth embodiment.

FIG. 16 is a flowchart showing processing relating to the selection step 101 according to the fourth embodiment. A collection of elements <section>, each of which has children <segment>, is taken as set Ω (S1). The elements <section> within the set Ω are sorted in descending order of priority (S2). Subsequently, the element <section> having the highest priority value is selected from the set Ω (S3, S4, and S5). If a plurality of elements <section> have the highest priority value, all the elements are selected. The thus-selected elements <section> are taken as elements of another set Ω' and are eliminated from the set Ω. The start time, the end time, and a duration of a scene represented by the thus-selected element <section> are obtained and stored in advance by examination of the children <segment> of the element <section> (S6). If the plurality of elements <section> are selected, the start time, the end time, and the duration of each of the scenes represented by the respective elements are obtained and stored in advance. The sum of duration periods of the elements <section> of the set Ω' is obtained (S7 and S8). The sum is compared with a threshold value (S9). If the sum of duration periods is equal to the threshold value, all the data sets which pertain to the start time and the end time and have been stored so far are output, and processing is terminated (S10). In contrast, if the sum of duration periods is lower than the threshold value, processing again returns to the selection of an element <section> from the set Ω (S4 and S5). If the set Ω is empty, all the data sets pertaining to the start time and the end time that are stored are output, and processing is terminated (S4). If the sum of duration periods exceeds the threshold value, the following processing is performed. Specifically, the element <section> having the minimum priority is selected from the set Ω' (S11). At this time, if a plurality of elements <section> have the minimum priority, all the elements are selected. Of the children <segment> of the thus-selected elements <section>, the children <segment> having the minimum priority are deleted (S12). The start time, the end time, and the duration of the element <section> corresponding to the thus-eliminated children <segment> are changed (S13). As a result of deletion of the elements <segment>, scenes may be interrupted. In such a case, for each of the scenes, which have been interrupted, the start time, the end time, and a duration are stored. Further, if, as a result of deletion of the children <segment>, all the children of an element <section> are deleted, the element <section> is deleted from the set $\Omega'$. If the plurality of elements <section> are selected, all the elements are subjected to the previously-described processing. As a result of deletion of the children <segment>, the duration of the element <section> from which the children <segment> have been deleted becomes shorter, in turn reducing the sum of duration periods. Such deletion processing is performed repeatedly until the sum of duration periods of the elements of the set $\Omega'$ becomes lower than the threshold value. When the sum of the duration periods of the elements of the set $\Omega'$ becomes lower than the threshold value (S14), all the data sets which pertain to the start time and the end time and have been stored are output, and processing is terminated (S15).

Although in the fourth embodiment selection is effected by focusing on the elements <section>, each of which has children <segment>, or elements <segment>, selection may also be effected by focusing on an element <section> and its children <section> or an element <section> and its children <segment>. Even in such a case, the same advantageous result as that yielded by the fourth embodiment is achieved.

With regard to deletion of the elements <segment> effected when the sum of duration periods exceeds the threshold value, in the present embodiment the elements <section> are deleted in ascending sequence of priority from the lowest priority. However, a threshold value may be set for the priority of elements <section>, and the children <segment> having the minimum priority may be deleted from all the elements <section> which are lower than the threshold value. Alternatively, another threshold value may be set for the priority of elements <segment>, and elements <segment> whose priority is lower than the threshold value may be deleted.

Fifth Embodiment

A fifth embodiment of the present invention will now be described by reference to the accompanying drawings. In the present embodiment, a motion picture of MPEG-1 format is taken as media content. In this case, a media segment corresponds to a single scene cut, and a score corresponds to the objective degree of contextual importance of a scene of interest.

Figure 17:
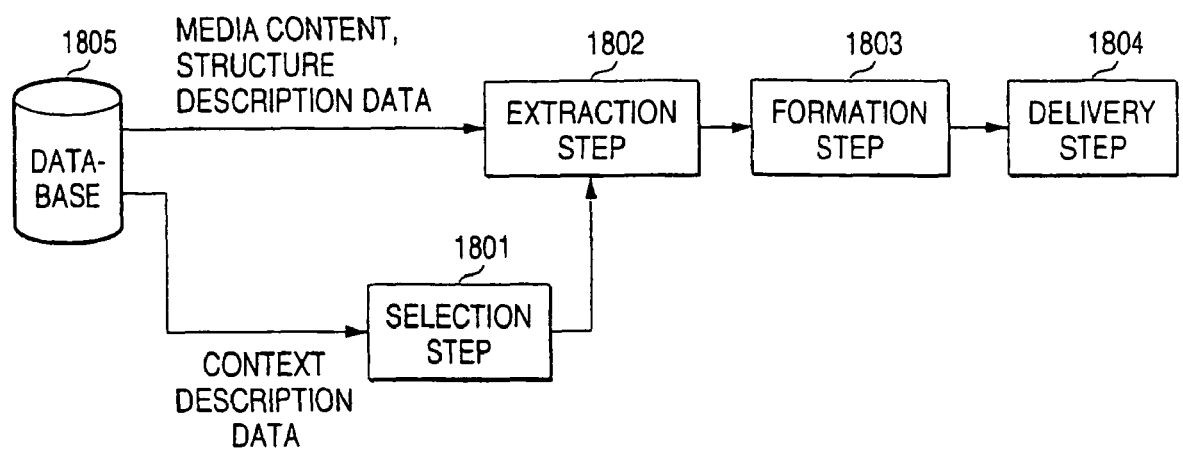
FIG. 17 is a block diagram showing a media processing method according to a fifth embodiment of the present invention.

FIG. 17 is a block diagram showing a media processing method according to the fifth embodiment of the present invention. In FIG. 17, reference numeral 1801 designates a selection step; 1802 designates an extraction step; 1803 designates a formation step; 1804 designates a delivery step; and 1805 designates a database. In the selection step 1801, a scene of media content is selected from context description data, and there are output data pertaining to the start time and the end time of the thus-selected scene, as well as data representing a file where the data are stored. In the extraction step 1802, there are received the data sets representing the start time and the end time of the scene and the data sets representing the file output in the selection step 1801. Further, in the extraction step 1802, by reference to the structure description data, data pertaining to the segment defined by the start time and the end time output in the selection step 1801 are extracted from the file of media content. In the formation step 1803, the data output in the extraction step 1802 are multiplexed, thus configuring a system stream of MPEG-1 format. In the delivery step 1804, the system stream of MPEG-1 format prepared in the formation step 1803 is delivered over a line. Reference numeral 1805 designates a database where media content, structure description data thereof, and context description data are stored.

Figure 18:
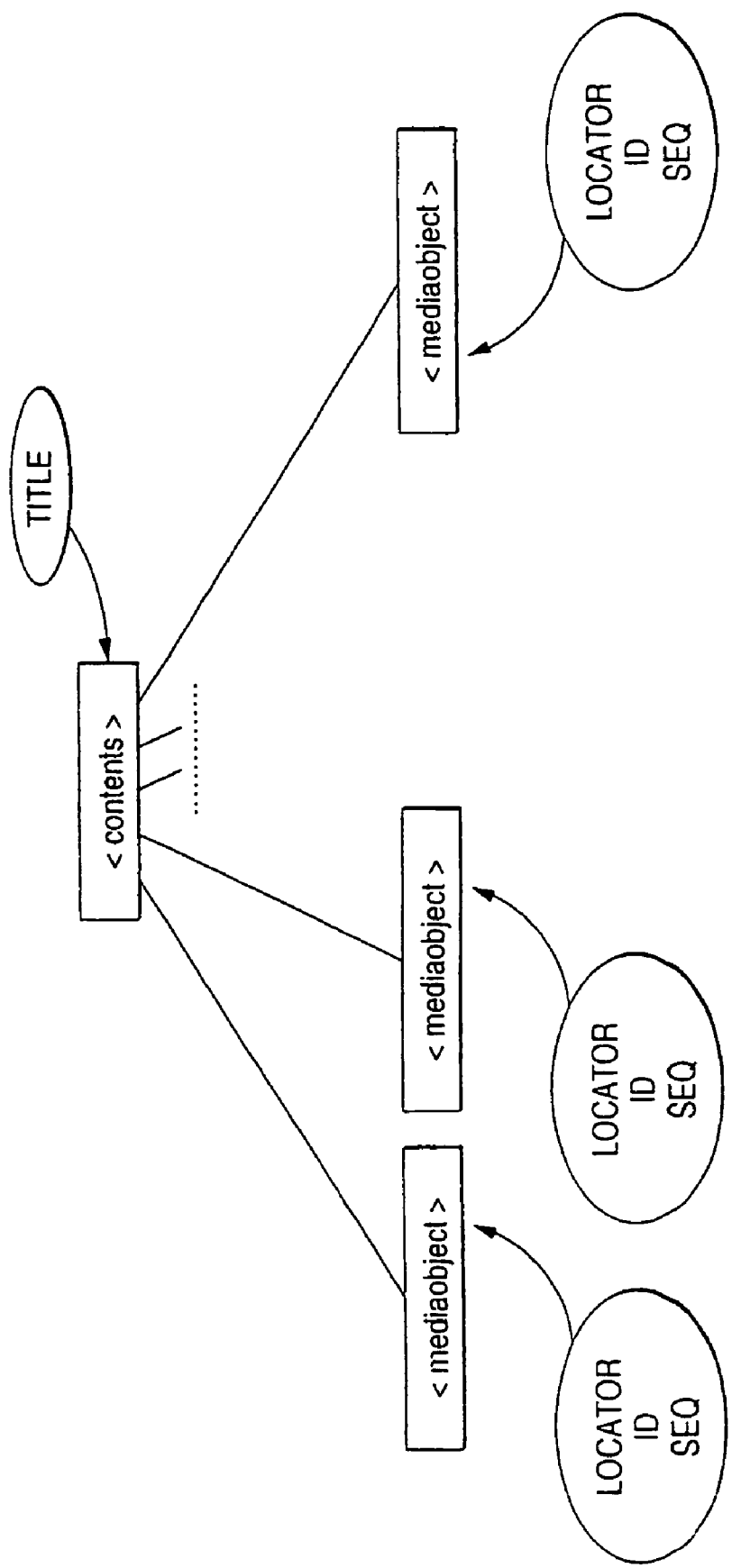
FIG. 18 is a diagram showing the structure of structure description data according to the fifth embodiment.

FIG. 18 shows the configuration of the structure description data according to the fifth embodiment. In the present embodiment, the physical contents of the data are described in a tree structure. With regard to the nature of storage of media content in the database 1805, a single piece of media content is not necessarily stored in the form of a single file. In some cases, a single piece of media content may be stored in a plurality of separate files. The root of the tree structure of structure description data is depicted as <contents> and represents a single piece of content. The title of a corresponding piece of content is appended to the root <contents> as an attribute. A children of <contents> corresponds to <mediaobject>, which represents a file where the media content is stored. The child <mediaobject> is appended, as an attribute, to a link "locator" representing a link to the file where the media content is stored and an identifier ID representing a link to context description data. In a case where media content is constituted of a plurality of files, "seq" is appended to the element <mediaobject> as an attribute for representing the sequence of a file of interest within the media content.

Figure 19:
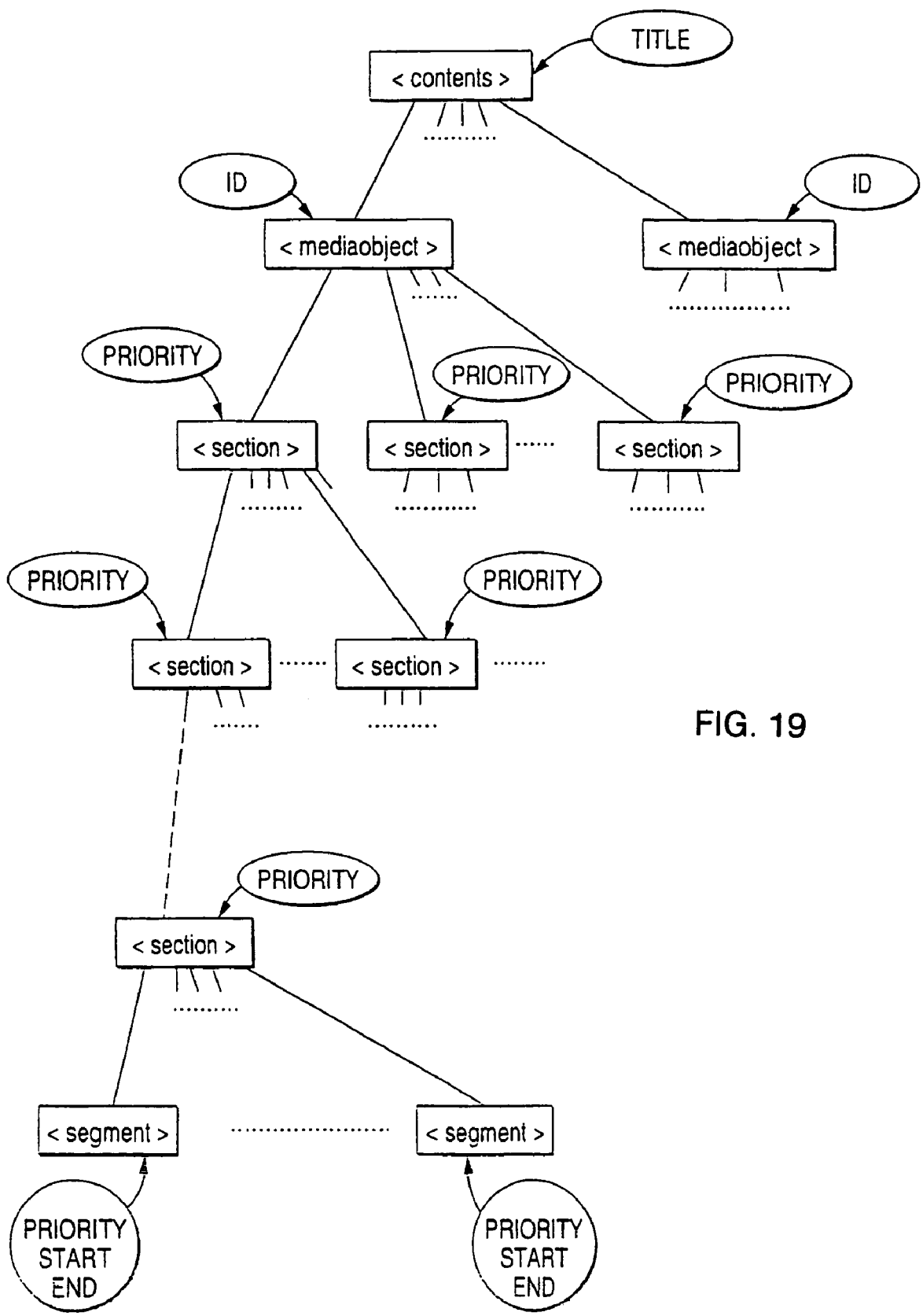
FIG. 19 is a diagram showing the structure of context description data according to the fifth embodiment.

FIG. 19 shows the configuration of the context description data according to the fifth embodiment. The context description data of the present embodiment corresponds to the context description data of the first embodiment appended with a link to the element <mediaobject> of the structure description data. More specifically, the root <contents> of the context description data has a child <mediaobject>, and the element <mediaobject> has a child <section>. Elements <section> and <segment> are identical with those used in the first embodiment. The element <mediaobject> of the structure description data is associated with the element <mediaobject> of the context description data. Scenes of the media content described by means of children of the element <mediaobject> of the context description data are stored in a file designated by the element <mediaobject> of the structure description data having the attribute ID of the same value. Further, time information "start" and "end" assigned to an element "segment" sets the time which has elapsed from the head of each file. Specifically, in a case where a single piece of media content comprises a plurality of files, the time at the head of each file corresponds to 0, and the start time of each scene is represented by the time which has elapsed from the head of the file to a scene of interest.

The structure description data and the context description data may be expressed in a computer through use of, e.g., Extensible Markup Language (XML). Program 06 shows one example of Document Type Definition (DTD) used for describing the structure description data shown in FIG. 18 through use of XML, as well as one example of structure description data described through use of DTD. Program 07 shows DTD used for describing the context description data shown in FIG. 19 through use of XML and one example of the context description data described by DTD.

Processing relating to the selection step 1801 will now be described. In the selection step 1801, any one of the methods described in connection with the first through fourth embodiments is adopted as a method of selecting a scene. A link to <object> of structure description data is eventually output simultaneously with output of the start time and the end time of a selected scene. Program07.out shows one example of data output from the selection step 1801 in a case where the structure description data are described in the form of an XML document through use of the DTD shown in Program 06 and where the context description data are described in the form of an XML document through use of the DTD shown in Program 07. In Program 07.out, "id" is followed by an ID of an element <mediaobject> of structure description data; "start" is followed by the start time; and "end" is followed by the end time.

Figure 20:
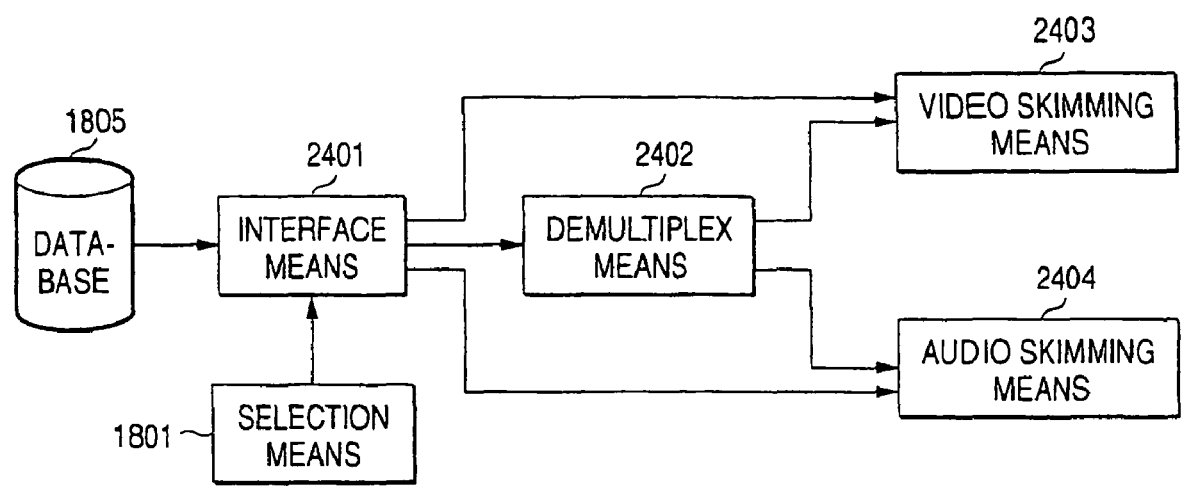
FIG. 20 is a block diagram showing the extraction step according to the fifth embodiment.

Processing relating to the extraction step 1802 will now be described. FIG. 20 is a block diagram showing the extraction step 1802 according to the fifth embodiment. In FIG. 20, the extraction step 1802 according to the fifth embodiment is embodied by interface means 2401, demultiplex means 2402, video skimming means 2403, and audio skimming means 2404. The interface means 2401 receives structure description data and a segment output in the selection step 1801, extracts a file of media content from the database 1805, outputs the thus-extracted file to the demultiplex means 2402, and outputs to the video skimming means 2403 and the audio skimming means 2404 the start time and end time of the segment output in the selection step 1801. Media content of the present embodiment corresponds to a system stream of MPEG-1 format into which a video stream and an audio stream are multiplexed. Accordingly, the demultiplex means 2402 separates the system stream of MPEG-1 format into the video stream and the audio stream. The thus-separated video stream and the segment output from the interface means 2401 are input to the video skimming means 2403. From the input video stream, the video skimming means 2403 outputs only the data pertaining to the selected segment. Similarly, the audio stream and the segment output in the selection step 2402 are input to the audio skimming means 2404. From among the input audio stream, the audio skimming means 2402 outputs only the data pertaining to the selected segment.

Figure 21:
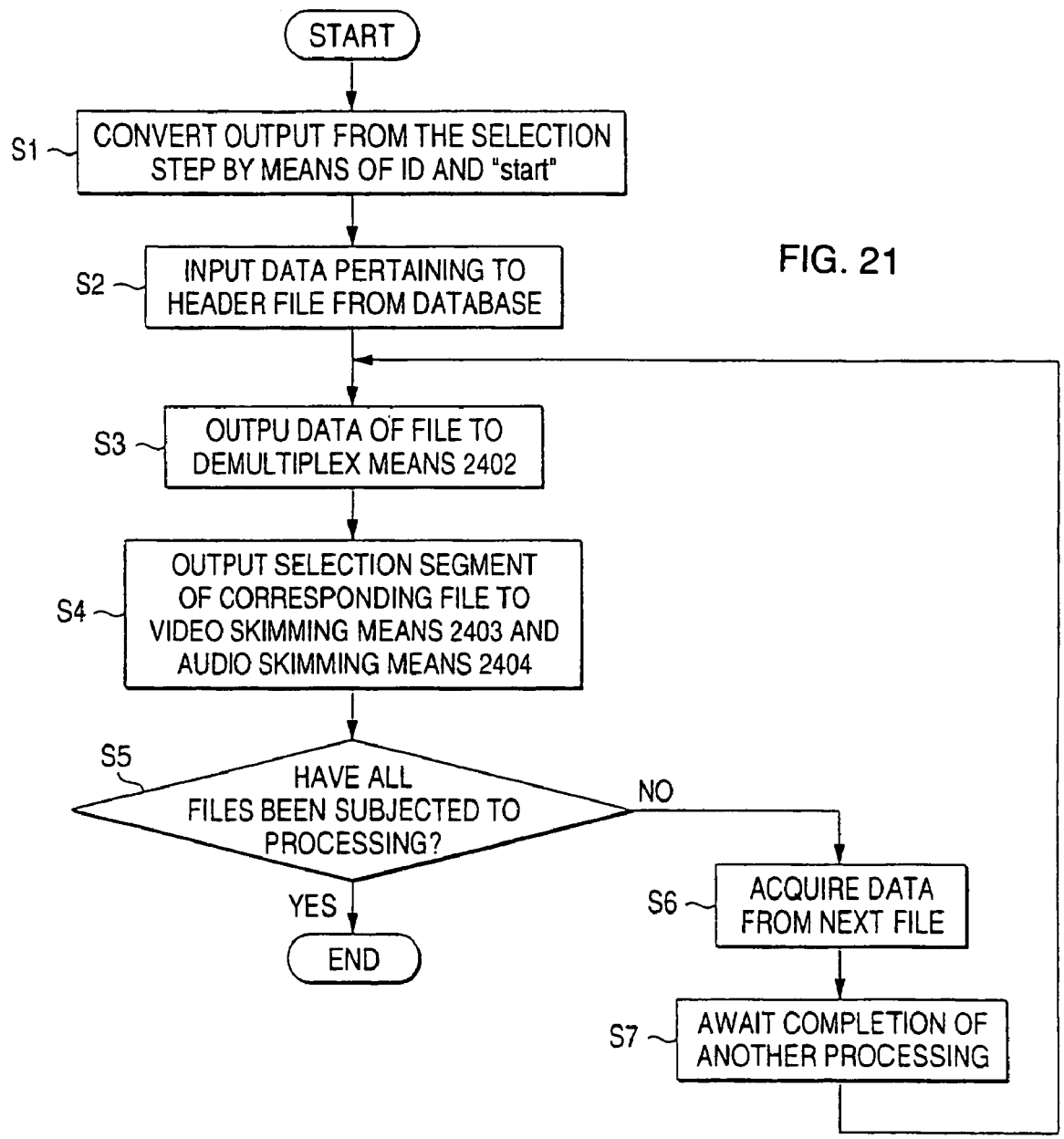
FIG. 21 is a flowchart showing processing effected by interface means in the extraction step according to the fifth embodiment.

Processing relating to the interface means 2401 will now be described. FIG. 21 is a flowchart showing processing effected by the interface means 2401. Structure description data pertaining to corresponding content and the segment output in the selection step 1801, as shown in Program 07.out, are input to the interface means 2401. Chronological order of files is acquired from the attribute "id" assigned to the element <mediaobject> of the structure description data, and hence the segments output in the selection step 1801 are sorted in chronological sequence and in order of "id" (S1). Further, the segments are converted into data such as those shown in Program 07.res. The same files are collected and arranged in sequence of start time. Subsequently, the interface means 2401 subjects the data sets shown in Program 07.res to the following processing in sequence from top to bottom. First, the interface means 2401 refers to an element <mediaobject> of structure description data through use of an "id" and reads a file name on the basis of attribute "locator" of the element <mediaobject>. Data pertaining to a file corresponding to the file name are read from the database, and the thus-read data are output to the demultiplex means 2402 (S2 and S3). The start time and the end time of the selected segment of the file, which are described so as to follow the "id," are output to the video skimming means 2403 and the audio skimming means 2404 (S4). After all the data sets have been subjected to the foregoing processing, processing is terminated (S5). If some of the data sets still remain unprocessed, the previously-described processing is repeated after completion of the processing effected by the demultiplex means 2402, the processing effected by the video skimming means 2403, and the processing effected by the audio skimming means 2404 (S6 and S7).

Figure 22:
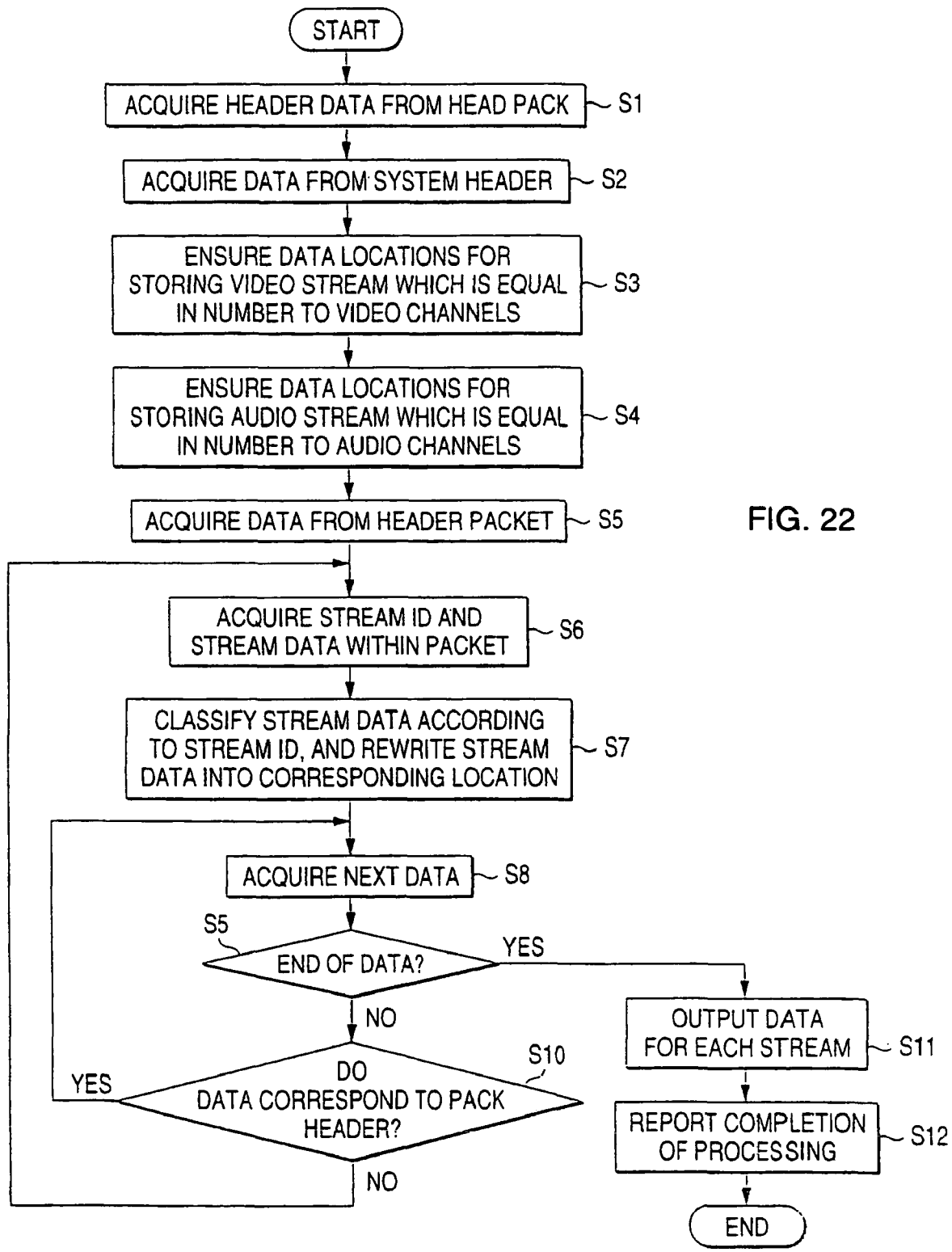
FIG. 22 is a flowchart showing processing effected by demultiplex means in the extraction step according to the fifth embodiment.

Processing pertaining to the demultiplex means 2402 will now be described. FIG. 22 is a flowchart showing processing effected by the demultiplex means 2402. The demultiplex means 2402 receives a system stream of MPEG-1 format, which corresponds to media content, from the interface means 2401 and separates the thus-received system stream of MPEG-1 format into a video stream and an audio stream. The video stream is output to the video skimming means 2403, and the audio stream is output to the audio skimming means 2404 (S1 to S10). After completion of output of the video and audio streams (S9 and S11), termination of the processing performed by the demultiplex means 2402 is reported to the interface means 2401 (S12). As indicated by the flowchart shown in FIG. 22, with the exception of transmission of processing termination acknowledgement, the processing performed by the demultiplex means 2402 is identical with that performed by the demultiplex means according to the first embodiment.

Figure 25:
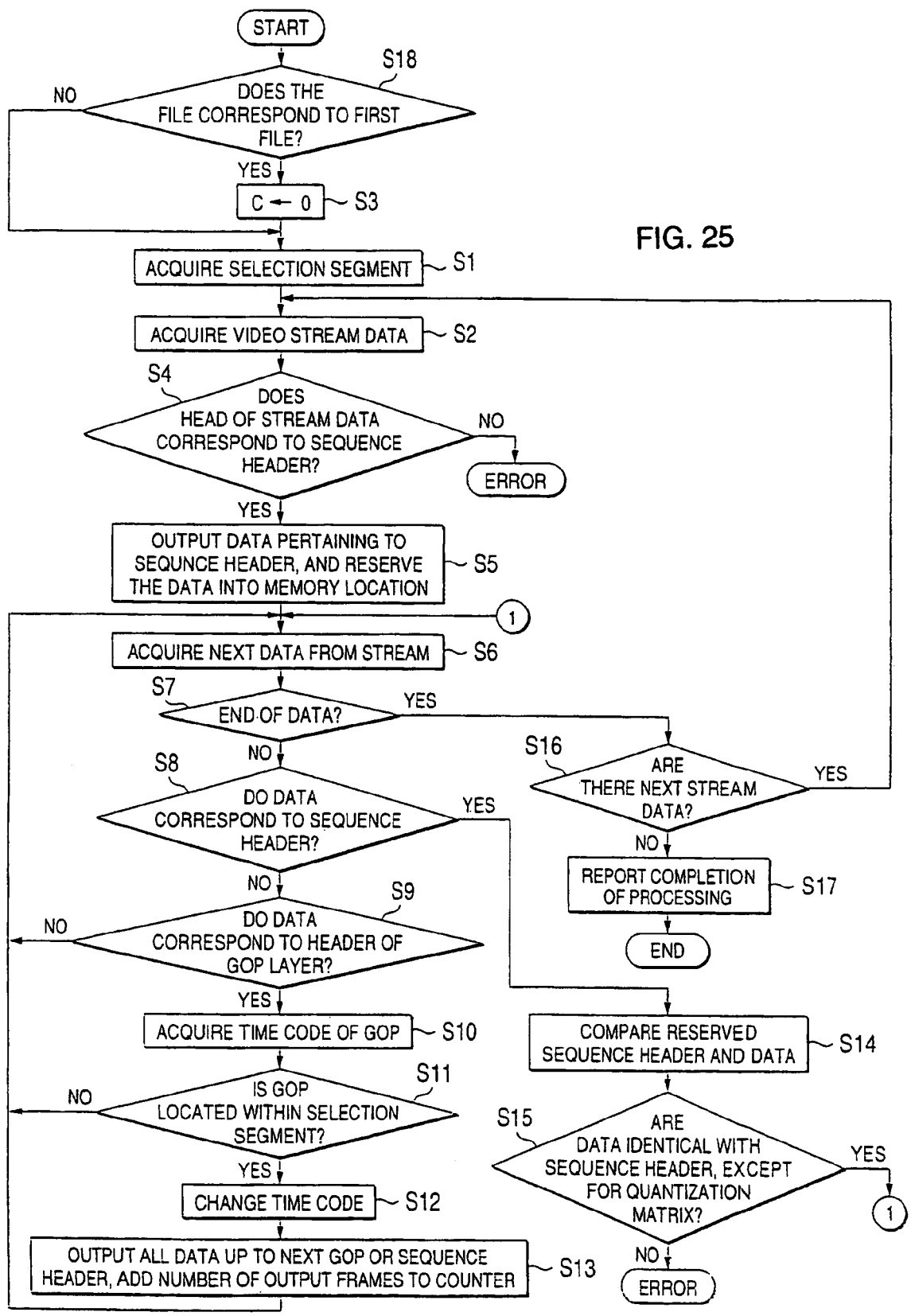
FIG. 25 is another flowchart showing processing effected by video skimming means in the extraction step according to the fifth embodiment.

Processing effected by the video skimming means 2403 will now be described. FIG. 25 is a flowchart showing the processing effected by the video skimming means 2403. As indicated by the flowchart shown in FIG. 25, with the exception of sending of processing termination acknowledgement to the interface means 2401 performed at the end of the processing (S15 and S17), the processing performed by the video skimming means 2403 is identical with that effected by the video skimming means according to the first embodiment.

Figure 24:
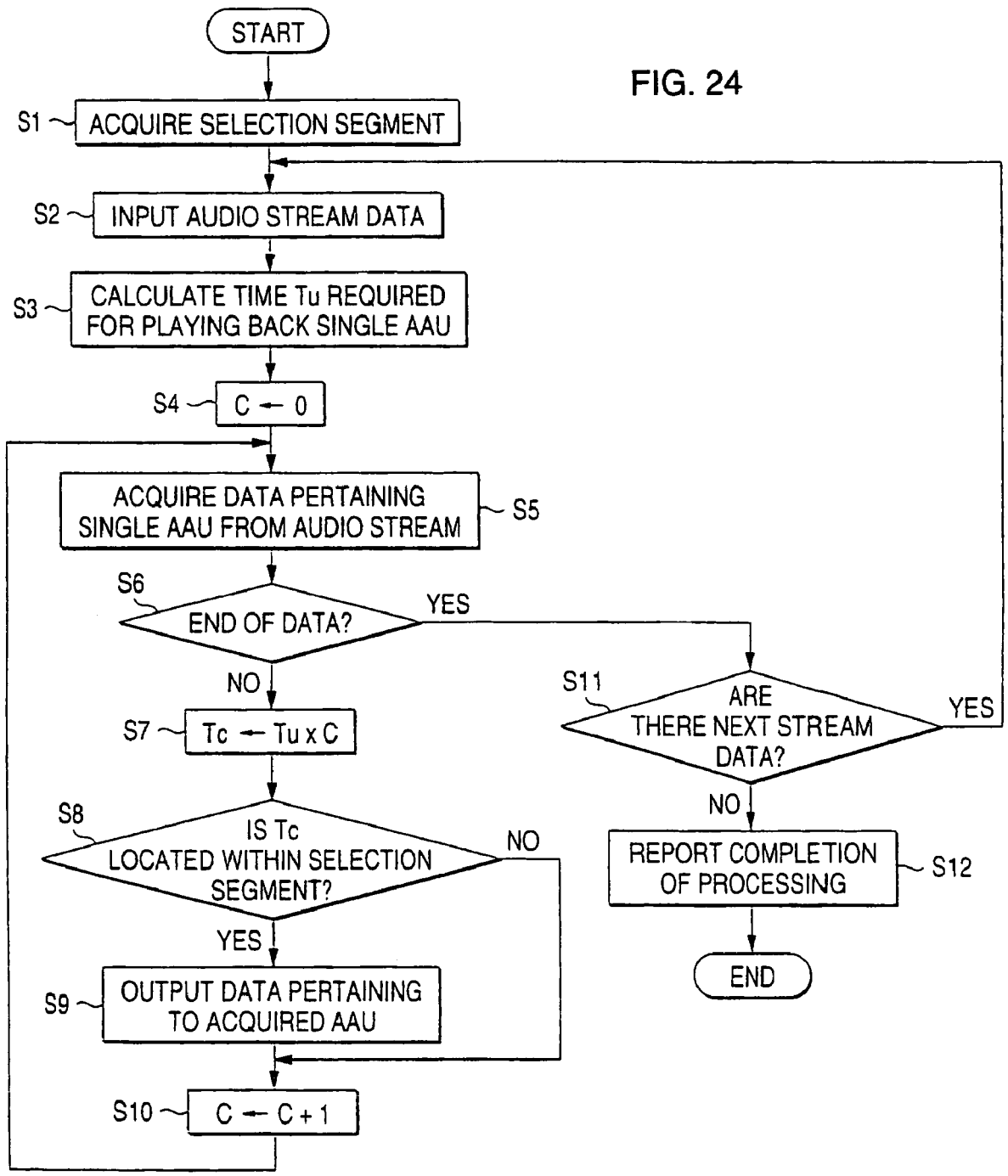
FIG. 24 is a flowchart showing processing effected by audio skimming means in the extraction step according to the fifth embodiment.

Processing performed by the audio skimming means 2404 will now be described. FIG. 24 is a flowchart showing the processing effected by the audio skimming means 2402. As indicated by the flowchart shown in FIG. 24, with the exception of sending of a processing termination acknowledgement to the interface means 2401 at the end of processing (S11 and S12), the processing performed by the audio skimming means is identical with that performed by the audio skimming means described in connection with the first embodiment.

In the formation step 1803, the video and audio streams output in the extraction step 1802 are subjected to time-division multiplexing by means of a multiplex method for MPEG-1 standardized under International Standard ISO/IEC IS 11172-1. In a case where media content is stored into a plurality of separate files, each of the files is multiplexed in the extraction step 1802 in order to output a video stream and an audio stream.

In the delivery step 1804, the system stream of MPEG-1 format multiplexed in the formation step 1803 is delivered over the line. When a plurality of system streams of MPEG-1 format are output in the formation step 1803, all the system streams are delivered in the sequence in which they are output.

Figure 23:
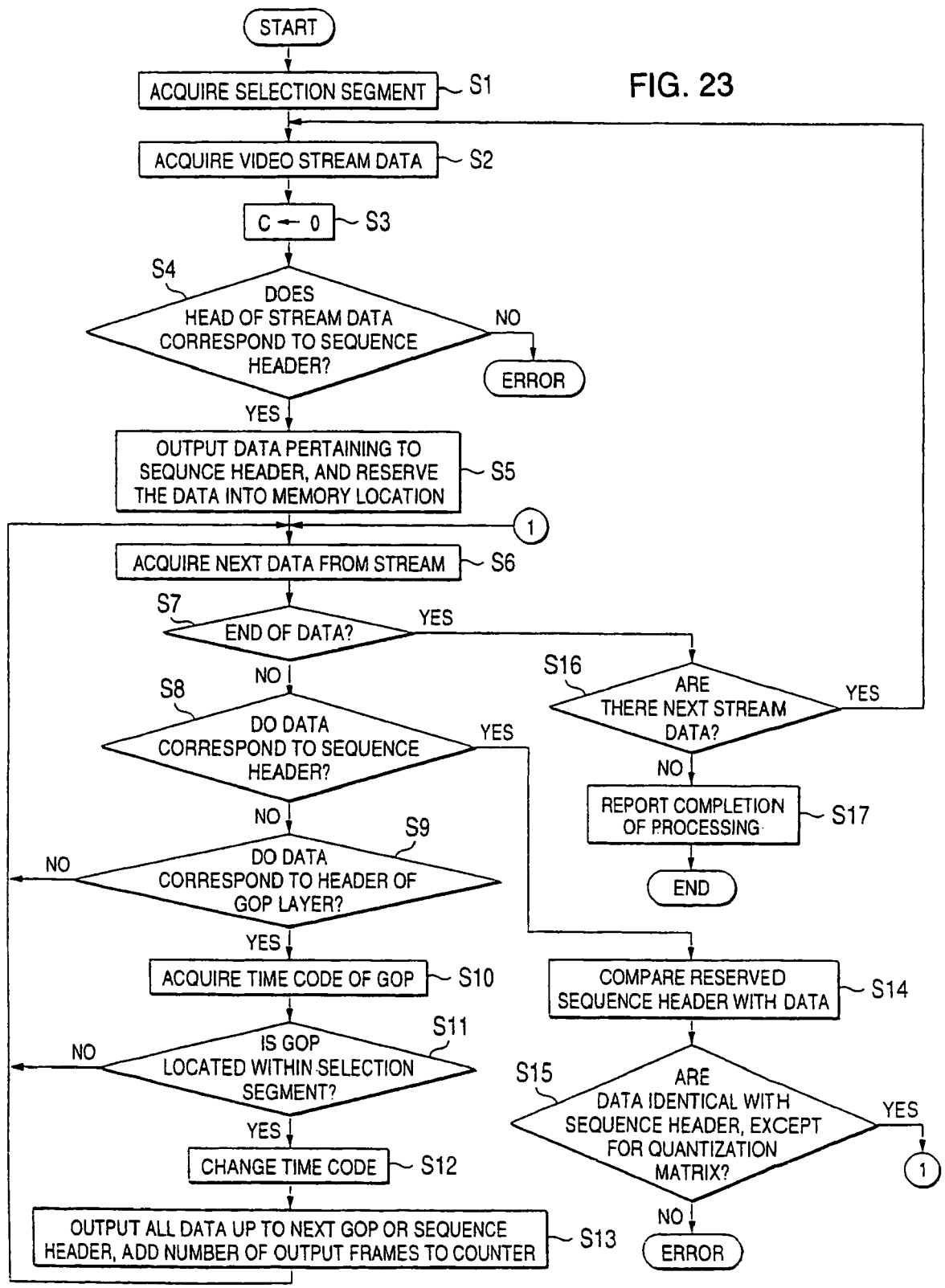
FIG. 23 is a flowchart showing processing effected by video skimming means in the extraction step according to the fifth embodiment.

In the present embodiment, in a case where media content is stored into a plurality of separate files, each of the files is processed in the extraction step 1802. In the formation step 1803, wherein all the relevant video and audio streams of the files of media content are connected together and the thus-connected streams are output, the same advantageous result as that yielded in the formation step 1803 is achieved even when the video and audio streams are multiplexed into a single system stream of MPEG-1 format. In this case, the time code must be changed by the video skimming means 2403 such that the counter C for counting the number of output frames is incremented by only the amount corresponding to the number of video streams. The counter C is initialized at only the beginning of a file (S3 and S18 shown in FIG. 23).

The processing effected by the video skimming means 2403 at this time is provided in the flowchart shown in FIG. 25. Although in the fifth embodiment the context description data and the physical context data are described separately from one another, these data sets may be merged into a single data set by means of appending attributes "seq" and "locator" of the structure description data to the attribute of the element <mediaobject> of the context description data.

Sixth Embodiment

A sixth embodiment of the present invention will now be described by reference to the accompanying drawings. In the present embodiment, a motion picture of MPEG-1 format is taken as media content. In this case, a media segment corresponds to a single scene cut. Further, a score corresponds to the objective degree of contextual importance of a scene of interest.

Figure 26:
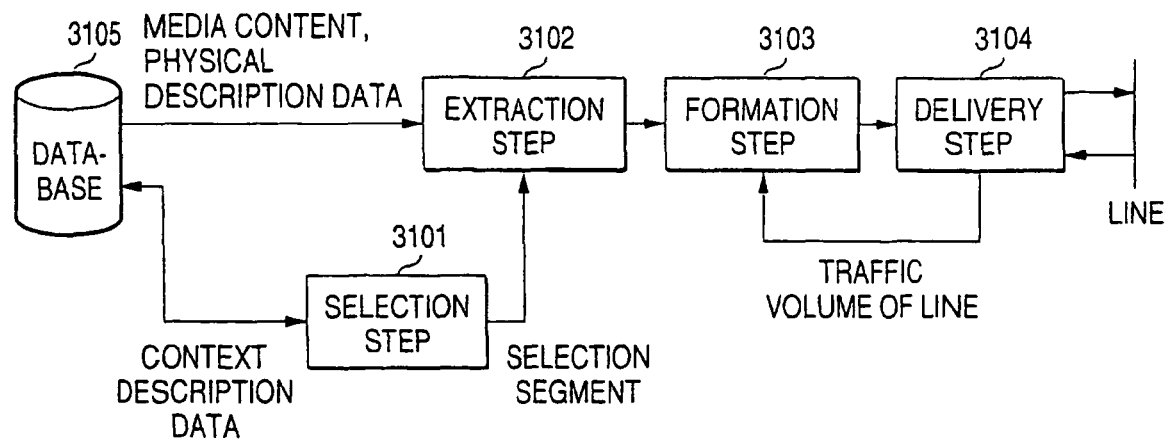
FIG. 26 is a block diagram showing a data processing method according to a sixth embodiment of the present invention.

FIG. 26 is a block diagram showing a media processing method according to the sixth embodiment of the present invention. In FIG. 26, reference numeral 3101 designates a selection step; 3102 designates an extraction step; 3103 designates a formation step; 3104 designates a delivery step; and 3105 designates a database. In the selection step 3101, a scene of media content is selected from context description data, and there are output data pertaining to the start time and the end time of the thus-selected scene, as well as data representing a file where the data are stored. Thus, processing pertaining to the selection step 3101 is identical with that effected in the selection step in the fifth embodiment. In the extraction step 3102, there are received the data sets representing the start time and the end time of the scene and the data representing the file, which are output in the selection step 3101. Further, data pertaining to the segment defined by the start and end time output in the selection step 3101 are extracted from the file of media content, by reference to structure description data. Processing pertaining to the extraction step 3102 is identical with that effected in the extraction step in the fifth embodiment. In the formation step 3103, a portion or the entirety of the stream output in the extraction step 3102 is multiplexed according to the traffic volume determined in the delivery step 3104, thereby constituting a system stream of MPEG-1 format. In the delivery step 3104, the traffic volume of the line over which the system stream of MPEG-1 format is delivered is determined, and the determination result is transmitted for use in the formation step 3103. Further, in the delivery step 3104, the system stream of MPEG-1 format prepared in the formation step 3103 is delivered over the line. Reference numeral 3105 designates a database where media content, structure description data thereof, and context description data are stored.

Figure 27:
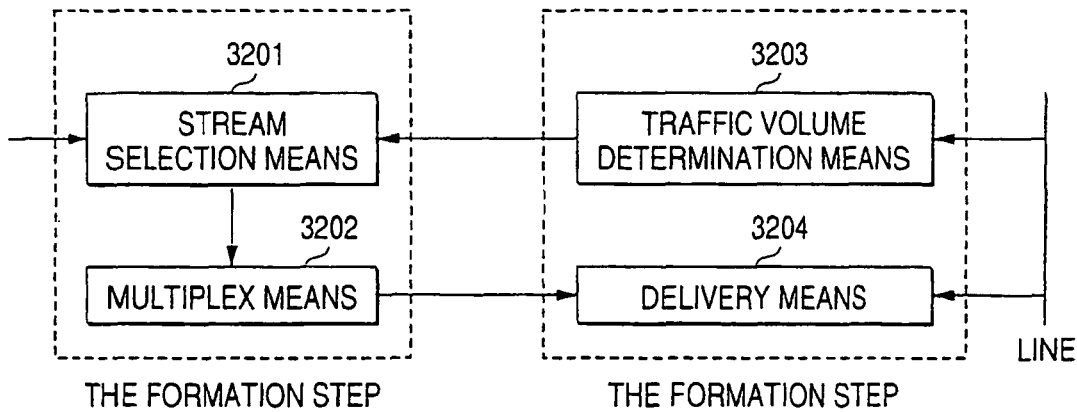
FIG. 27 a block diagram showing the formation step and the delivery step according to the sixth embodiment.

FIG. 27 is a block diagram showing processing performed during the formation step 3103 and the delivery step 3104 according to the sixth embodiment. In FIG. 27, the formation step 3103 is embodied by stream selection means 3201 and multiplex means 3202. The delivery step 3104 is embodied by traffic volume determination means 3203 and delivery means 3204. The stream selection means 3201 receives the video and audio streams output in the extraction step 3102 and the traffic volume output from the traffic volume determination means 3203. If the traffic volume of the line is sufficiently low to allow transmission of all data sets, all the system streams are output to the multiplex means 3202. If a long time is required for transmitting all the data sets due to the line being busy or high traffic volume, only portions of the plurality of audio and video streams are selected and output to the multiplex means 3202. In this case, selection may be implemented in several ways; namely, selection of only the basic layer of the video stream, selection of only monophonic sound of the audio stream, selection of only the left stereo signal of the same, selection of only the right stereo signal of the same, or like selection of a combination thereof. Here, if only a single video stream and a single audio stream exist, the streams are output regardless of the traffic volume. The multiplex means 3202 subjects the video and audio streams output from the stream selection means 3201 to time-division multiplexing, by means of the multiplex method for the MPEG-1 format standardized under International Standard ISO/IEC IS 11172-1. The traffic volume determination means 3203 examines the current state and traffic volume of the line over which streams are transmitted and outputs the results of examination to the stream selection means 3201. The delivery means 3204 delivers over the line the system stream of MPEG-1 format multiplexed by the multiplex means 3202.

In the present embodiment, in a case where a single video stream exists, the stream selection means 3201 outputs the video stream regardless of traffic volume. However, if transmission, over the line, of all the data sets pertaining to the video stream requires a large amount of time, only a representative image of the video stream may be selected and transmitted. At the time of selection of a representative image, a time code of the representative image is described in the context description data. Alternatively, only a single frame, which is called I picture and can be decoded independently, may be selected from among a plurality of frames.

Seventh Embodiment

A seventh embodiment of the present invention will now be described by reference to the accompanying drawings. In the present embodiment, a motion picture of a system stream of MPEG-1 format is taken as media content. In this case, a media segment corresponds to a single scene cut. Further, in the present embodiment, a score corresponds to the objective degree of contextual importance of a scene of interest from the viewpoint of a keyword related to a character or event selected by the user.

Figure 28:
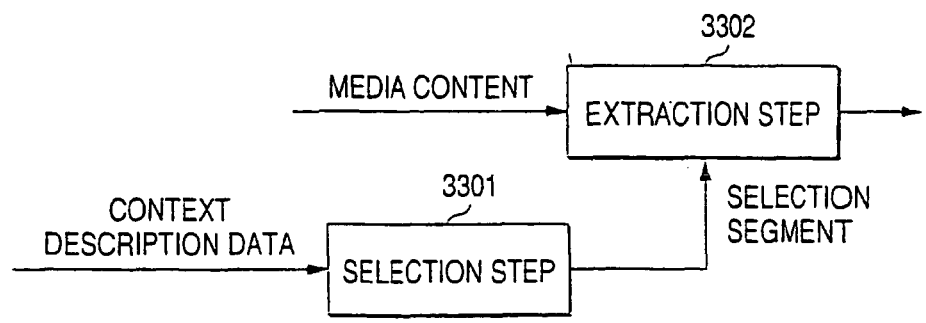
FIG. 28 is a block diagram showing a media processing method according to a seventh embodiment of the present invention.

FIG. 28 is a block diagram showing a processing method according to the seventh embodiment of the present invention. In FIG. 28, reference numeral 3301 designates a selection step; and 3302 designates an extraction step. In the selection step 3301, a scene of media content is selected from context description data by means of a keyword and a score thereof appended to the context description data. Data pertaining to the start time and the end time of the thus-selected scene are output. In the extraction step 3302, data pertaining to the segment defined by the start time and end time output in the selection step 3301 are extracted.

Figure 29:
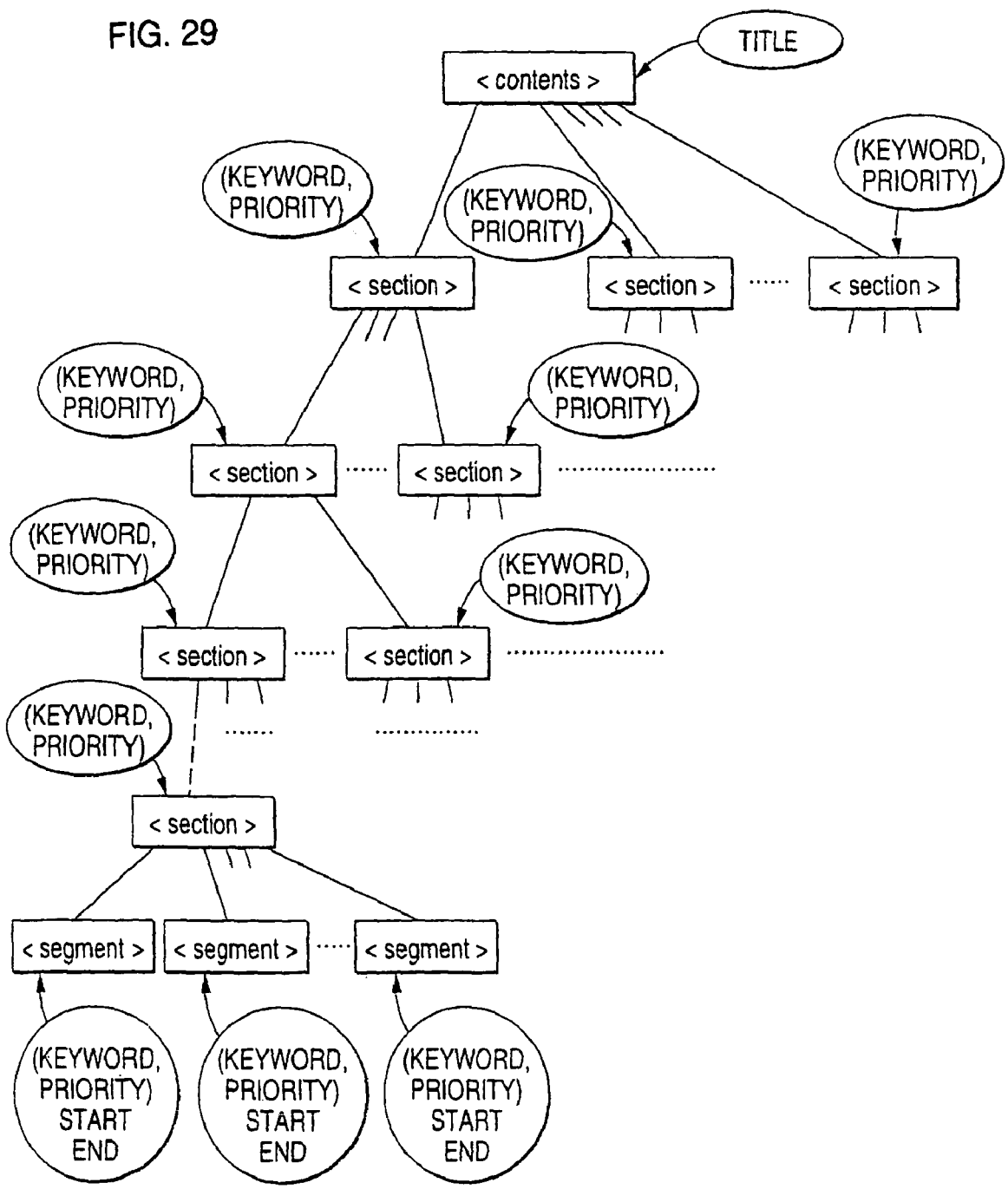
FIG. 29 is a diagram showing the structure of context description data according to the fifth embodiment.

FIG. 29 shows the configuration of the context description data according to the seventh embodiment. In the present embodiment, the context is described according to a tree structure. Elements within the tree structure are arranged in chronological sequence from left to right. In FIG. 29, the root of the tree designated <contents> represents a single portion of content, and the title of the content is assigned to the root as an attribute.

Children of <contents> are designated by <section>. A keyword representing the contents or characters of a scene and priority representing the degree of importance of the keyword are appended to the element <section> as an attribute in the form of a pair of keyword and priority. The priority assumes an integral value ranging from 1 to 5, where 1 designates the least degree of importance and 5 designates the greatest degree of importance. The pair (a keyword and priority) is set so that it can be used as a key for retrieving a particular scene, or characters, as desired by the user. For this reason, a plurality of pairs (each pair including a keyword and priority) may be appended to a single element <section>. For example, in a case where characters are described, pairs are appended to a single element <section>, in a number equal to the number of characters appearing in a scene of interest. The value of the priority appended to the scene is set so as to become greater when a large number of characters appear in a scene of interest.

Children of <section> are designated by <section> or <segment>. Here, an element <section> per se can be taken as a child of another child <section>. However, a single element <section> cannot have a mixture of children <section> and children <segment>.

An element <segment> represents a single scene cut. A pair (a keyword and priority) similar to that appended to the element <section> and time information about a scene of interest; namely, "start" representing the start time and "end" representing the end time, are appended to <segment> as attributes. Scenes may be cut through use of commercially-available software or software available over a network. Alternatively, scenes may be cut manually. Attribute "from" representing the start time of a scene can specify the start frame of a scene of interest. Although in the present embodiment time information is expressed in terms of the start time and the end time of a scene cut, a similar result is realized when time information is expressed in terms of the start time of the scene of interest and a duration of the scene of interest. In this case, the end time of the scene of interest is obtained by addition of the duration to the start time.

In the case of a story such as a movie, chapters, sections, and paragraphs can be described on the basis of the context description data, through use of elements <section>. In another example, when a baseball game is described, elements <section> of the highest hierarchical level may be used for describing innings, and their children <section> may be used for describing half innings. Further, second-generation children <section> of the elements <section> are used for describing at-bats of respective batters. Third-generation children <section> of the elements <section> are also used for describing each pitch, a time period between pitches, and batting results.

The context description data having such a configuration may be expressed in a computer through use of, e.g., Extensible Markup Language (XML). XML is a data description language whose standardization is pursued by the World Wide Web Consortium. Recommendations Ver. 1.0 was submitted on Feb. 10, 1998. Specifications of XML Ver. 1.0 can be acquired from www.w3.org/TR/1998/REC-xml-19980210. Program 02 shows one example of Document Type Definition (DTD) used for describing the context description data of the present embodiment through use of XML, and one example of context description data described through use of DTD. Program 04 shows one example of context description data prepared by addition of representative data (dominant-data) of a media segment, such as a representative image (i.e., video data) and a keyword (audio data), to the context description data shown in Program 02, and a DTD used for describing the context description data through use of XML.

Figure 30:
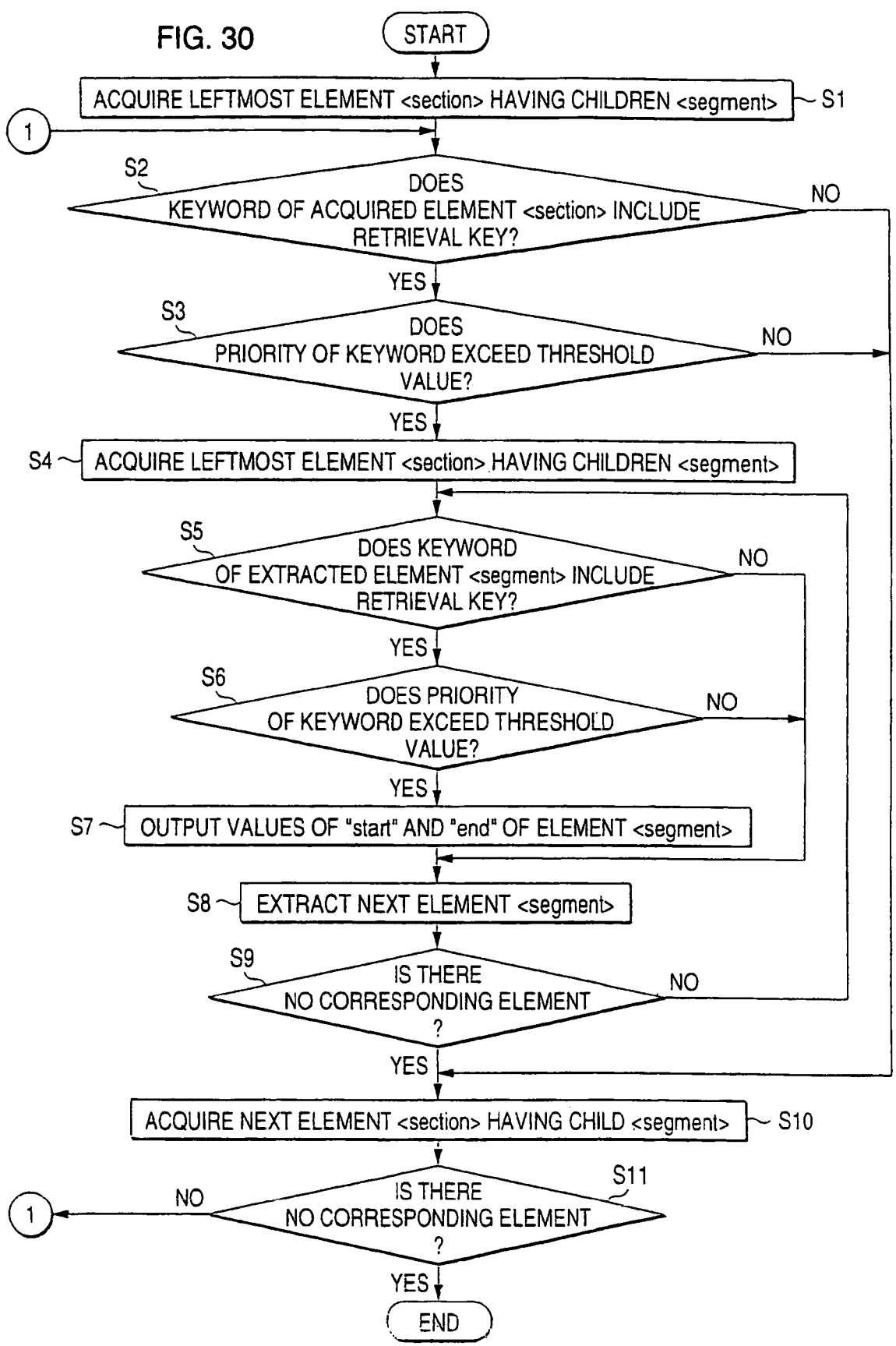
FIG. 30 is a flowchart showing processing pertaining to the selection step according to the seventh embodiment.

Processing relating to the selection step S3301 will now be described. In the present embodiment, processing pertaining to the selection step S3301 is effected by focusing on an element <segment> and an element <section> having children <segment>. FIG. 30 is a flowchart showing processing pertaining to the selection step 3301 according to the seventh embodiment. In the selection step 3301, the keyword, which serves as a key for selecting a scene, and the threshold value of priority thereof are entered, thereby selecting an element <section> which has a keyword identical with the entered key and whose priority exceeds the threshold value from among elements <section> having elements <segment> of context description data as children (S2 and S3). Subsequently, only a child <segment> which has a keyword identical with the key and whose priority exceeds the threshold value is selected from among the children <segment> of the thus-selected element <section> (S5 and S6). The start time and end time of the selected scene are determined from attributes "start" and "end" of the child <segment> selected through the foregoing processing, and the start time and end time are output (S7, S8, S9, S10, S11, S1, and S4).

Although in the present embodiment selection is effected by focusing on an element <segment> and an element <section> having children <segment>, selection may be effected by focusing on another parent-and-child relationship; e.g., an element <section> and its child <section> within a certain hierarchical stratum. Further, the parent-and-child relationship is not limited solely to a two-layer hierarchical stratum. The number of hierarchical levels of the hierarchical stratum may be increased to more than two, and leaves of the tree structure; i.e., descendant <segment>, may be subjected to the same processing. Furthermore, the retrieval key may be set as a pair including a plurality of keywords and conditions defining the relationship between the keywords. Conditions defining the relationship between the keywords comprise combinations, such as "either," "both," or "either or both." The threshold value for selection may be specified, and in the case of a plurality of keywords processing may be performed for each keyword. The keyword serving as a retrieval key may be entered by the user or automatically set by the system on the basis of a user profile.

Processing relating to the extraction step 3302 is identical with that effected in the extraction step described in connection with the first embodiment.

Figure 31:
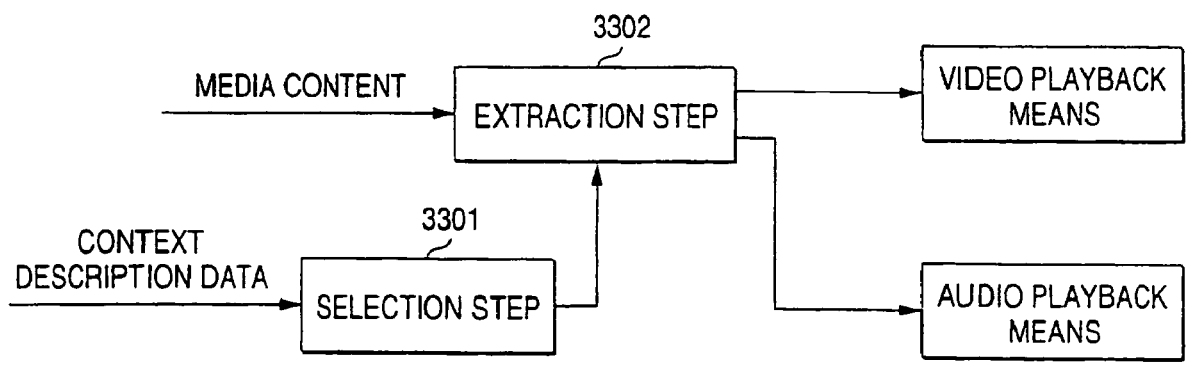
FIG. 31 is a block diagram showing an application of the media processing method according to the seventh embodiment.

As shown in FIG. 31, the present embodiment yields an advantage of the ability to play back only scenes of media content of interest as desired by an audience, by means of inputting the video stream output from the extraction step 3302 into video playback means and the audio stream output from the same into audio playback means, and playing back the audio and video streams, which are mutually synchronized. Further, there can be prepared a system stream of MPEG-1 format relating to a collection of scenes of media content of interest as desired by the audience, by means of multiplexing the video stream and the audio stream.

Eighth Embodiment

An eighth embodiment of the present invention will now be described. The eighth embodiment differs from the seventh embodiment only in terms of the processing relating to the selection step.

Figure 32:
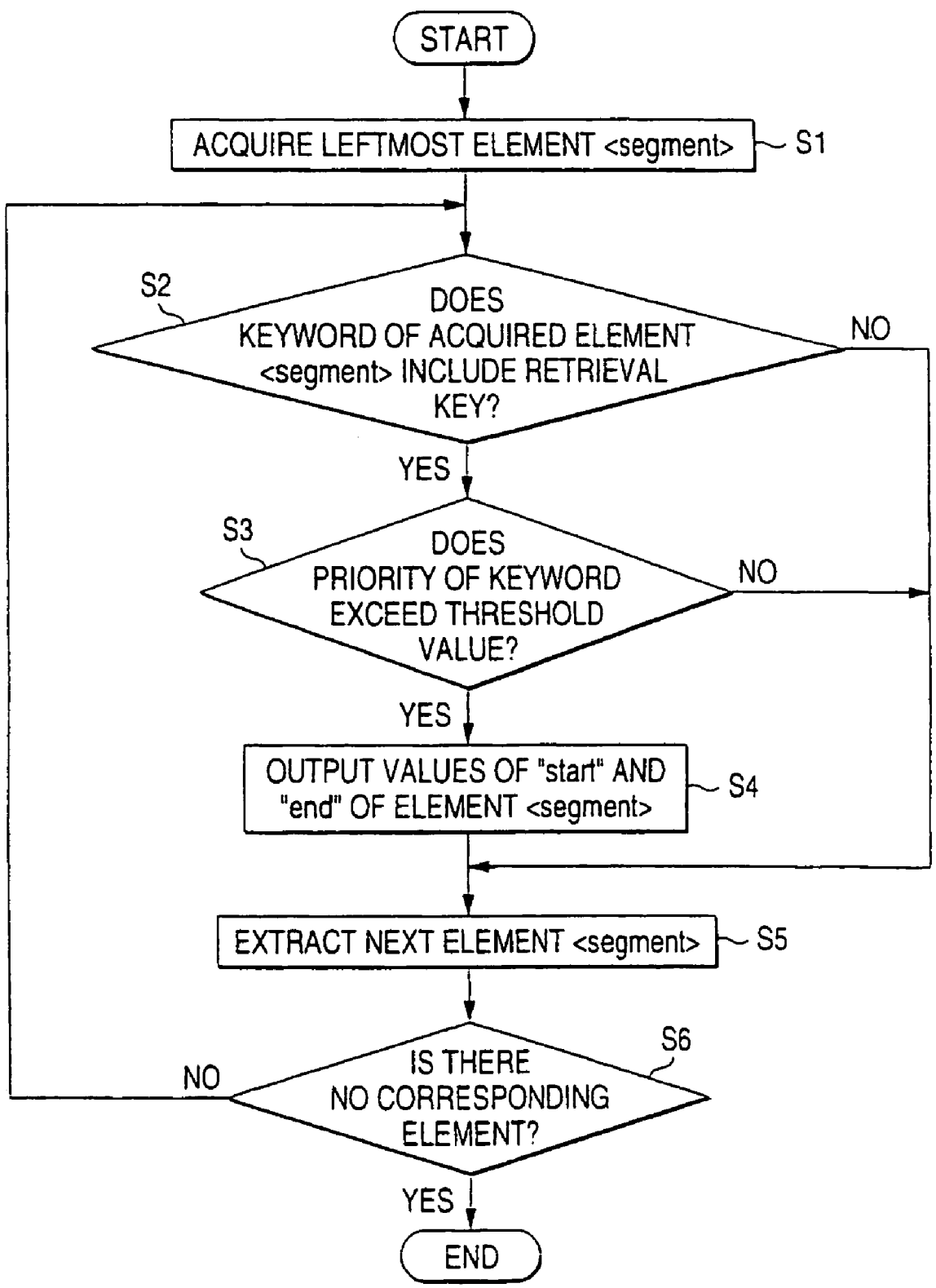
FIG. 32 is a flowchart showing processing pertaining to the selection step according to an eighth embodiment of the present invention.

Processing relating to the selection step S3301 will now be described. In the present embodiment, processing pertaining to the election step S3301 is effected by focusing on only the element <segment>. FIG. 32 is a flowchart showing processing pertaining to the selection step 3301 according to the seventh embodiment. As shown in FIG. 32, in the selection step 3301, the keyword, which serves as a key for selecting a scene, and the threshold value of priority thereof are entered. A child <segment>, which has a keyword identical with the key and whose priority exceeds the threshold value, is selected from among the elements <segment> of context description data (S1 to S6).

Although in the eighth embodiment selection is effected by focusing on only the element <segment>, selection may also be effected by focusing on only an element <section> of a certain hierarchical level. Furthermore, the retrieval key may be set as a pair including a plurality of keywords and conditions defining the relationship between the keywords. Conditions defining the relationship between the keywords comprise combinations, such as "either," "both," or "either or both." The threshold value for selection may be specified, and in the case of a plurality of keywords processing may be performed for each keyword.

Ninth Embodiment

A ninth embodiment of the present invention will now be described. The ninth embodiment differs from the seventh embodiment only in terms of the processing relating to the selection step.

Figure 33:
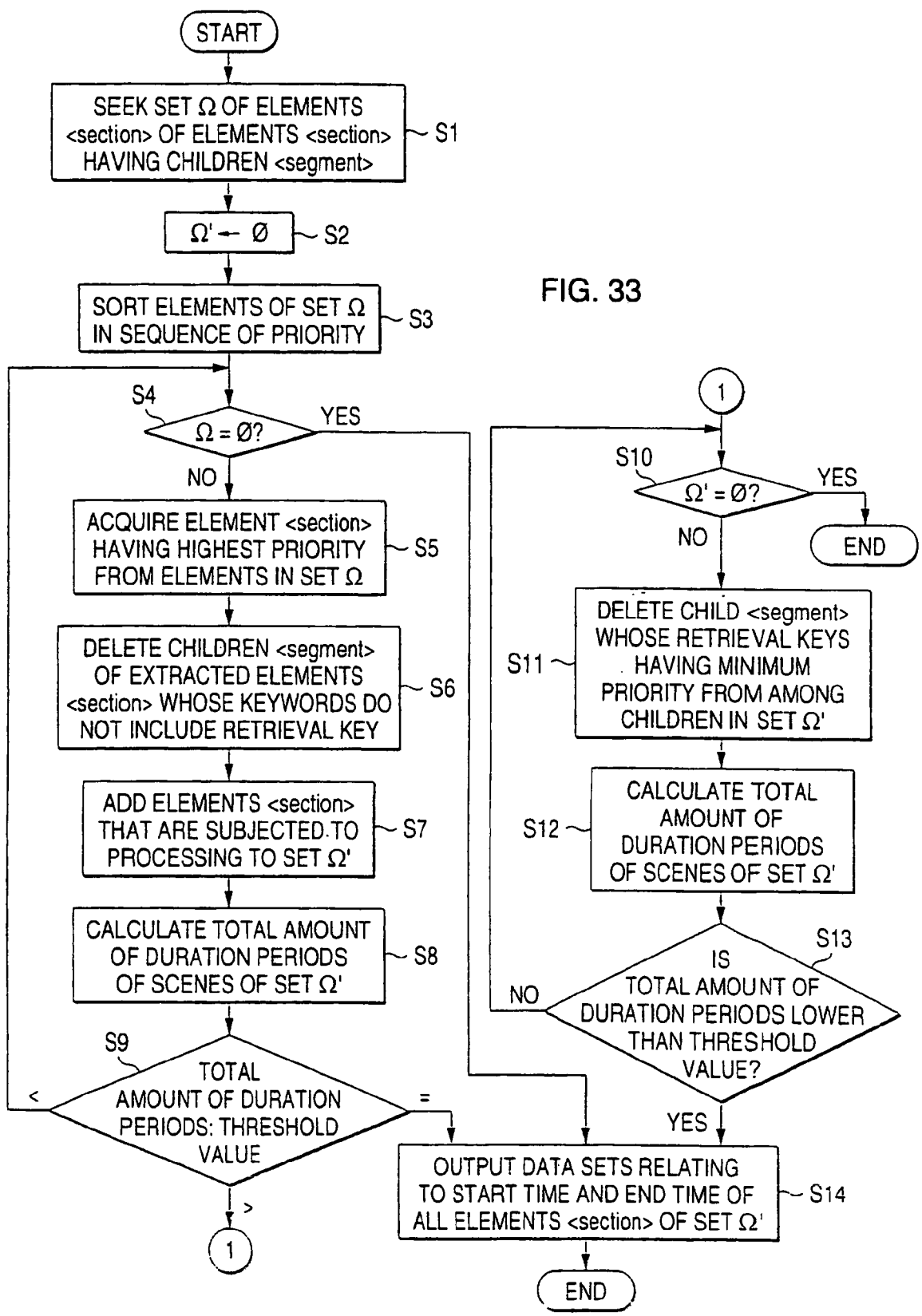
FIG. 33 is a flowchart showing processing pertaining to the selection step according to an ninth embodiment of the present invention.

Processing relating to the selection step S3301 will now be described by reference to the accompanying drawings. As in the case of the processing described in connection with the seventh embodiment, in the selection step 3301 according to the ninth embodiment, selection is effected by focusing on only an element <segment> and an element <section> having children <segment>. In the present embodiment, a threshold value is set with regard to the sum of duration periods of all scenes to be selected; more specifically, selection is effected such that the sum of the duration periods of the scenes that have been selected so far is maximized but remains smaller than the threshold value. FIG. 33 is a flowchart showing processing relating to the selection step according to the ninth embodiment. In the selection step 3301, a single keyword, which serves as a retrieval key, is received. Subsequently, of the elements <section> having children <segment>, all the elements <section> having keywords identical with the retrieval key are extracted. A collection of the thus-selected elements <section> is taken as set Ω (S1 and S2). The elements <section> of the set Ω are sorted in descending order of priority (S3). Subsequently, the element <section> whose keyword or retrieval key has the highest priority value is selected from the thus-sorted elements of the set Ω (S5). The thus-selected element <section> is deleted from the set Ω (S6). In this case, if a plurality of elements <section> have the highest priority value, all the elements <section> are extracted. Of the children <segment> of the thus-selected elements <section>, only the children <segment> having the retrieval keys are selected, and the thus-selected children <segment> are added to another set Ω' (S7). The initial value of the set Ω' is "empty" (S2). The sum of duration periods of scenes pertaining to the set Ω' is obtained (S8), and the sum is compared with a threshold value (S9). If the sum of duration periods is equal to the threshold value, data pertaining to all the segments of the elements <segment> included in the set Ω' are output, and processing is terminated (S14). In contrast, if the sum of duration periods is lower than the threshold value, processing again returns to the selection from the set Ω (S5) of an element <section> whose retrieval key or keyword has the highest priority. The previously-described selection processing is repeated. If the set Ω is empty, data pertaining to all the segments of the elements <segment> of the set Ω' are output, and processing is terminated (S4). If the sum of duration periods of the scenes relating to the set Ω' exceeds the threshold value, the following processing is performed. The element <segment> whose retrieval key or keyword has the minimum priority is deleted from the set Ω' (S11). At this time, if a plurality of elements <segment> have the minimum priority, all the elements <segment> are deleted. The sum of duration periods of the elements <segment> of set Ω' is obtained (S12), and the sum is compared with a threshold value (S13). If the sum of duration periods exceeds the threshold value, processing again returns to deletion of the elements <segment> from the set Ω' (S11). Such deletion processing is performed repeatedly. Here, if the set Ω' is empty, processing is terminated (S10). In contrast, if the sum of duration periods is lower than the threshold value, data pertaining to all the segments of the elements <segment> of the set Ω' are output, and processing is terminated (S14).

Although in the present embodiment selection is effected by focusing on an element <segment> and an element <section> having children <segment>, selection may be effected by focusing on another parent-and-child relationship; e.g., an element <section> and its children <segment> within another hierarchical level. Further, the parent-and-child relationship is not limited solely to a two-layer hierarchical stratum; the number of hierarchical levels of the hierarchical stratum may be increased. For instance, in a case where elements are in the hierarchical layers ranging from an element <section> of the highest hierarchical level to its child <segment> are subjected to processing, the element <section> of the highest hierarchical level is selected. Further, a successor <section> of the thus-selected element <section> is selected, and a second-generation child of the thus-selected element <section> is further selected. Such a round of selection operations is repeated until the child <segment> is selected. The thus-selected elements <segment> are collected into a set Ω'.

In the present embodiment, elements are sorted in descending order of priority of the retrieval key or keyword. A threshold value may be set with regard to the priority value, and elements may be selected in descending order of priority. The threshold value may be separately set with regard to the element <section>, as well as with regard to the element <segment>.

In the present embodiment, the retrieval key is specified as a single keyword. However, the retrieval key may be set as a pair including a plurality of keywords and conditions defining the relationship between the keywords. Conditions defining the relationship between the keywords comprise combinations, such as "either," "both," or "either or both." In this case, there is required a rule for determining the priority of keywords used in selection or deletion of elements <section> and elements <segment>. One example of such a rule is as follows: If the condition is "either," the highest priority value of the priority values of corresponding keywords is set as "priority." Further, if the condition is "both," the minimum priority value of the priority value of corresponding keywords is set as "priority." Even when the condition is "either or both," the priority value can be determined in accordance with this rule. Further, in a case where a plurality of retrieval keys or keywords exist, a threshold value may be set with regard to the priority of the keywords as the retrieval keys, and elements whose priority value exceeds the threshold value may be processed.

Tenth Embodiment

A tenth embodiment of the present invention will now be described. The tenth embodiment differs from the seventh embodiment only in terms of the processing relating to the selection step.

Figure 34:
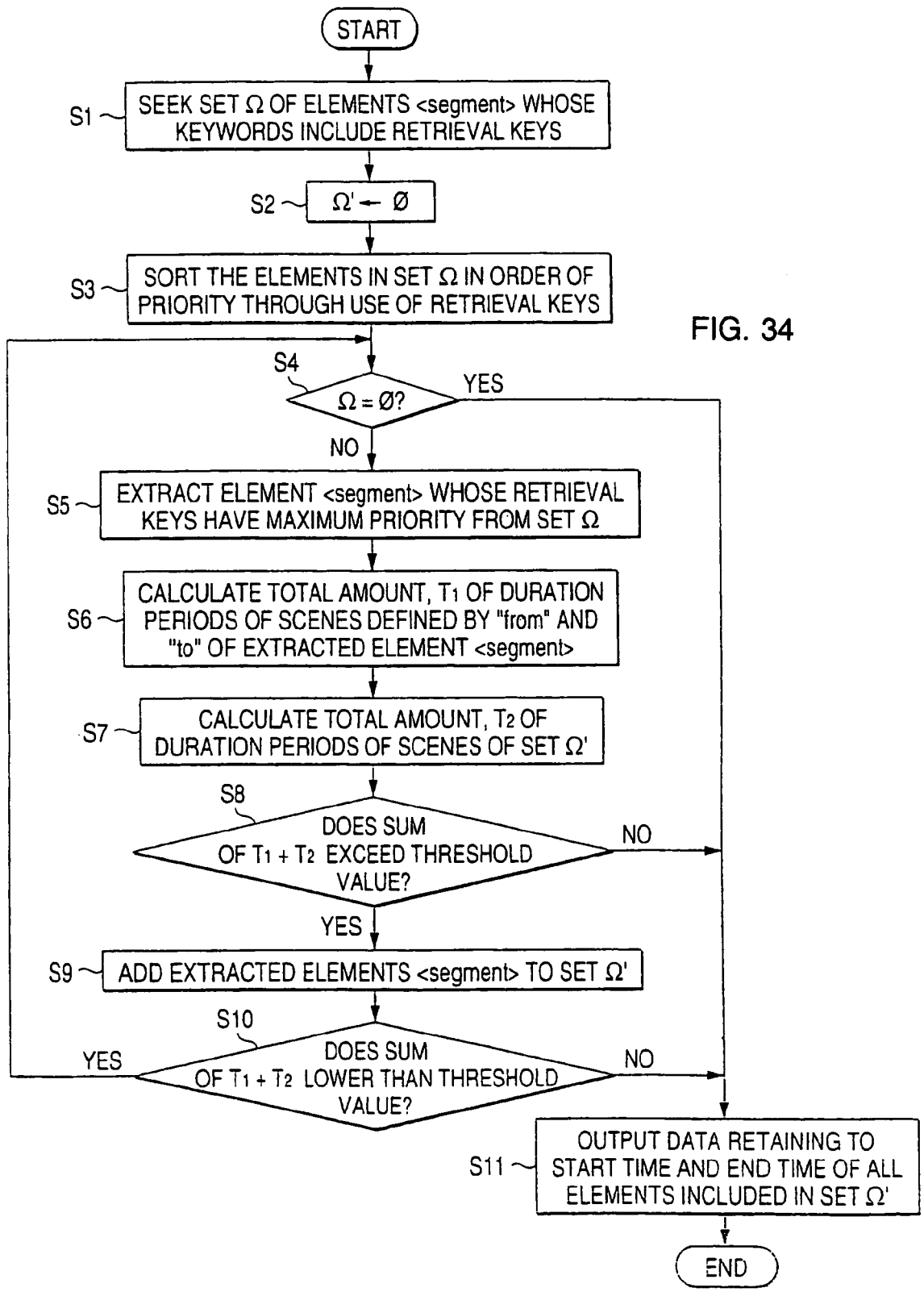
FIG. 34 is a flowchart showing processing pertaining to the selection step according to a tenth embodiment of the present invention.

Processing relating to the selection step S3301 will now be described by reference to the accompanying drawings. As in the case of the processing described in connection with the eighth embodiment, in the selection step 3301 according to the tenth embodiment, selection is effected by focusing on only an element <segment>. Further, as in the case of the ninth embodiment, in the present embodiment a threshold value is set with regard to the sum of duration periods of all scenes to be selected. Specifically, an element is selected such that the sum of duration periods of scenes which have been selected so far is maximized but remains lower than the threshold value. FIG. 34 is a flowchart showing processing relating to the selection step according to the tenth embodiment.

In the selection step 3301, a single keyword, which serves as a retrieval key, is received. The set Ω' is initialized to "empty" (S2). Subsequently, of the elements <segment>, all the elements <segment> having keywords identical with the retrieval key are extracted (S1). A collection of the thus-selected elements <segment> is taken as set Ω. Subsequently, the elements <segment> whose keyword as the retrieval key has the highest priority value are sorted in descending order of priority (S3). From the thus-sorted elements of the set Ω, the element <segment> whose retrieval key as the keyword has the highest priority value is extracted (S5), and the thus-extracted element <segment> is deleted from the set Ω. In this case, if a plurality of elements <segment> have the highest priority value, all the elements <segment> are selected. If the set Ω is empty, data pertaining to all the segments of the elements <segment> of the set Ω' are output, and processing is terminated (S4). A sum, T1, of duration periods of the thus-extracted elements <segment> is computed (S6), and a sum, T2, of duration periods of scenes of the set Ω' is computed (S7). The sum of T1 and T2 is compared with the threshold value (S8). If the sum of T1 and T2 exceeds the threshold value, data pertaining to all the segments of the elements <segment> included in the set Ω' are output, and processing is terminated (S11). If the sum of T1 and T2 equals the threshold value, all the extracted elements <segment> are added to the elements of the set Ω' (S9 and S10), data pertaining to all the segments of the elements <segment> included in the set Ω' are output, and processing is terminated (S11). In contrast, if the sum of T1 and T2 is lower than the threshold value, all the extracted elements <segment> are added to the elements of the set Ω', and processing then returns to selection of elements <segment> from the set Ω (S10).

Although in the present embodiment selection is effected by focusing on the elements <segment>, selection may be effected by focusing on elements <section> in another hierarchical level. In the present embodiment, elements are sorted in descending order of priority of the keyword as the retrieval key. A threshold value may be set with regard to the priority value, and elements may be selected in descending order of priority, given that the priority values of the elements are greater than the threshold value.

Further, in the present embodiment, the retrieval key is specified as a single keyword. However, the retrieval key may be set as a pair including a plurality of keywords and conditions defining the relationship between the keywords. Conditions defining the relationship between the keywords comprise combinations, such as "either," "both," or "either or both." In this case, there is required a rule for determining the priority of keywords used in selection or deletion of elements <section> and <segment>. One example of such a rule is as follows: If the condition is "either," the highest priority value of the priority values of corresponding keywords is set as "priority." Further, if the condition is "both," the minimum priority value of the priority value of corresponding keywords is set as "priority." Even when the condition is "either or both," the priority value can be determined in accordance with this rule. Further, in a case where a plurality of retrieval keys or keywords exist, a threshold value may be set with regard to the priority of the retrieval keys or keywords, and elements whose priority value exceed the threshold value may be processed.

Eleventh Embodiment

Figure 65:
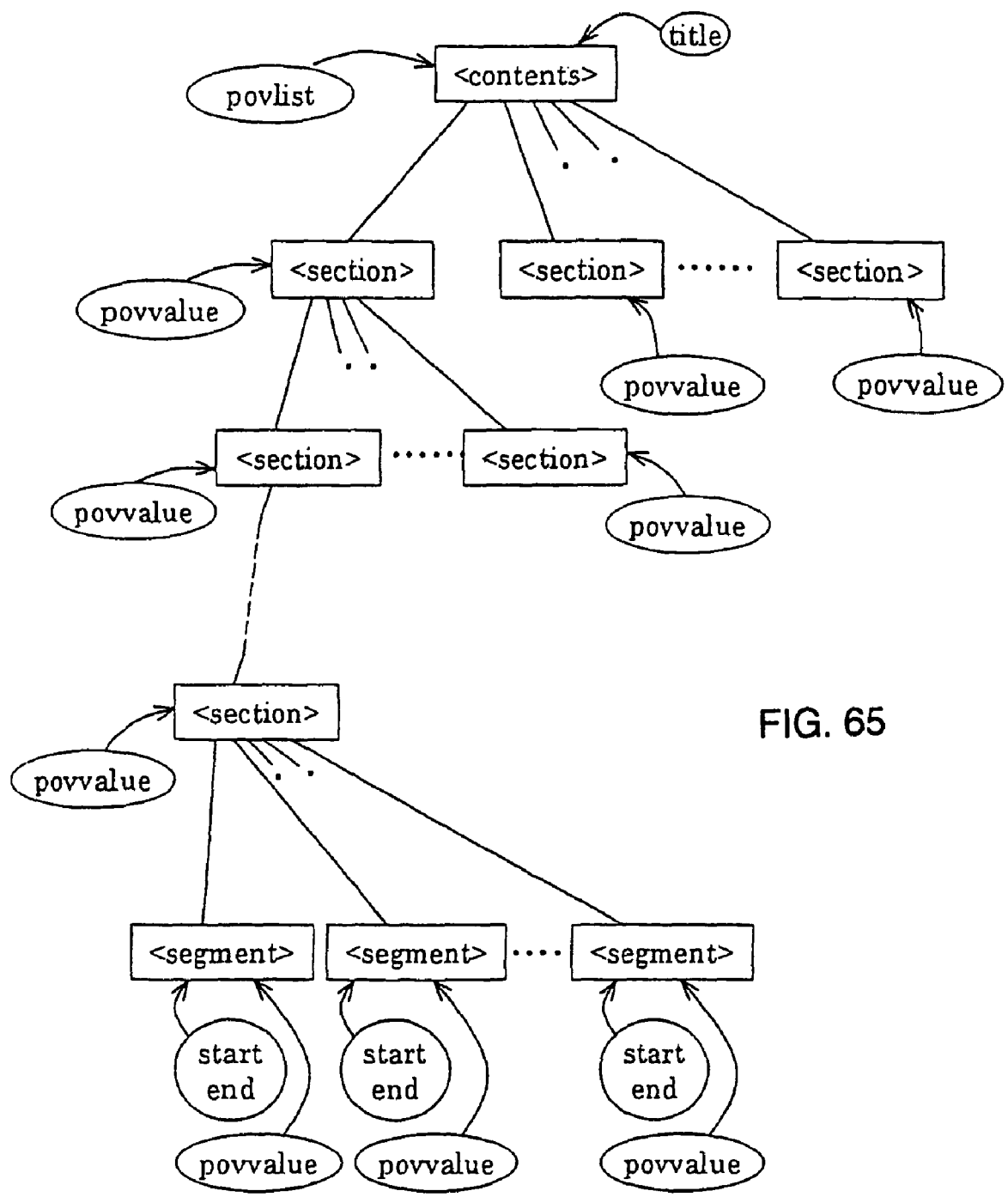
FIG. 65 is an illustration showing the structure of context description data according to an eleventh embodiment of the present invention.

An eleventh embodiment of the present invention will now be described. The context description data of the present embodiment differs from those of the seventh through tenth embodiments, in terms of a viewpoint—which serves as a keyword to be used for selecting a scene—and the description of degree of importance of the viewpoint. As shown in FIG. 29, in the seventh through tenth embodiments, the viewpoint and the degree of importance based thereon are described by assigning a combination of a keyword and the degree of importance; i.e., (keyword, priority), to an element <section> or <segment>. In contrast, as shown in FIG. 65, according to the eleventh embodiment, the viewpoint and the degree of importance thereof are described by assigning an attribute "povlist" to the root <contents> and assigning an attribute "povvalue" to an element <section> or <segment>.

Figures 66, 67:
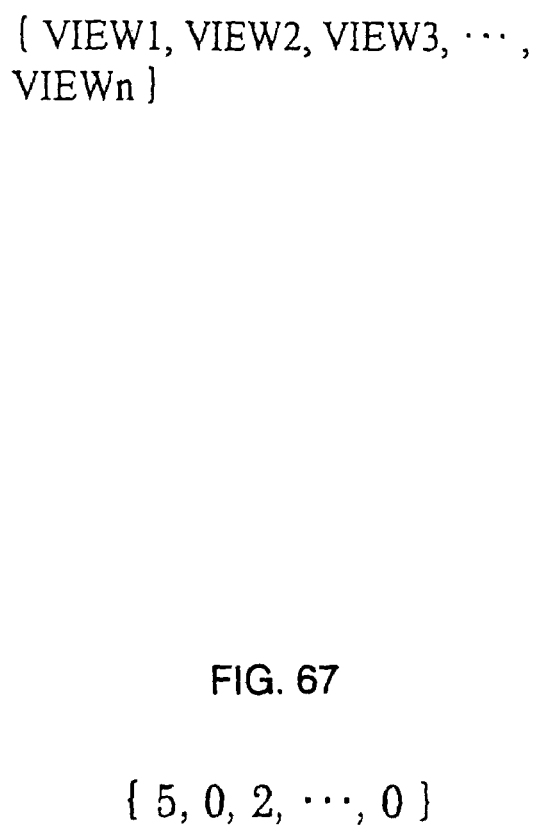

As shown in FIG. 66, the attribute "povlist" corresponds to a viewpoint expressed in the form of a vector. As shown in FIG. 67, the attribute "povvalue" corresponds to the degree of importance expressed in the form of a vector. Combination sets, each set comprising a viewpoint and the degree of importance thereof in a one-to-one relationship, are arranged in sequence given, thus forming the attributes "povlist" and "povvalue." For instance, in illustrations shown in FIGS. 66 and 67, the degree of importance pertaining to viewpoint 1 assumes a value of 5, the degree of importance pertaining to viewpoint 2 assuming a value of 0; the degree of importance pertaining to viewpoint 3 assuming a value of 2; and the degree of importance pertaining to viewpoint "n" (where "n" designates a positive integer) assuming a value of 0. In the case of the seventh embodiment, the degree of importance pertaining to viewpoint 2 assuming a value of 0 means that viewpoint 2 is not assigned a keyword; i.e., a combination (keyword, priority).

Program 10 and Program 11 show examples of Document Type Definition (DTD) used for describing the context description data of the present embodiment, through use of Extensible Markup Language (XML) to be used in expressing the context description data in a computer, and an example of context description data described in DTD. Even in the present embodiment, those processing operations which are the same as those described in connection with the seventh through tenth embodiments are effected through use of the context description data.

Figure 68:
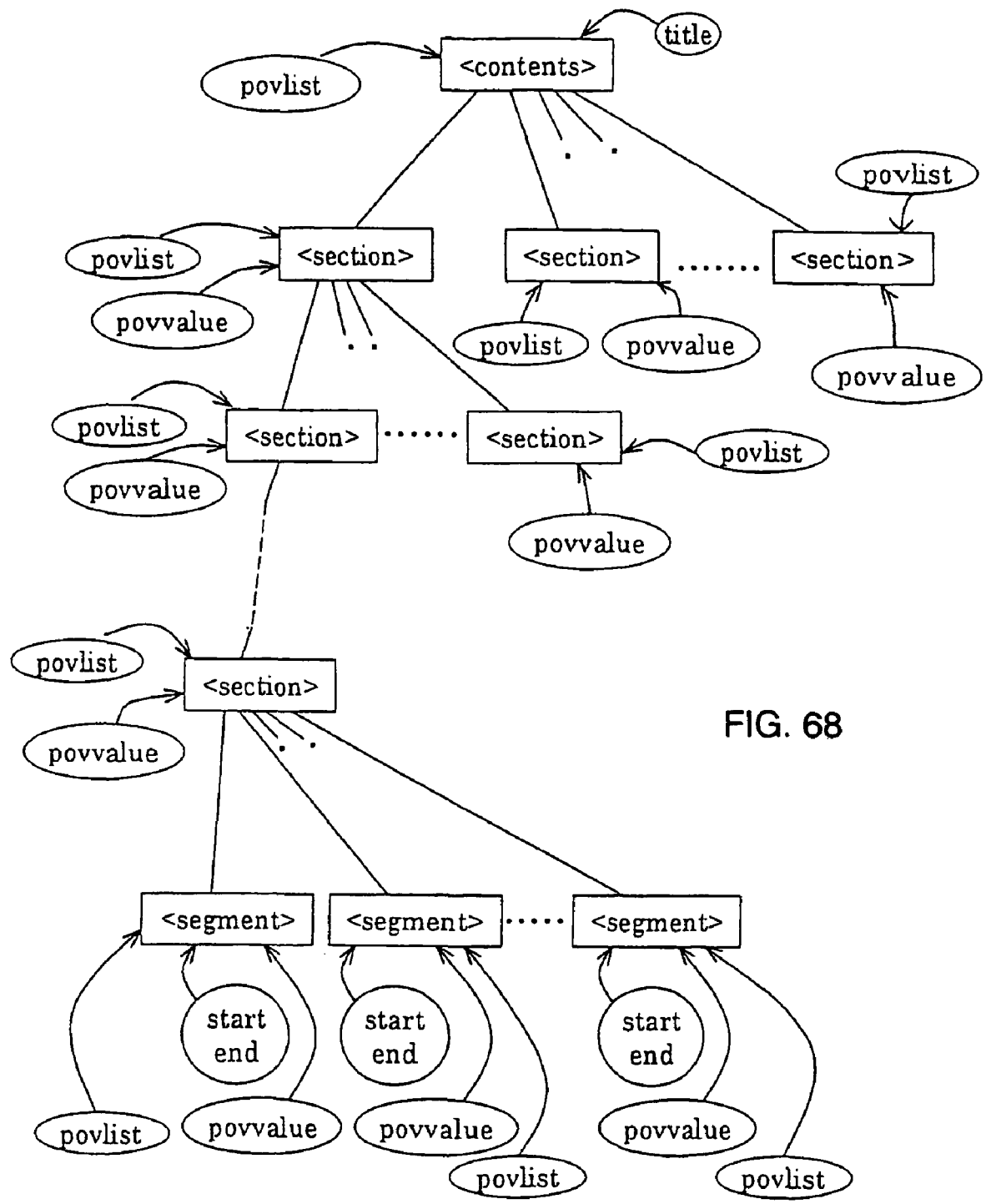
FIG. 68 is an illustration showing another structure of context description data according to an eleventh embodiment of the present invention.

In the present embodiment, the attribute "povlist" is assigned to the root <contents>, and the attribute "povvalue" is appended to an element <section> or <segment>. As shown in FIG. 68, the attribute "povlist" may also be appended to an element <section> or <segment>. In the case of an element <section> or <segment> assigned the attribute "povlist," the attribute "povvalue" corresponds to the attribute "povlist" assigned to the element <section> or <segment>. In the case of the element <section> or <segment> which is not assigned the attribute "povlist," the attribute "povvalue" corresponds to the attribute "povlist" assigned to the root <contents> or the attribute "povlist" of the closest element <section> assigned the attribute "povlist" from among the ancestors of an element <section> or <segment> which is not assigned the attribute "povlist."

Program 12 and Program 13 show an example of DTD which corresponds to that shown in FIG. 68 and is used for describing the context description data of the present embodiment through use of XML to be used in expressing the context description data in a computer, and an example of context description data described in DTD. In these illustrated examples, the attribute "povvalue" assigned to an element <section> or <segment> corresponds to the attribute "povlist" assigned to the root <contents>.

Twelfth Embodiment

A twelfth embodiment of the present invention will now be described by reference to the accompanying drawings. In the present embodiment, a motion picture of a system stream of MPEG-1 format is taken as media content. In this case, a media segment corresponds to a single scene cut.

Figure 35:
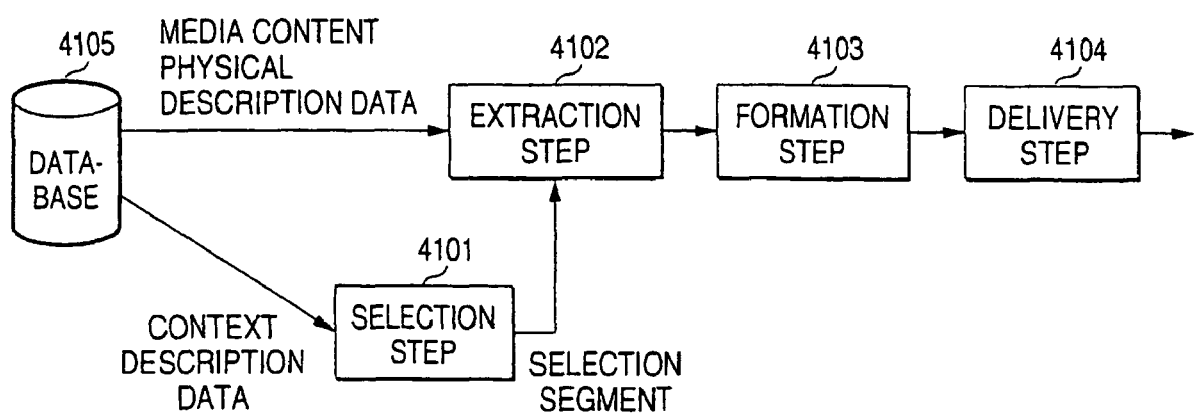
FIG. 35 is a block diagram showing a data processing method according to a twelfth embodiment of the present invention.

FIG. 35 is a block diagram showing a media processing method according to the twelfth embodiment of the present invention. In FIG. 35, reference numeral 4101 designates a selection step; 4102 designates an extraction step; 4103 designates a formation step; 4104 designates a delivery step; and 4105 designates a database. In the selection step 4101, a scene of media content is selected from context description data, and there are output data pertaining to the start time and the end time of the thus-selected scene, as well as data representing a file where the data are stored. In the extraction step 4102, there are received the data sets representing the start time and the end time of the scene and the data sets representing the file output in the selection step 4101. By reference to the structure description data, data pertaining to the segment defined by the start and end time received in the selection step 4101 are extracted from the file of media content. In the formation step 4103, the data output in the extraction step 4102 are multiplexed, thus configuring a system stream of MPEG-1 format. In the delivery step 4104, the system stream of MPEG-1 format prepared in the formation step 4103 is delivered over a line. Reference numeral 4105 designates a database where media content, structure description data thereof, and context description data are stored.

The configuration of structure description data employed in the twelfth embodiment is identical with that described in connection with the fifth embodiment. More specifically, the structure description data having a configuration shown in FIG. 18 are used.

Figure 36:
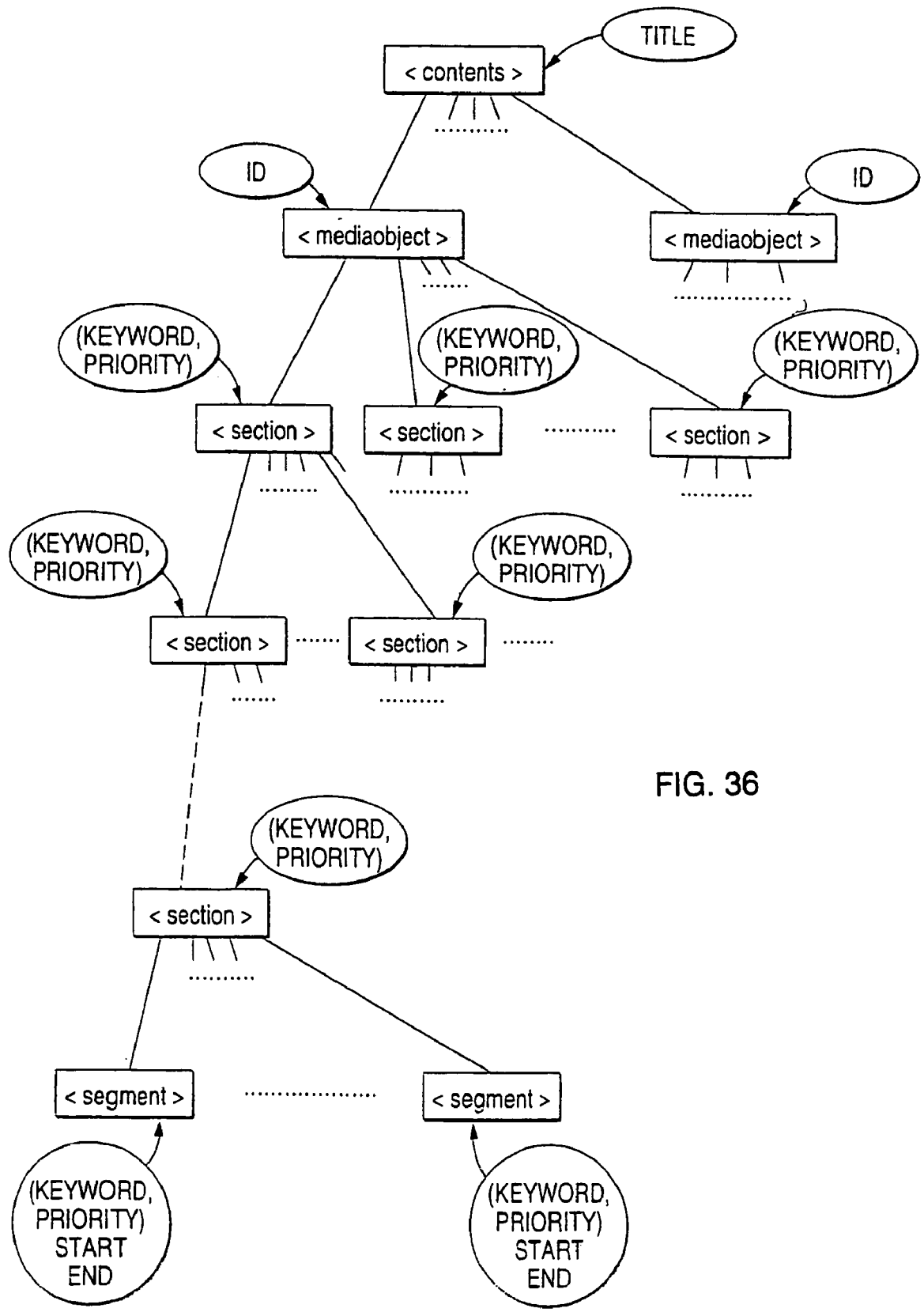
FIG. 36 is a diagram showing the structure of context description data according to the twelfth embodiment.

FIG. 36 shows the configuration of the context description data according to the twelfth embodiment. The context description data of the present embodiment corresponds to the context description data of the seventh embodiment appended a link to the element <mediaobject> of the structure description data. More specifically, the root <contents> of the context description data has a child <mediaobject>, and the element <mediaobject> has a child <section>. Elements <section> and <segment> are identical with those used in the seventh embodiment. The element <mediaobject> of the context description data is appended an attribute "id." The element <mediaobject> of the structure description data is associated with the element <mediaobject> of the context description data, by means of the attribute "id." Scenes of the media content described by means of decendants of the element <mediaobject> of the context description data are stored in a file designated by the element <mediaobject> of the structure description data having an attribute "id" of the same value. Further, time information "start" and "end" assigned to an element "segment" set the time which has elapsed from the head of each file. Specifically, in a case where a single piece of media content comprises a plurality of files, the time at the head of each file corresponds to 0, and the start time of each scene is represented by the time which has elapsed from the head of the file to a scene of interest.

The structure description data and the context description data may be expressed in a computer through use of, e.g., Extensible Markup Language (XML). Program 06 used in connection with the fifth embodiment shows one example of the structure description data. Further, Program 08 shows one example of Document Type Definition (DTD) used for describing the context description data shown in FIG. 36 through use of XML, and one example of context description data described through use of the DTD.

Processing relating to the selection step 4101 will now be described. In the selection step 4101, any one of the methods described in connection with the seventh through tenth embodiments is adopted as a method of selecting a scene. The "id" of the element <mediaobject> of corresponding structure description data is eventually output simultaneously with output of the start time and the end time of a selected scene. In a case where the structure description data are described in the form of an XML document through use of the DTD shown in Program 06 and where the context description data are described in the form of an XML document through use of the DTD shown in Program 08, one example of data output from the selection step 4101 is the same as that shown in Program 07.out in connection with the fifth embodiment.

Processing relating to the extraction step 4102 is identical with the extraction step described in connection with the fifth embodiment. The processing relating to the formation step 4103 is also identical with the formation step described in connection with the fifth embodiment. Further, processing pertaining to the delivery step 4104 is also identical with the delivery step described in connection with the fifth embodiment.

Thirteenth Embodiment

A thirteenth embodiment of the present invention will now be described by reference to the accompanying drawings. In the present embodiment, a motion picture of a system stream of MPEG-1 format is taken as media content. In this case, a media segment corresponds to a single scene cut.

Figure 37:
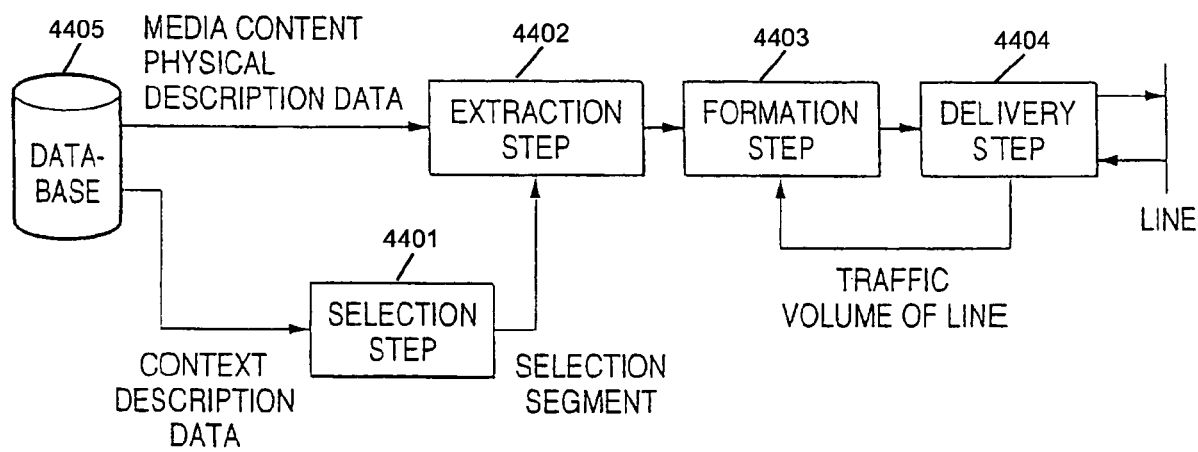
FIG. 37 is a block diagram showing a data processing method according to a thirteenth embodiment of the present invention.

FIG. 37 is a block diagram showing a media processing method according to the thirteenth embodiment of the present invention. In FIG. 37, reference numeral 4401 designates a selection step; 4402 designates an extraction step; 4403 designates a formation step; 4404 designates a delivery step; and 4405 designates a database. In the selection step 4401, a scene of media content is selected from context description data, and there are output data pertaining to the start time and the end time of the thus-selected scene, as well as data representing a file where the data are stored. Processing relating to the selection step 4401 is identical with that relating to the selection step described in connection with the twelfth embodiment. In the extraction step 4402, there are received the data sets representing the start time and the end time of the scene and the data sets representing the file output in the selection step 4401. By reference to the structure description data, data pertaining to the segment defined by the start and end time received in the selection step are extracted from the file of media content. Processing relating to the extraction step 4402 is identical with that relating to the extraction step described in connection with the twelfth embodiment. In the formation step 4403, a portion or the entirety of the system stream output in the extraction step 4402 is multiplexed in accordance with the traffic volume of the line determined in the delivery step 4404, thus configuring the system stream of MPEG-1 format. Processing relating to the formation step 4403 is identical with that relating to the extraction step described in connection with the sixth embodiment. In the delivery step 4404, the traffic volume of the line is determined, and the determination result is transmitted to the formation step 4403. Further, the system stream of MPEG-1 format prepared in the formation step 4403 is delivered over the line. Processing relating to the formation step 4404 is identical with that relating to the formation step described in connection with the sixth embodiment. Reference numeral 4405 designates a database where media content, structure description data thereof, and context description data are stored.

Although in the thirteenth embodiment the system stream of MPEG-1 is taken as media content, the same advantageous result as that yielded by the MPEG-1 system stream can be yielded even by use of another format, so long as the format permits obtaining of a time code for each screen.

Embodiments, which will be provided below, describe abstracts of modes corresponding to the inventions claimed in appended claims. An expression "sound data" will be hereinafter used as data pertaining to sound comprising audible tones, silence, speech, music, tranquility, external noise or like sound. An expression "video data" will be hereinafter used as data which are audible and visible, such as a motion picture, a static image, or characters such as telops. An expression "score" will be hereinafter used as a score to be calculated from the contents of sound data, such as audible tones, silence, speech, music, tranquillity, or external noise; a score to be assigned in accordance with presence or absence of telops in the video data; or a combination thereof. Further, a score other than those mentioned above may also be used.

Fourteenth Embodiment

Figure 38:
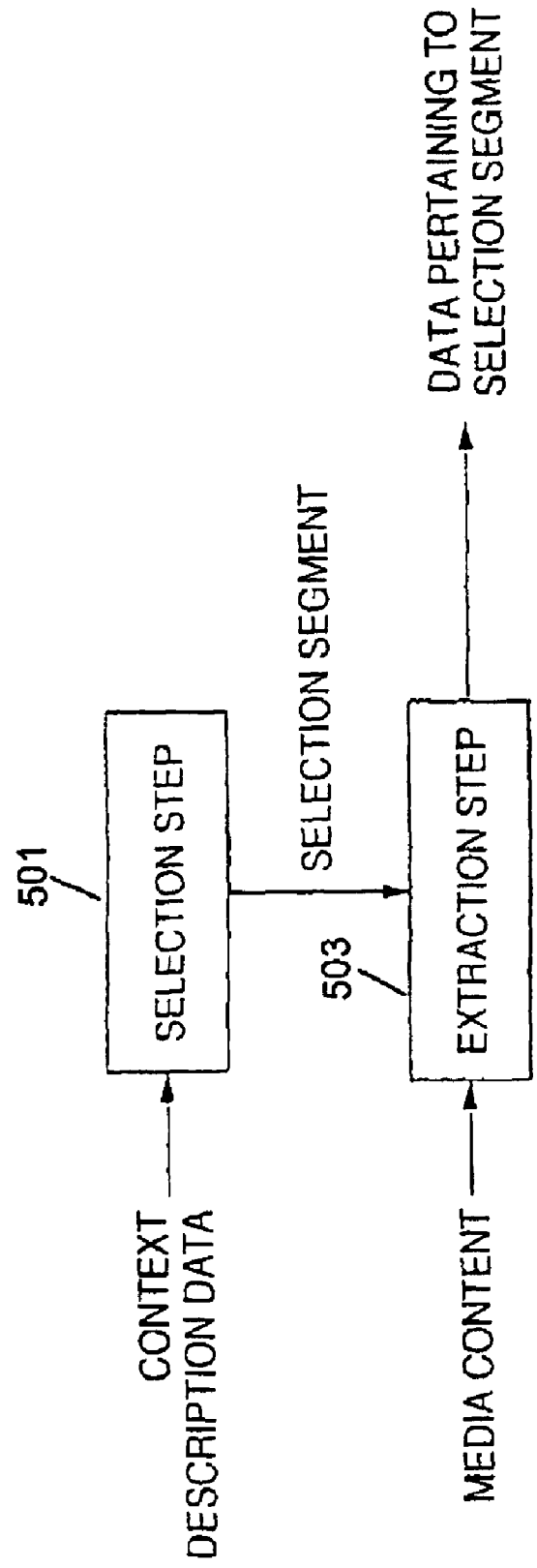
FIG. 38 is a block diagram showing a data processing method according to a fourteenth embodiment of the present invention.

A fourteenth embodiment of the present invention will now be described. FIG. 38 is a block diagram showing processing pertaining to a data processing method of the present embodiment. In the drawing, reference numeral 501 designates a selection step; and 503 designates an extraction step. In the selection step 501, at least one segment or scene of media content is selected on the basis of a score of context description data, and the thus-selected segment or scene is output. The selected segment corresponds to, for example, the start time and end time of a selected segment. In the extraction step 503, only the data pertaining to a segment of media content (hereinafter referred to as a "media segment") partitioned by the segment selected in the selection step S501; namely, the data pertaining to the selected segment, are extracted.

Particularly, a score corresponds to the objective degree of contextual importance of a scene of interest from the viewpoint of a keyword related to a character or event selected by the user.

Fifteenth Embodiment

Figure 39:
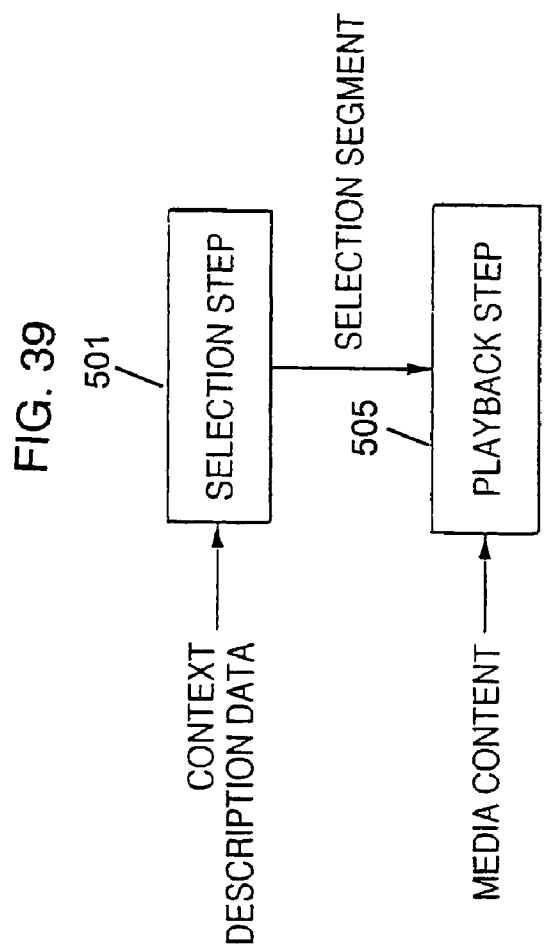
FIG. 39 is a block diagram showing a data processing method according to a fifteenth embodiment of the present invention.

A fifteenth embodiment of the present invention will now be described. FIG. 39 is a block diagram showing processing pertaining to a data processing method of the present embodiment. In the drawing, reference numeral 501 designates a selection step; and 505 designates a playback step. In the playback step 505, only the data pertaining to the segment partitioned by a selected segment output in the selection step 501 are played back. Processing pertaining to the selection step 501 is the same as that described in connection with the first through thirteenth embodiments, and hence repetition of its explanation is omitted here for brevity.

Sixteenth Embodiment

Figure 40:
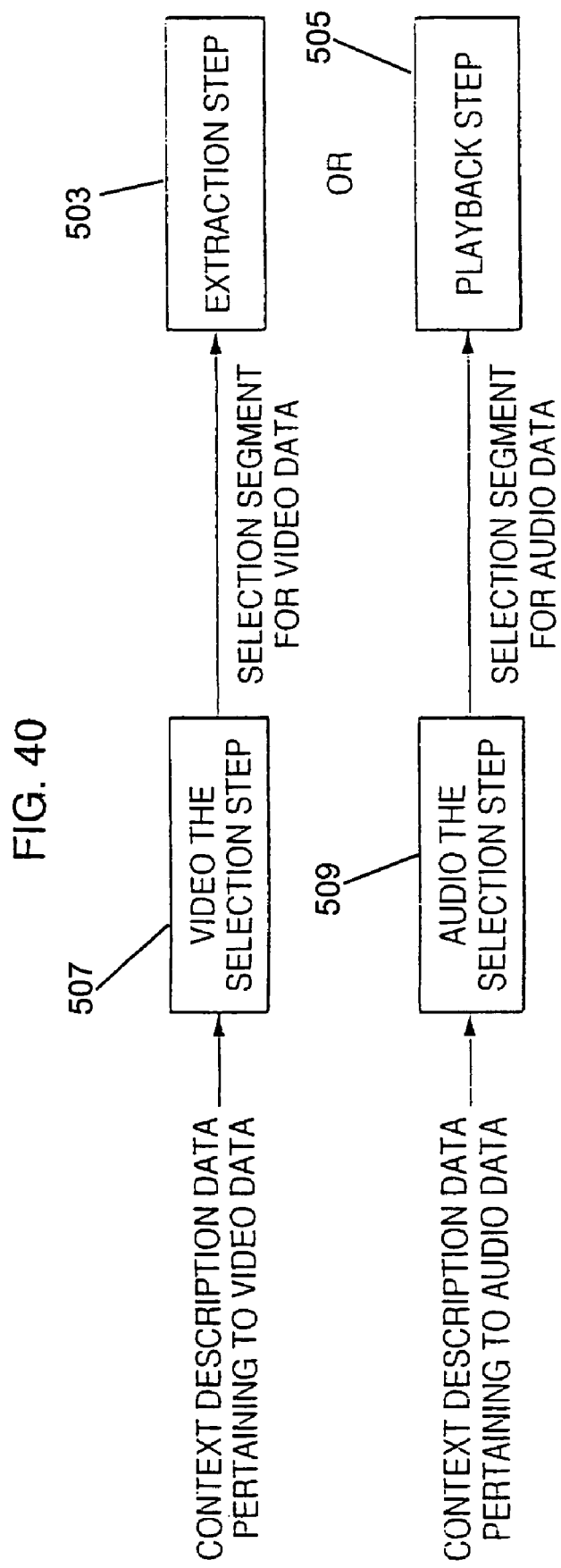
FIG. 40 is a block diagram showing a data processing method according to a sixteenth embodiment of the present invention.

A sixteenth embodiment of the present invention will now be described. FIG. 40 is a block diagram showing processing pertaining to a data processing method of the sixteenth embodiment. In the drawing, reference numeral 507 designates a video the selection step; and 509 designates an audio selection step. Both the video the selection step 507 and the audio selection step 509 are included in the selection step 501 described in connection with the fourteenth and fifteenth embodiment.

In the video the selection step 507, a segment or scene of video data is selected by reference to context description data pertaining to video data, and the thus-selected segment is output. In the audio the selection step 509, a segment of sound is selected by reference to context description data pertaining to sound data, and the thus-selected segment is output. Here, the selected segment corresponds to, for example, the start time and end time of the selected segment. In the extraction step 503 described in connection with the fourteenth embodiment, only data from the segment of video data selected in the video the selection step 507 are played back. In the playback step 505, only data from the segment of sound data selected in the audio selection step 509 are played back.

Seventeenth Embodiment

Figure 41:
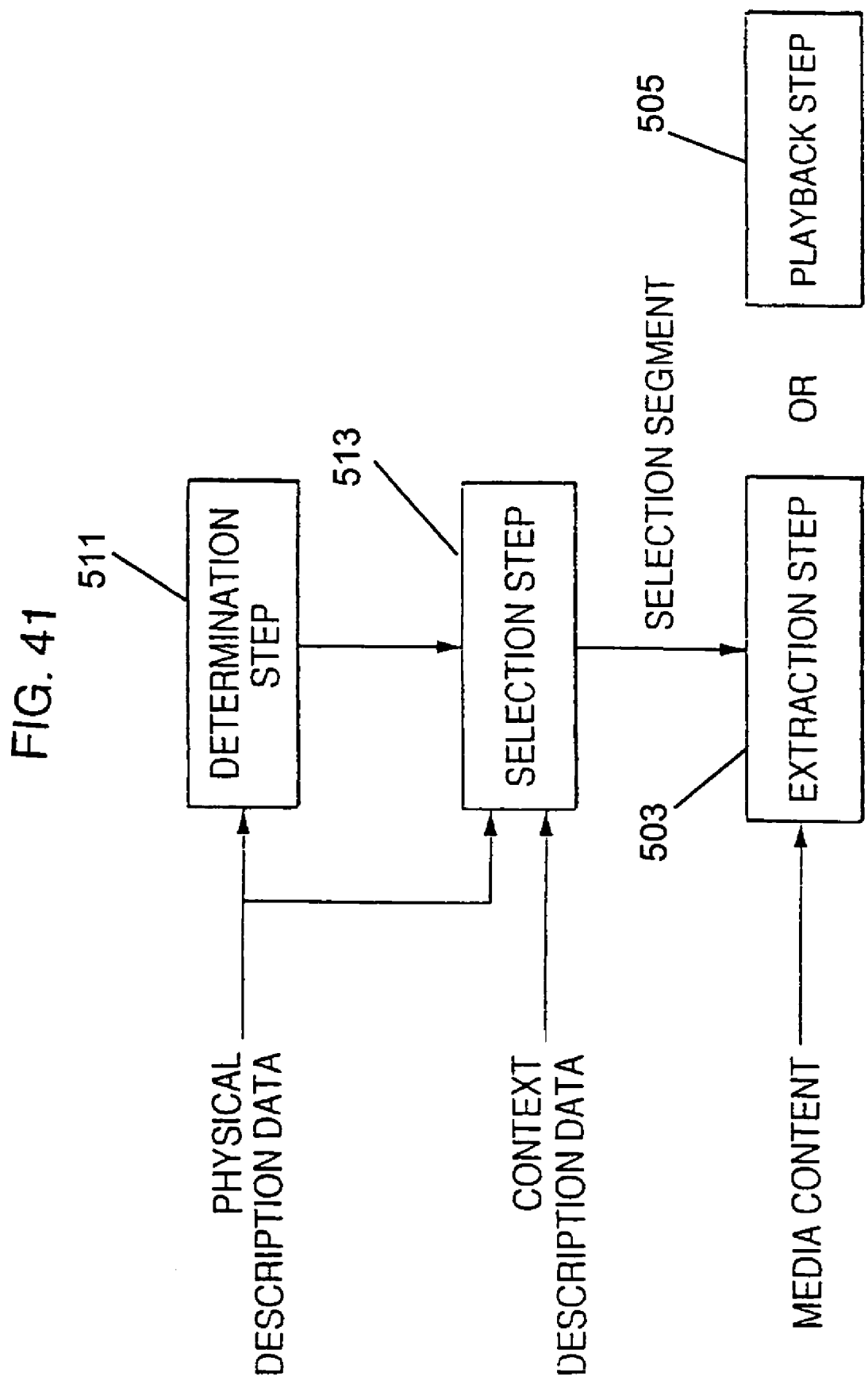
FIG. 41 is a block diagram showing a data processing method according to a seventeenth embodiment of the present invention.

A seventeenth embodiment of the present invention will now be described. FIG. 41 is a block diagram showing processing relating to a data processing method of the present embodiment. In the drawing, reference numeral 511 designates a determination step; 513 designates a selection step; 503 designates an extraction step; and 505 designates a playback step.

Example 1

In one example, media content comprises a plurality of different media data sets within a single period of time. In the determination step 511, there are received structure description data which describes the configuration of data of the media content. In this step, data which are objects of selection are determined on the basis of determination conditions, such as the capability of a receiving terminal, the traffic volume of a delivery line, and a user request. In the selection step 513, there are received the data which are determined to be an object of selection in the determination step 511, the structure description data, and the context description data. Further, a media data set is selected from only the data which are determined to be the object of selection in the determination step 511. Since the extraction step 503 is identical with the extraction step described in connection with the fourteenth embodiment and the playback step 505 is identical with the playback step described in connection with the fifteenth embodiment, repetition of their descriptions is omitted here. Media data comprise several data sets, such as video data, sound data, and text data. In the following description of examples, media data comprise in particular at least one of video data and sound data.

Figure 42:
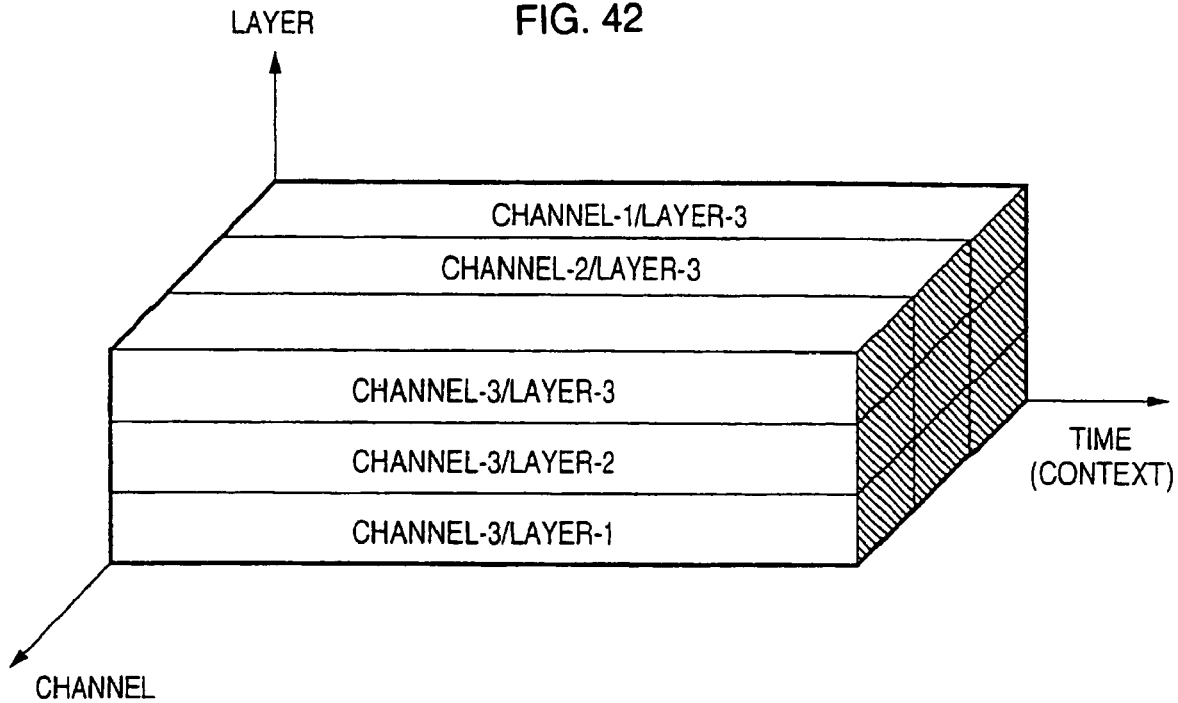
FIG. 42 is a descriptive view showing channels and layers.

In the present example, as shown in FIG. 42, within a single period of time of media content, different video data or sound data are assigned to channels, and the video data or sound data are further assigned to a hierarchical set of layers. For instance, a channel-1/layer-1 for transmitting a motion picture is assigned to video data having a standard resolution, and a channel-1/layer-2 is assigned to video data having a high resolution. A channel 1 for transmitting sound data is assigned to stereophonic sound data, and a channel 2 is assigned to monophonic sound data. Program 05 shows one example of Document Type Definition (DTD) used for describing structure description data through use of XML, and one example of context description data described through use of DTD.

Figure 43:
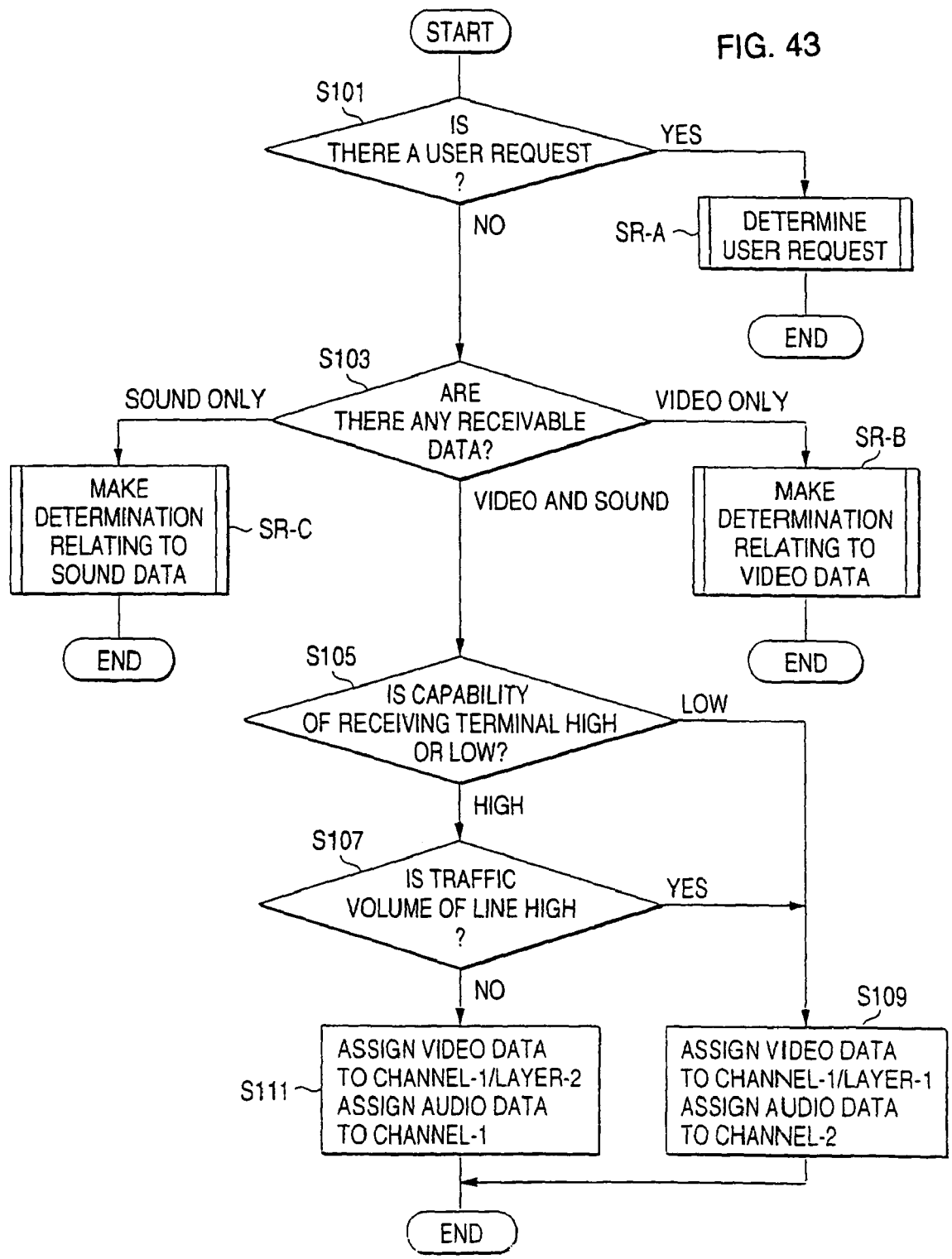
FIG. 43 is a flowchart showing processing pertaining to the determination step in example 1 according to a seventeenth embodiment of the present invention.

In a case where media content is formed of such channels and layers, processing pertaining to the determination step 511 of the present example will now be described by reference to FIGS. 43 to 46. As shown in FIG. 43, in step 101 a determination is made as to whether or not a user request exists. If in step 101 a user request is determined to exist, the user request is subjected to determination processing SR-A shown in FIG. 44.

Figure 45:
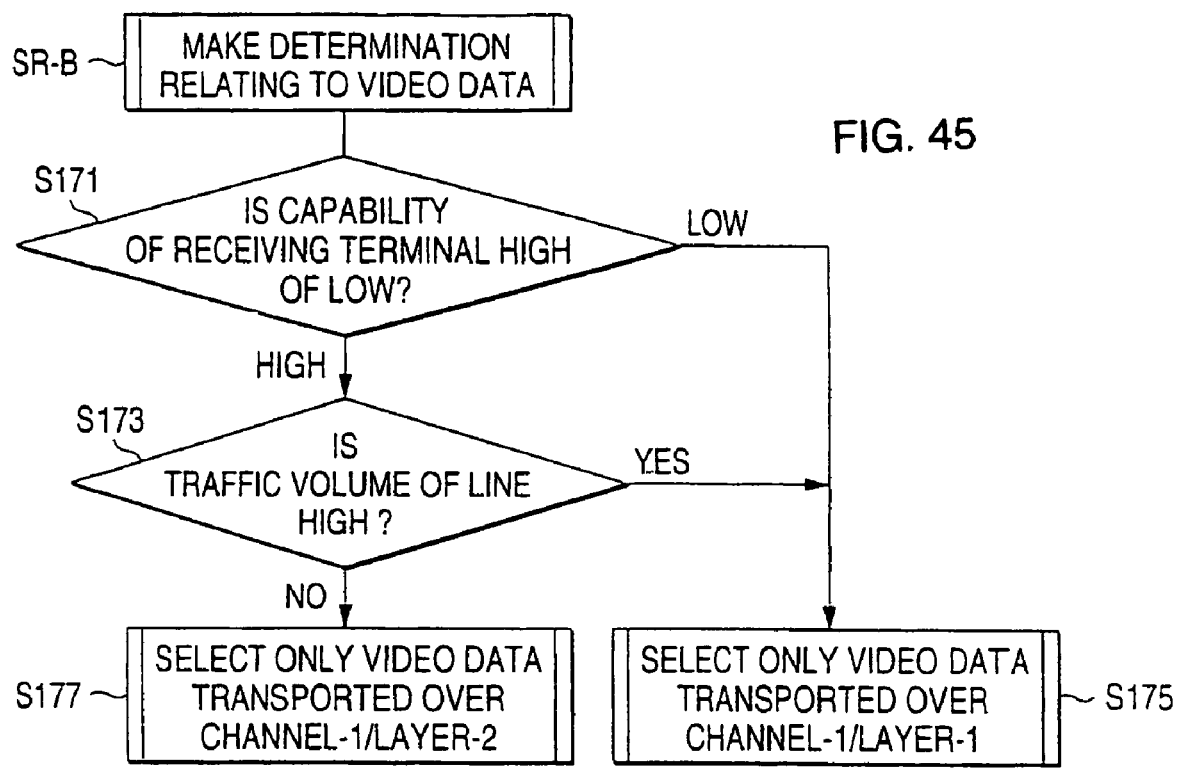
FIG. 45 is a flowchart showing determination processing pertaining to video data in the determination step of example 1 according to the seventeenth embodiment.
Figure 46:
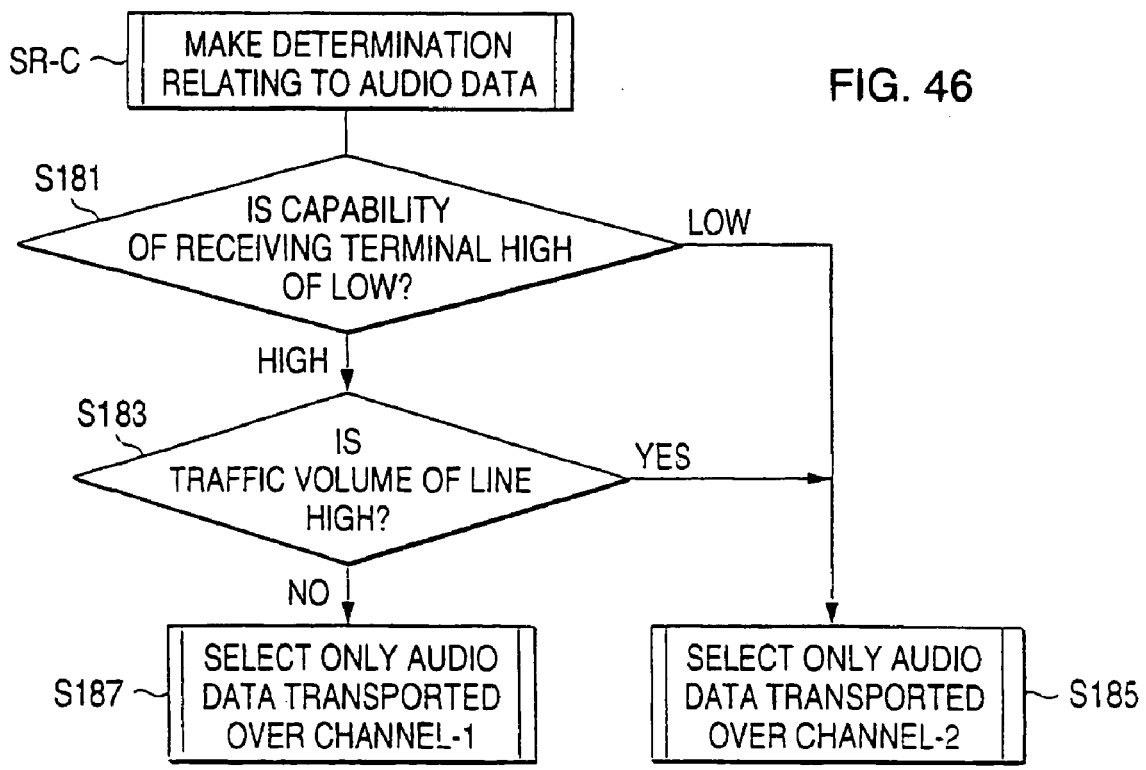
FIG. 46 is a flowchart showing determination processing pertaining to sound data in the determination step of example 1 according to the seventeenth embodiment.

In step 101, if no user request is determined to exist, processing proceeds to step S103, where another determination is made as to whether or not receivable data are video data only, sound data only, or both video and sound data. If in step S103 receivable data are determined to be solely video data, determination processing SR-C pertaining to video data shown in FIG. 45 is executed. If receivable data are determined to solely sound data, determination processing SR-C pertaining to sound data shown in FIG. 46 is executed. If both video and audio data are receivable, processing proceeds to step S105. In step S105, a determination is made as to the capability of a receiving terminal for receiving video and audio data; for example, video display capability, playback capability, and a rate at which compressed data are decompressed. If the capability of the receiving terminal is determined to be high, processing proceeds to step S107. In contrast, if the capability of the receiving terminal is determined to be low, processing proceeds to step S109. In step S107, the traffic volume of a line over which video data and sound data are to be transported is determined. If the traffic volume of the line is determined to be high, processing proceeds to step S109. If the traffic volume of the line is determined to be low, processing proceeds to step S111.

Processing pertaining to step S109 is executed when the receiving terminal has low capability or the traffic volume of the line is high. During the processing, the receiving terminal receives video data having a standard resolution over the channel-1/layer-1 and sound data over the channel 2. Processing pertaining to step S111 is executed when the receiving terminal has high capability or the traffic volume is low. During the processing, the receiving terminal receives video data having a high resolution over the channel-1/layer-2 and stereophonic sound over the channel 1.

Figure 44:
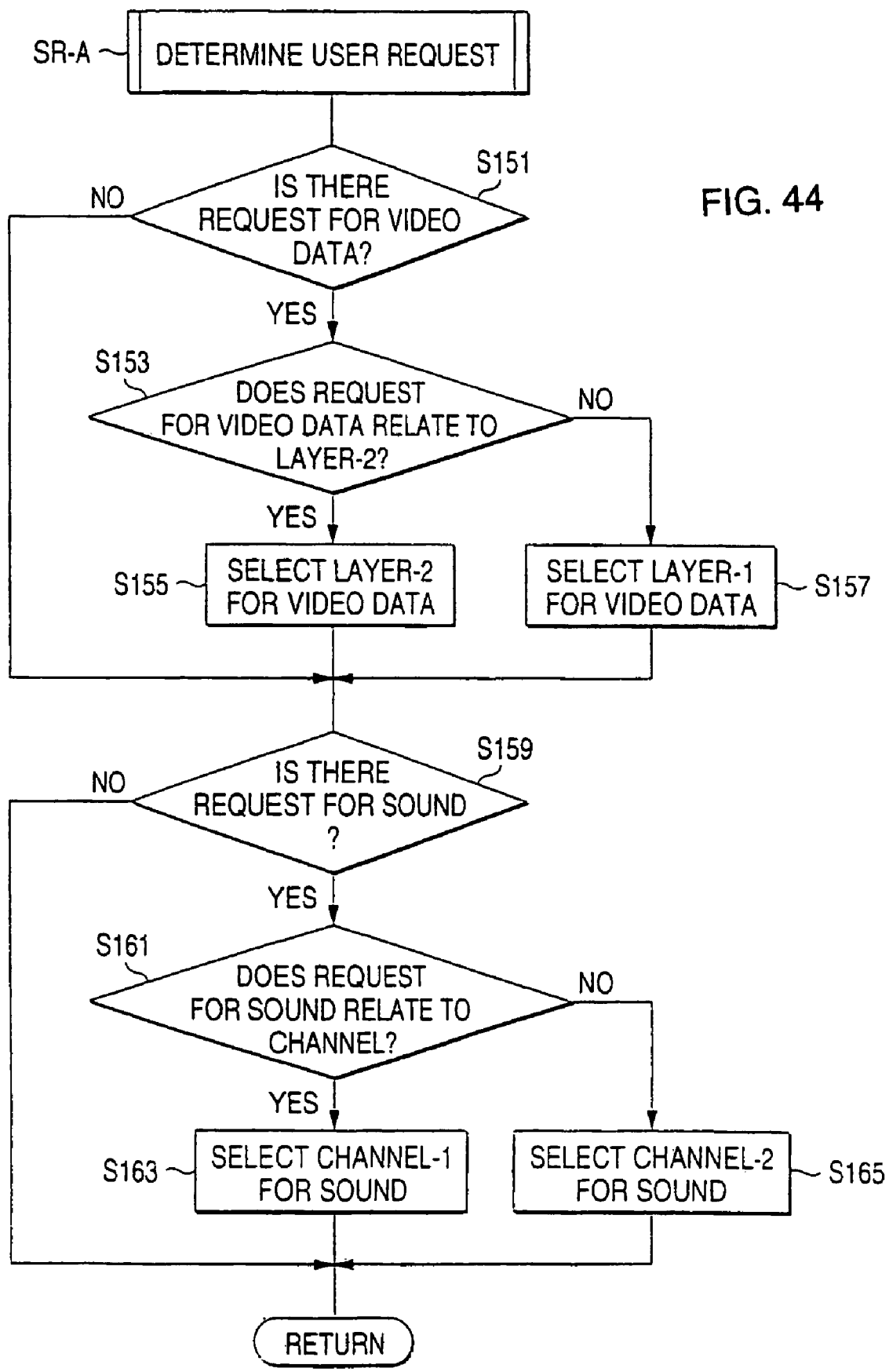
FIG. 44 is a flowchart showing determination processing to be performed, in response to a user request, in the determination step of example 1 according to the seventeenth embodiment.

The determination processing SR-A pertaining to user request shown in FIG. 44 will now be described. In the present example, the user request is assumed to select a video layer and a sound channel. In step S151, a determination is made as to whether or not the user requests video data. If in step S151 the user is determined to request video data, processing proceeds to step S153. If the user is determined not to request video data, processing proceeds to step S159. In step S153, a determination is made as to whether or not the user request for video data corresponds to selection of a layer 2. If YES is chosen in step S153, processing proceeds to step S155, where the layer 2 is selected as video data. If NO is chosen in step S153, processing proceeds to step S157, where a layer 1 is selected as video data. In step S159, a determination is made as to whether or not the user requests audio data. If in step S159 the user is determined to request audio data, processing proceeds to step S161. If the user is determined not to request audio data, processing is terminated. In step S161, a determination is made as to whether or not the user request for audio data corresponds to selection of a channel 1. If YES is chosen in step S161, processing proceeds to step S162, where the channel 1 is selected as audio data. If NO is chosen in step S161, processing proceeds to step S165, where the channel 2 is selected as audio data.

The determination processing SR-B pertaining to video data shown in FIG. 45 will now be described. In step S171, a determination is made as to the capability of a receiving terminal for receiving video data. If the receiving terminal is determined to have high capability, processing proceeds to step S173. If the receiving terminal is determined to have low capability, processing proceeds to step S175. In step S173, the traffic volume of a line is determined. If the traffic volume of the line is determined to be high, processing proceeds to step S175. In contrast, if the traffic volume of the line is determined to be low, processing proceeds to step S177.

Processing pertaining to step S175 is executed when the receiving terminal has low capability or the traffic volume of the line is high. During the processing, the receiving terminal receives only video data having a standard resolution over the channel-1/layer-1. Processing pertaining to step S177 is executed when the receiving terminal has low capability or the traffic volume of the line is low. During the processing, the receiving terminal receives only video data having a high resolution over the channel-1/layer-2.

The determination processing SR-C pertaining to sound data shown in FIG. 46 will now be described. In step S181, a determination is made as to the capability of a receiving terminal for receiving audio data. If the receiving terminal is determined to have high capability, processing proceeds to step S183. If the receiving terminal is determined to have low capability, processing proceeds to step S185. In step S183, the traffic volume of a line is determined. If the traffic volume of the line is determined to be high, processing proceeds to step S185. In contrast, if the traffic volume of the line is determined to be low, processing proceeds to step S187.

Processing pertaining to step S185 is executed when the receiving terminal has low capability or the traffic volume of the line is high. During the processing, the receiving terminal receives only monophonic audio data over the channel 2. Processing pertaining to step S187 is executed when the receiving terminal has low capability or the traffic volume of the line is low. During the processing, the receiving terminal receives only stereophonic sound data over the channel 1.

Example 2

Another example of the invention differs from the invention described in example 1 in only processing pertaining to the determination step S511. In the determination step S511, there are received structure description data which describe the configuration of data of the media content. In this step, on the basis of determination conditions, such as the capability of a receiving terminal, the traffic volume of a delivery line, and a user request, a determination is made as to whether only video data, only sound data, or both video and sound data are to be selected. Since the selection step 513, the extraction step 503, and the playback step 505 are identical with those described previously, repetition of their explanations is omitted here.

Figure 47:
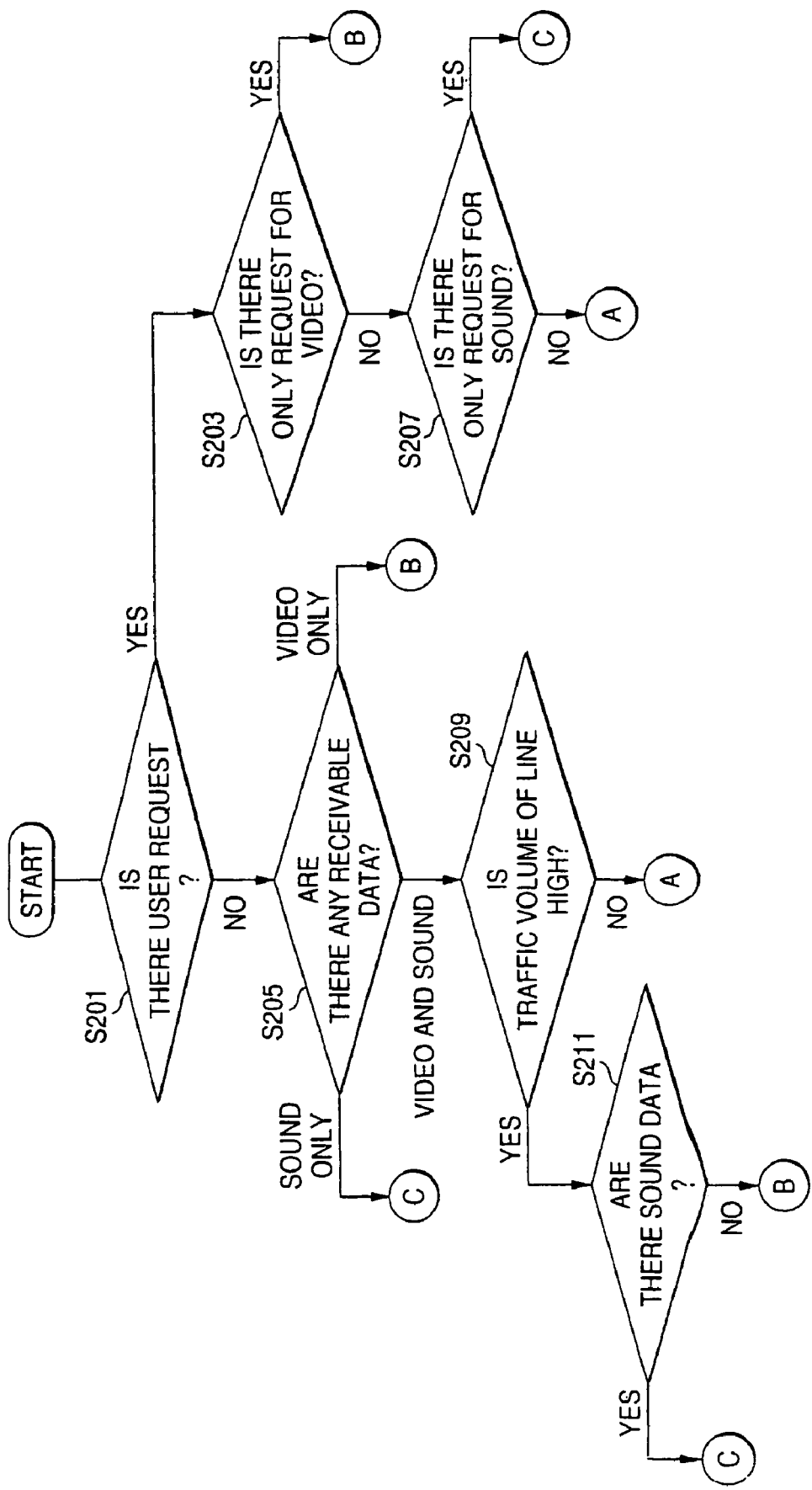
FIG. 47 is a flowchart showing a first half of processing pertaining to the determination step in example 2 according to a seventeenth embodiment of the present invention.
Figure 48:
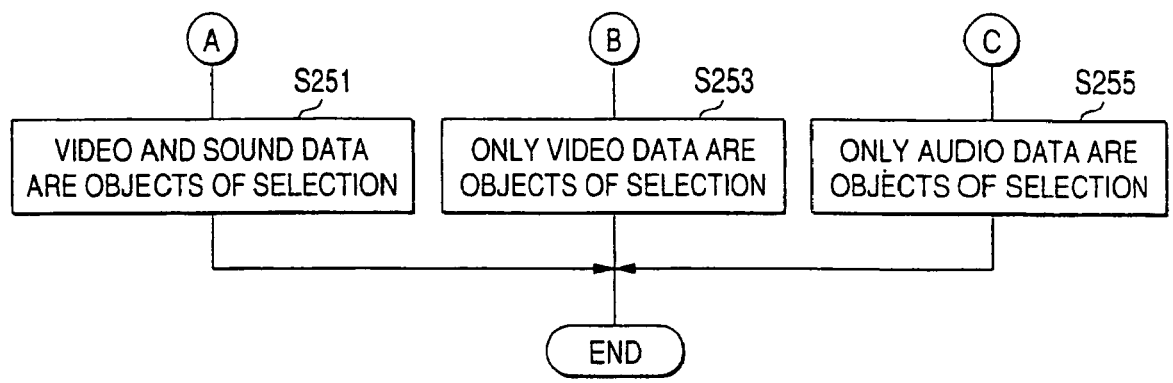
FIG. 48 is a flowchart showing a second half of processing pertaining to the determination step in example 2 according to a seventeenth embodiment of the present invention.

Processing pertaining to the determination step 511 of the present example will now be described by reference to FIGS. 47 and 48. As shown in FIG. 47, in step S201 a determination is made as to whether or not a user request exists. If in step S201 a user request is determined to exist, processing proceeds to step S203. If no user request is determined to exist, processing proceeds to step S205. In step S203, a determination is made as to whether or not the user requests solely video data. If YES is chosen in step S203, processing proceeds to step S253, where only video data are determined to be an object of selection. If NO is chosen in step S203, processing proceeds to step S207. In step S207, a determination is made as to whether or not the user requests only sound data. If YES is chosen in step S207, processing proceeds to step S255, where only sound data are determined to be an object of selection. If NO is chosen in step S207, processing proceeds to step S251, where both video and audio data are determined to be objects of selection.

In step S205, to which processing proceeds when no user request exists, a determination is made as to whether only video data, only sound data, or both video and sound data are receivable. If in step S205 only video data are determined to be receivable, processing proceeds to step S253, where only video data are determined to be an object of selection. If in step S205 only sound data are determined to be receivable, processing proceeds to step S255, where only sound data are determined to be an object of selection. If in step S205 both video and sound data are determined to be receivable, processing proceeds to step S209.

In step S209, the traffic volume of the line is determined. If the traffic volume of the line is low, processing proceeds to step S251, where both video and sound data are determined to be objects of selection. If the traffic volume of the line is high, processing proceeds to step S211. In step S211, a determination is made as to whether or not data to be transported over the line include sound data. If YES is chosen in step S211, processing proceeds to step S255, where sound data are determined to be an object of selection. If NO is chosen in step S211, processing proceeds to step S253, where video data are determined to be an object of selection.

Example 3

In another example, media content comprises a plurality of different video and/or sound data sets at a single period of time. In addition to a determination as to whether only video data, only sound data, or both video and sound data are to be selected, which is made in the determination step 511 of the second example, in the determination step S511 of the third example a determination is made as to which one of video data sets/audio data sets is to be selected as an object of selection, on the basis of determination conditions, such as the capability of a receiving terminal, the traffic volume of a delivery line, and a user request. Since the selection step 513, the extraction step 503, and the playback step 505 are identical with those described previously, repetition of their explanations is omitted here.

As in the case of example 1, within a single period of time of media content, different video data or sound data are assigned to channels or layers. For instance, a channel-1/layer-1 for transmitting a motion picture is assigned to video data having a standard resolution, and a channel-1/layer-2 is assigned to video data having a high resolution. A channel 1 for transmitting sound data is assigned to stereophonic sound data, and a channel 2 is assigned to monophonic sound data. Program 05 shows one example of Document Type Definition (DTD) used for describing structure description data through use of XML, and one example of context description data described through use of DTD.

Figure 49:
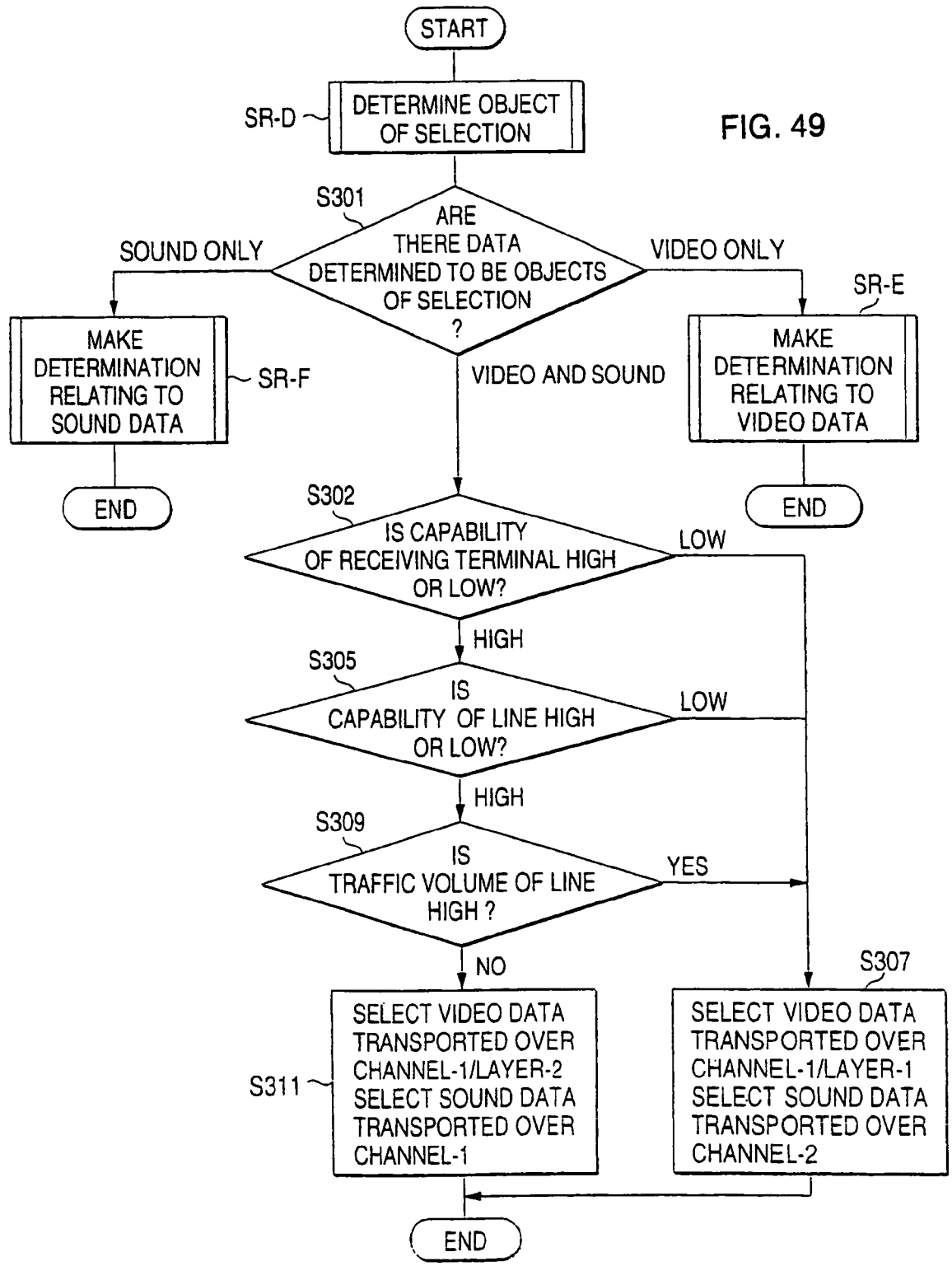
FIG. 49 is a flowchart showing processing pertaining to the determination step in example 3 according to a seventeenth embodiment of the present invention.
Figure 50:
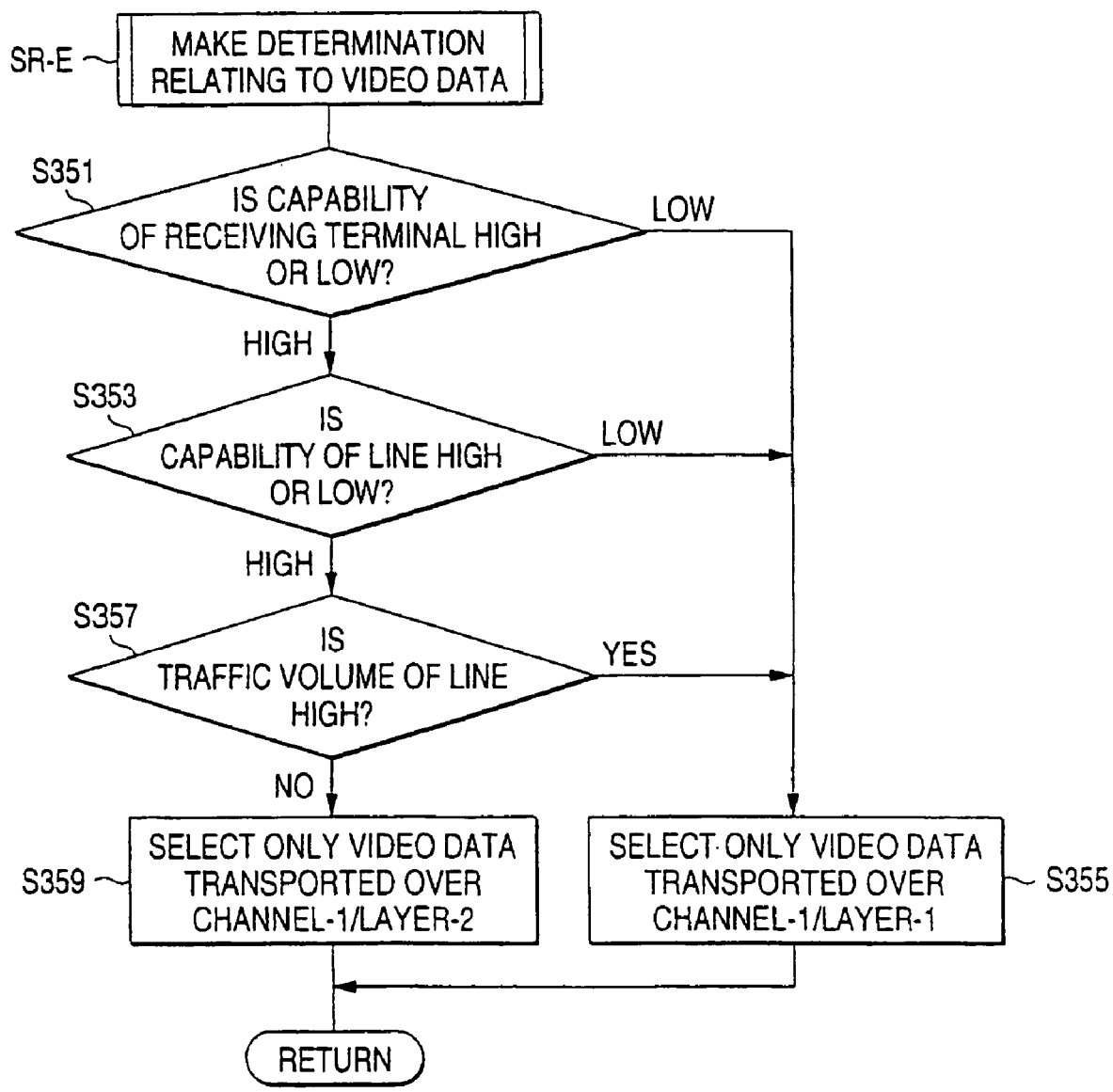
FIG. 50 is a flowchart showing determination processing pertaining to video data in the determination step of example 3 according to the seventeenth embodiment.
Figure 51:
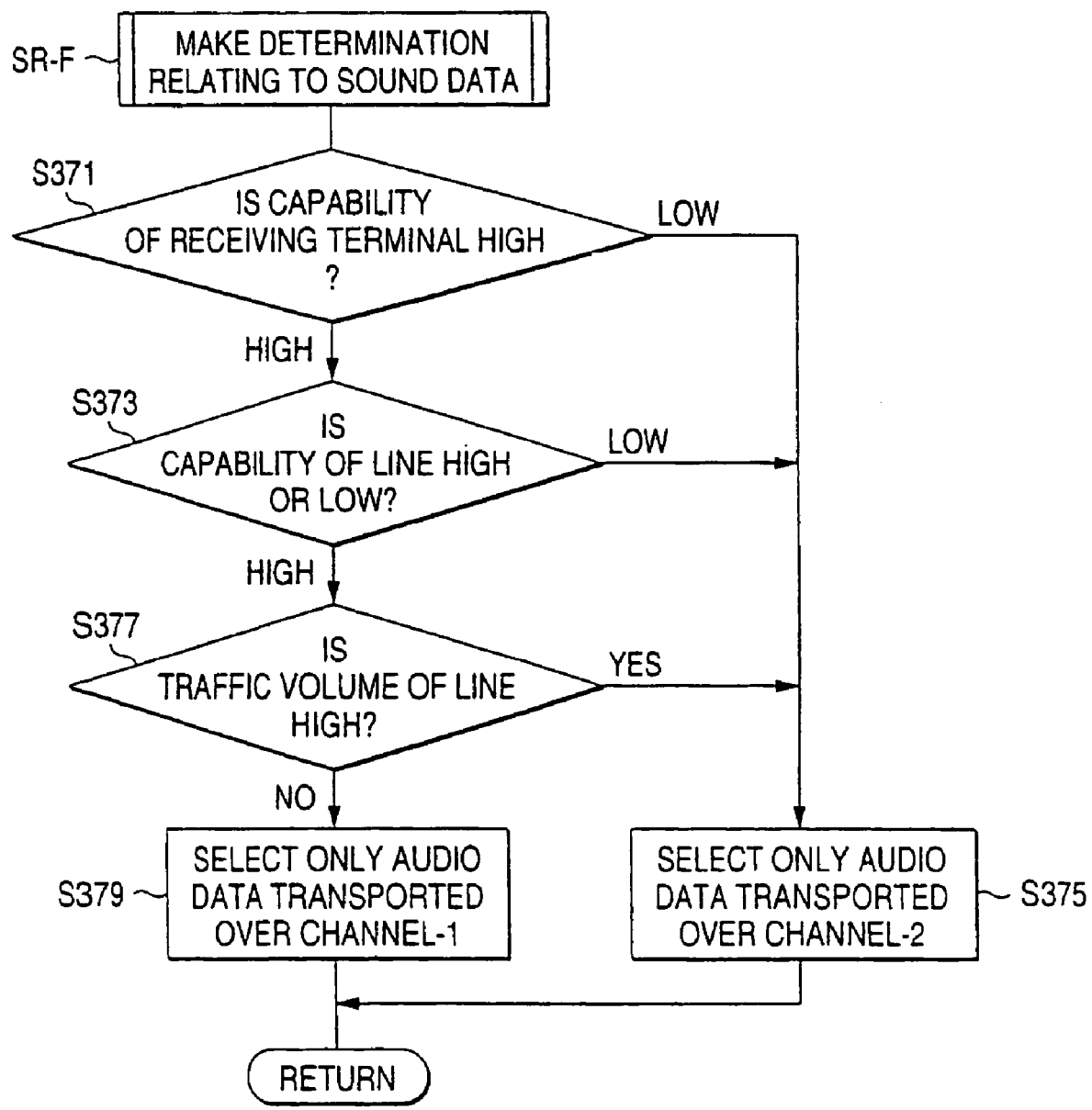
FIG. 51 is a flowchart showing determination processing pertaining to sound data in the determination step of example 3 according to the seventeenth embodiment.

Processing pertaining to the determination step 511 of the third example will now be described by reference to FIGS. 49 to 51. As shown in FIG. 49, in the present example, as in the case of the determination made in the example 2, data which are an object of selection are determined (object-of-selection determination SR-D). In step S301, the data determined through the object-of-selection determination processing SR-D are determined. In step S301, when only video data are determined to be an object of selection, processing pertaining to determination processing SR-E relating to video data shown in FIG. 50 is executed. In step S301, when only audio data are determined to be an object of selection, processing pertaining to determination processing SR-F relating to audio data shown in FIG. 51 is executed. In step S301, when both video and audio data are determined to be an object of selection, processing proceeds to step S303, where the capability of a receiving terminal for receiving video and audio data is determined. If the receiving terminal is determined to have high capability, processing proceeds to step S305. If the receiving terminal is determined to have low capability, processing proceeds to step S307, where the capability of a line, such as a transmission rate, is determined. If the line is determined to have high capability, processing proceeds to step S309. In contrast, if the line is determined to have low capability, processing proceeds to step S307. If the line is determined to have a high traffic volume, processing proceeds to step S307. If the line is determined to have a low traffic volume, processing proceeds to step S311.

Processing relating to step S307 is executed when the receiving terminal has low capability, the line has low capability, or the line has a high traffic volume. During the processing, the receiving terminal receives video data having a standard resolution over the channel-1/layer-1 and monophonic sound data over the channel 2. In contrast, processing relating to step S311 is executed when the receiving terminal high capability, the line has high capability, or the line has a low traffic volume. During the processing, the receiving terminal receives video data having a high resolution over the channel-1/layer-2 and stereophonic sound data over the channel 1.

The determination processing SR-E pertaining to video data shown in FIG. 50 will now be described. In step S351, a determination is made as to the capability of a receiving terminal for receiving video data. If the receiving terminal is determined to have high capability, processing proceeds to step S353. If the receiving terminal is determined to have low capability, processing proceeds to step S355. In step S353, the capability of the line is determined. If the capability of the line is determined to be high, processing proceeds to step S357. In contrast, if the capability of the line is determined to be low, processing proceeds to step S355. In step S357, the traffic volume of the line is determined. If the traffic volume of the line is determined to be high, processing proceeds to step S355. In contrast, if the traffic volume of the line is determined to be low, processing proceeds to step S359.

Processing relating to step S355 is executed when the receiving terminal has low capability, the line has low capability, or the line has a high traffic volume. During the processing, the receiving terminal receives only video data having a standard resolution over the channel-1/layer-1. In contrast, processing relating to step S359 is executed when the receiving terminal high capability, the line has high capability, or the line has a low traffic volume. During the processing, the receiving terminal receives only video data having a high resolution over the channel-1/layer-2.

The determination processing SR-F pertaining to audio data shown in FIG. 51 will now be described. In step S371, a determination is made as to the capability of a receiving terminal for receiving audio data. If the receiving terminal is determined to have high capability, processing proceeds to step S373. If the receiving terminal is determined to have low capability, processing proceeds to step S375. In step S373, the capability of the line is determined. If the capability of the line is determined to be high, processing proceeds to step S377. In contrast, if the capability of the line is determined to be low, processing proceeds to step S375. In step S377, the traffic volume of the line is determined. If the traffic volume of the line is determined to be high, processing proceeds to step S375. In contrast, if the traffic volume of the line is determined to be low, processing proceeds to step S379.

Processing relating to step S375 is executed when the receiving terminal has low capability, the line has low capability, or the line has a high traffic volume. During the processing, the receiving terminal receives only monophonic audio data over the channel 2. In contrast, processing relating to step S379 is executed when the receiving terminal high capability, the line has high capability, or the line has a low traffic volume. During the processing, the receiving terminal receives only stereophonic audio data over the channel 1.

Example 4

In another example, representative data pertaining to a corresponding media segment are added, as an attribute, to individual elements of context description data in the lowest hierarchical layer. Media content comprises a plurality of different media data sets at a single period of time. In the determination step S511, there are received structure description data which describe the configuration of data of the media content. In this step, a determination as to which one of the media data sets and/or representative data sets is taken as an object of selection is made on the basis of determination conditions, such as the capability of a receiving terminal, the traffic volume of a delivery line, the capability of the line, and a user request.

Since the selection step 513, the extraction step 503, and the playback step 505 are identical with those described previously, repetition of their explanations is omitted here. Media data comprise video data, sound data, or text data. In the present example, media data include at least one of video data and sound data. In a case where representative data correspond to video data, the representative data include, for example, representative image data for each media segment or low-resolution video data. In a case where representative data correspond to audio data, the representative data include, for example, key-phrase data for each media segment.

As in the case of example 3, within a single period of time of media content, different video data or sound data are assigned to channels or layers. For instance, a channel-1/layer-1 for transmitting a motion picture is assigned to video data having a standard resolution, and a channel-1/layer-2 is assigned to video data having a high resolution. A channel 1 for transmitting sound data is assigned to stereophonic sound data, and a channel 2 is assigned to monophonic sound data.

Figure 52:
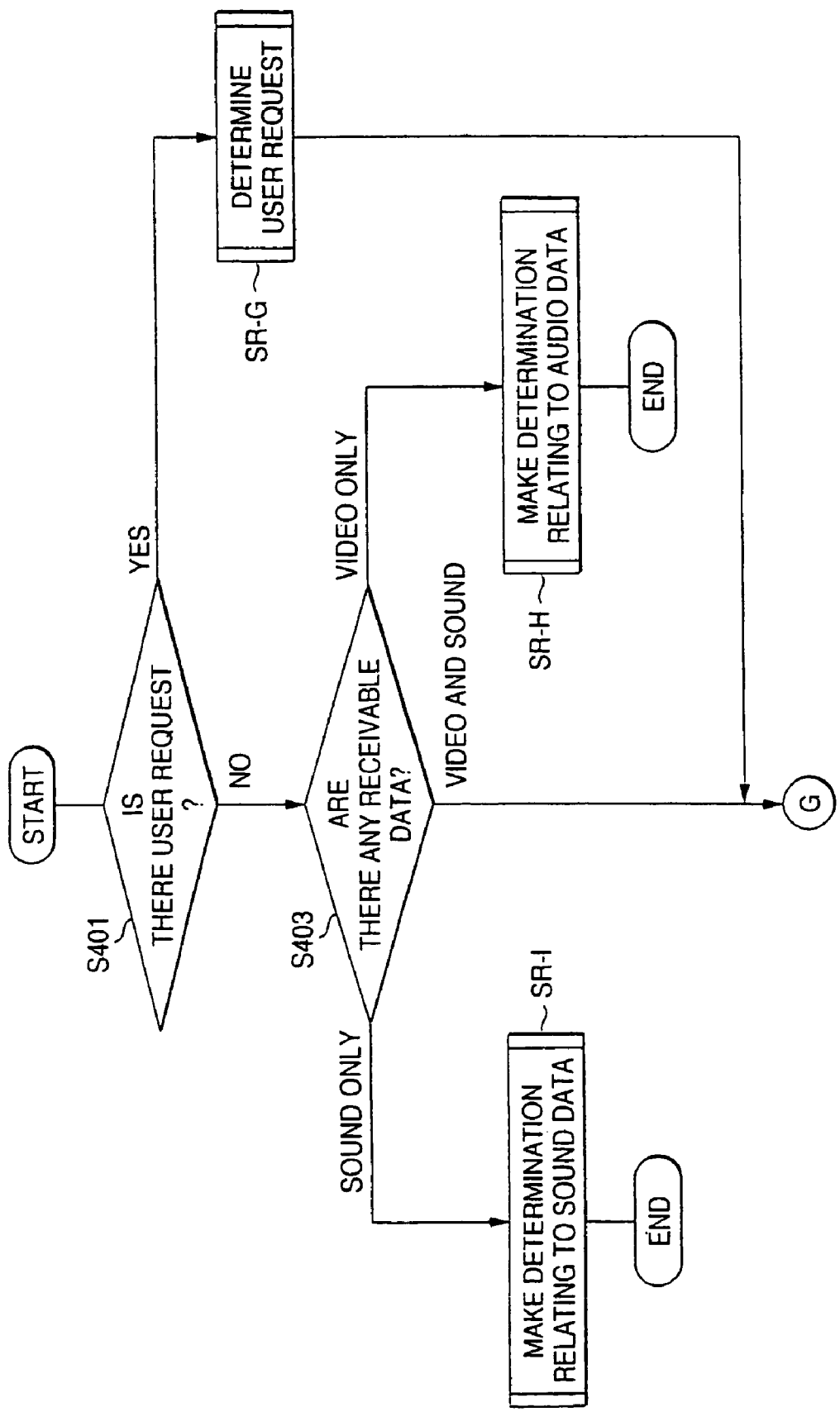
FIG. 52 is a flowchart showing a first half of processing pertaining to the determination step in example 4 according to a seventeenth embodiment of the present invention.
Figure 53:
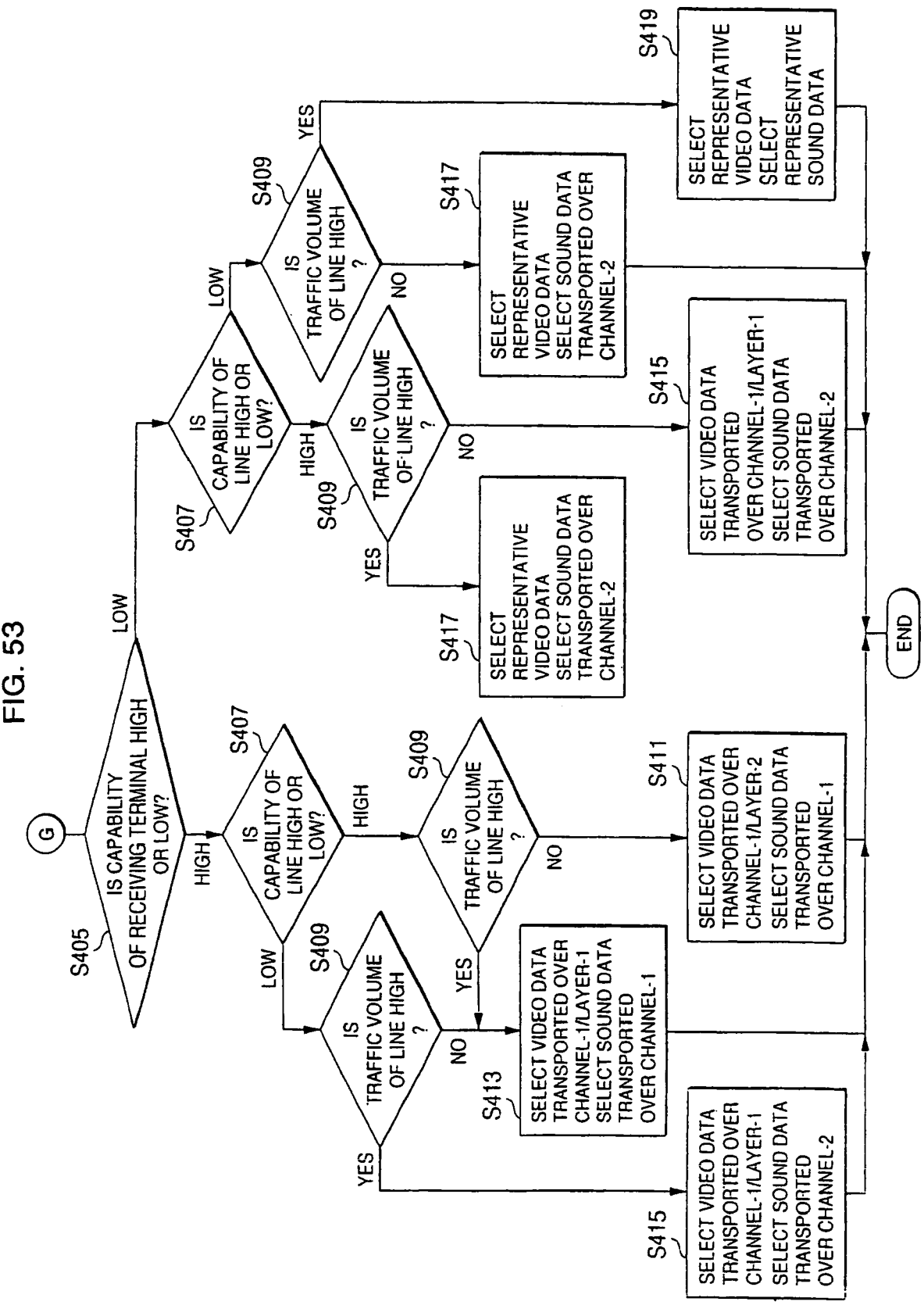
FIG. 53 is a flowchart showing a second half of processing pertaining to the determination step in example 4 according to a seventeenth embodiment of the present invention.
Figure 54:
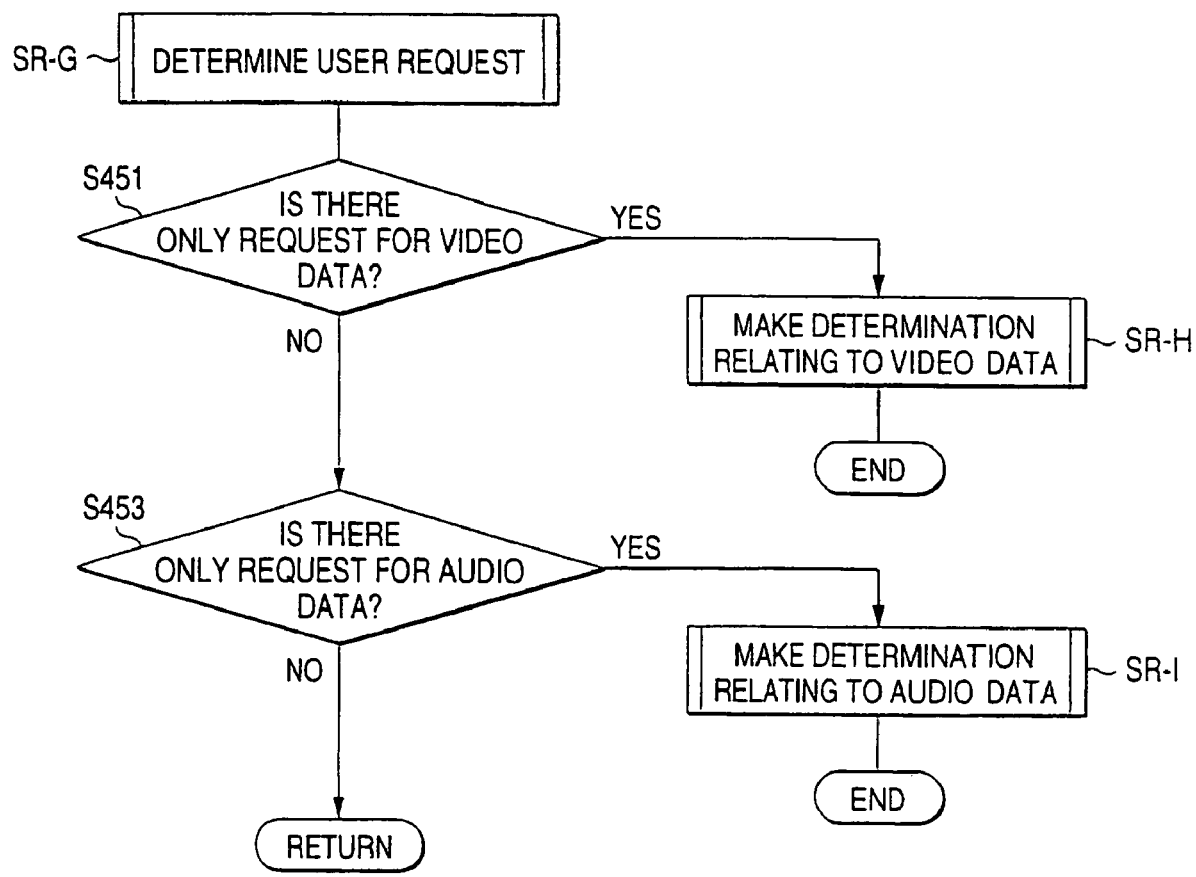
FIG. 54 is a flowchart showing determination processing to be performed, in response to a user request, in the determination step of example 4 according to the seventeenth embodiment.

Processing pertaining to the determination step 511 of the present example will now be described by reference to FIGS. 52 to 56. As shown in FIG. 52, in step S401 a determination is made as to whether or not a user request exists. If in step S401 a user request is determined to exist, determination processing SR-G relating to user request shown in FIG. 54 is executed.

Figure 55:
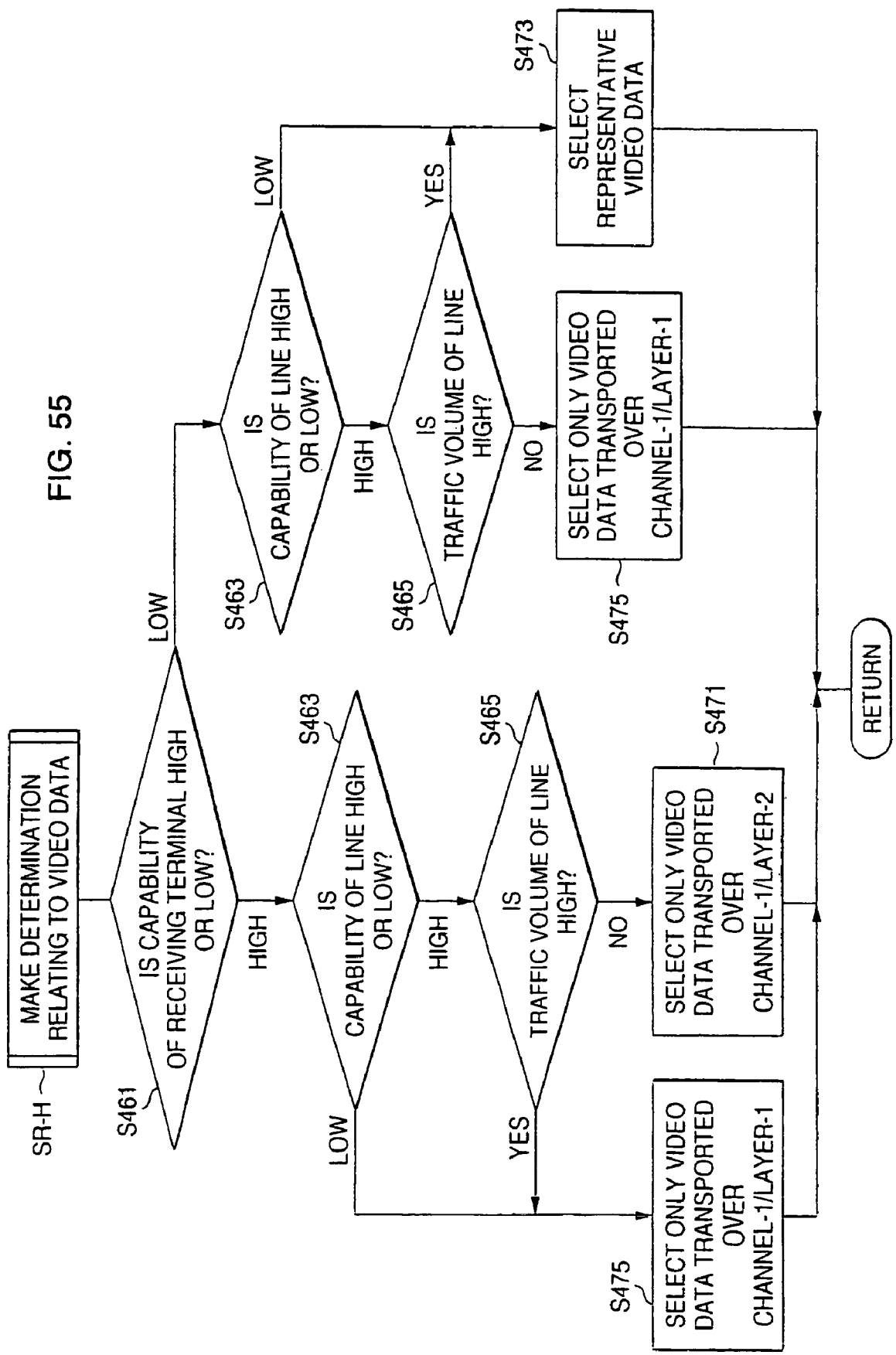
FIG. 55 is a flowchart showing determination processing pertaining to video data in the determination step of example 4 according to the seventeenth embodiment.
Figure 56:
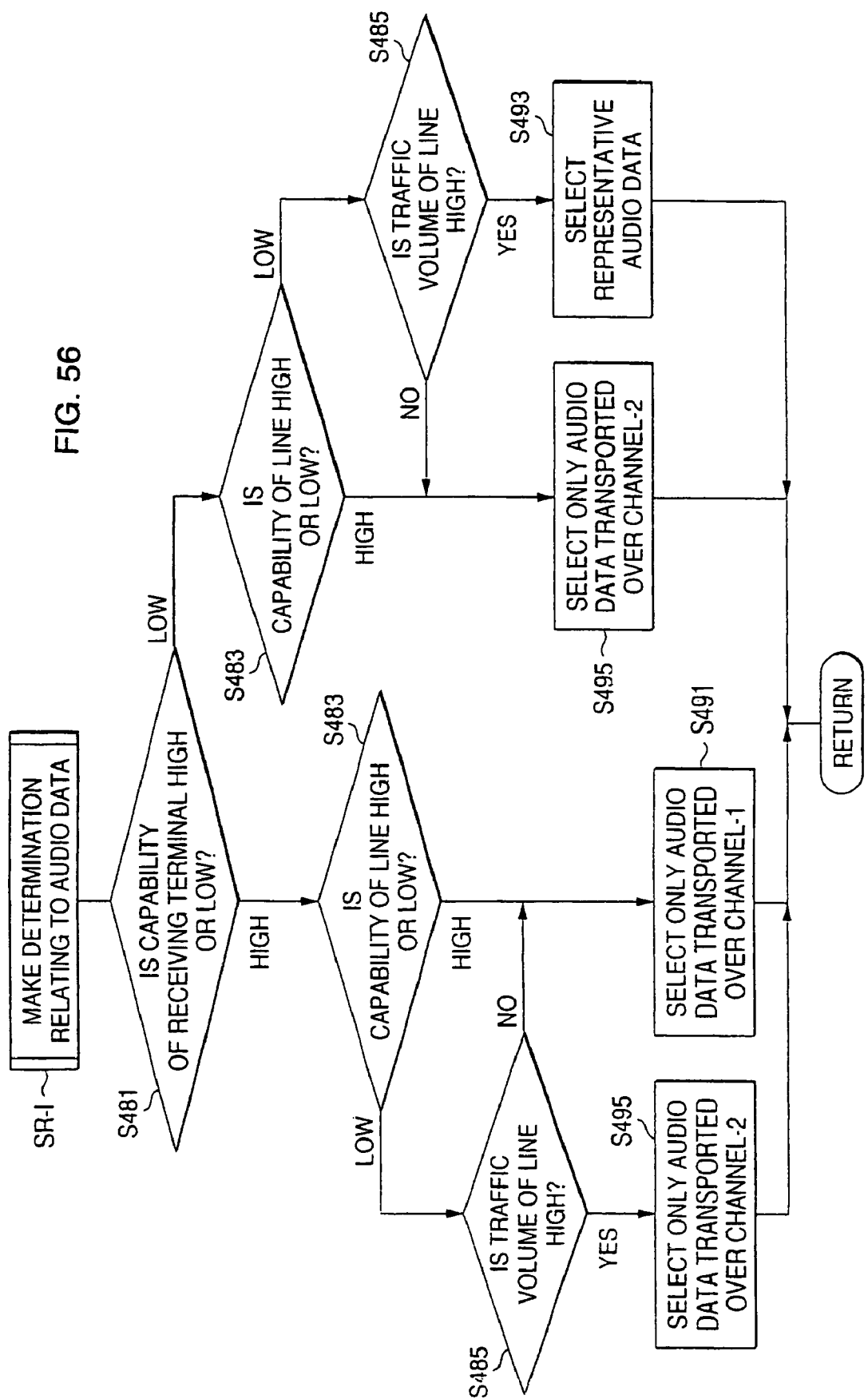
FIG. 56 is a flowchart showing determination processing pertaining to sound data in the determination step of example 4 according to the seventeenth embodiment.

If in step S401 no user request is determined to exist, processing proceeds to step S403, where a determination is made as to whether only video data, only sound data, or both video and sound data are receivable. If in step S403 only video data are determined to be receivable, determination processing SR-H relating to video data shown in FIG. 55 is executed. In contrast, if only sound data are determined to be receivable, determination processing SR-I relating to audio data shown in FIG. 56 is executed. If both video and sound data are determined to be receivable, processing proceeds to step S405 shown in FIG. 53.

In step S405, the capability of the receiving terminal is determined. After execution of processing pertaining to step S405, there are performed, in the sequence given, processing pertaining to step S407 for determining the capability of the line and processing pertaining to step S409 for determining the traffic volume of the line. On the basis of the results of the processing operations performed in steps S405, S407, and S409, in the determination step S511 of the present example a determination is made as to channels or layers of video data or audio data to be received, or as to representative data to be received.

TABLE 1

| CAPABILITY OF RECEIVING TERMINAL | CAPABILITY OF LINE | DOES A LINE HAVE A HIGH TRAFFIC VOLUME? | RECEIVED DATA |
| --- | --- | --- | --- |
| HIGH | HIGH | NO | VIDEO DATA: CHANNEL 1, LAYER 2 AUDIO DATA: CHANNEL 1 (S411) |
| HIGH | HIGH | YES | VIDEO DATA: CHANNEL 1, LAYER 1 AUDIO DATA: CHANNEL 1 (S413) |
| HIGH | LOW | NO | VIDEO DATA: CHANNEL 1, LAYER 1 AUDIO DATA: CHANNEL 2 (S413) |
| HIGH | LOW | YES | VIDEO DATA: CHANNEL 1, LAYER 1 AUDIO DATA: CHANNEL 2 (S415) |
| LOW | HIGH | NO | VIDEO DATA: CHANNEL 1, LAYER 1 AUDIO DATA: CHANNEL 2 (S415) |

TABLE 1-continued

| CAPABILITY OF RECEIVING TERMINAL | CAPABILITY OF LINE | DOES A LINE HAVE A HIGH TRAFFIC VOLUME? | RECEIVED DATA |
|---|---|---|---|
| LOW | HIGH | YES | VIDEO DATA: REPRESENTATIVE DATA AUDIO DATA: CHANNEL 2 (S417) |
| LOW | LOW | NO | VIDEO DATA: REPRESENTATIVE DATA AUDIO DATA: CHANNEL 2 (S417) |
| LOW | LOW | YES | VIDEO DATA: REPRESENTATIVE DATA AUDIO DATA: REPRESENTATIVE DATA (S419) |

Determination processing SR-G relating to a user request shown in FIG. 54 will now be described. In step S451, a determination is made as to whether or not the user requests only video data. If YES is chosen in step S451, processing determination SR-H pertaining to video data is performed. If NO is chosen in step S451, processing proceeds to step S453. In step S453, a determination is made as to whether or not the user requests only audio data. If YES is chosen in step S453, determination processing SR-I relating to audio data is performed. If NO is chosen in step S453, processing proceeds to step S405.

Determination processing SR-H relating to video data shown in FIG. 55 will now be described. In step S461, a determination is made as to the capability of the receiving terminal. After execution of processing pertaining to step S461, there are performed, in the sequence given, processing pertaining to step S463 for determining the capability of the line and processing pertaining to step S465 for determining the traffic volume of the line. After the processing operations pertaining to these steps S461, S463, and S465 have been completed, only video data are received over the channel-1/layer-2 during the determination processing SR-H pertaining to video data of the present example, provided that the receiving terminal has high capability, the line has high capability, and the traffic volume of the line is low (step S471). In contrast, if the receiving terminal has low capability, the line has low capability, and the traffic volume of the line is high, only representative video data are received (step S473). If none of the foregoing conditions are satisfied, only video data are received over the channel-1/layer-1 (step S475).

Determination processing SR-I relating to audio data shown in FIG. 56 will now be described. In step S471, a determination is made as to the capability of the receiving terminal. After execution of processing pertaining to step S471, there are performed, in the sequence given, processing pertaining to step S473 for determining the capability of the line and processing pertaining to step S475 for determining the traffic volume of the line. After the processing operations pertaining to these steps S471, S473, and S475 have been completed, only audio data are received over the channel 1 during the determination processing SR-I pertaining to audio data of the present example, provided that the receiving terminal has high capability, the line has high capability, and the traffic volume of the line is low (step S491). In contrast, if the receiving terminal has low capability, the line has low capability, and the traffic volume of the line is high, only representative audio data are received (step S493). If none of the foregoing conditions are satisfied, only video data are received over the channel 2 (step S495).

Fifth Example

In another example, on the basis of determination conditions, such as the capability of a receiving terminal, the capability of a delivery line, the traffic volume of the line, and a user request, a determination is made as to which one of the entire data pertaining to a media segment, only representative data pertaining to a corresponding media segment, or either the entire data pertaining to a corresponding media segment or representative data is to be taken as an object of selection.

As in the case of example 4, representative data pertaining to a corresponding media segment are added, as an attribute, to individual elements of context description data in the lowest hierarchical layer. In a case where representative data correspond to video data, the representative data include, for example, representative image data for each media segment or low-resolution video data. In a case where representative data correspond to audio data, the representative data include, for example, key-phrase data for each media segment.

Figure 57:
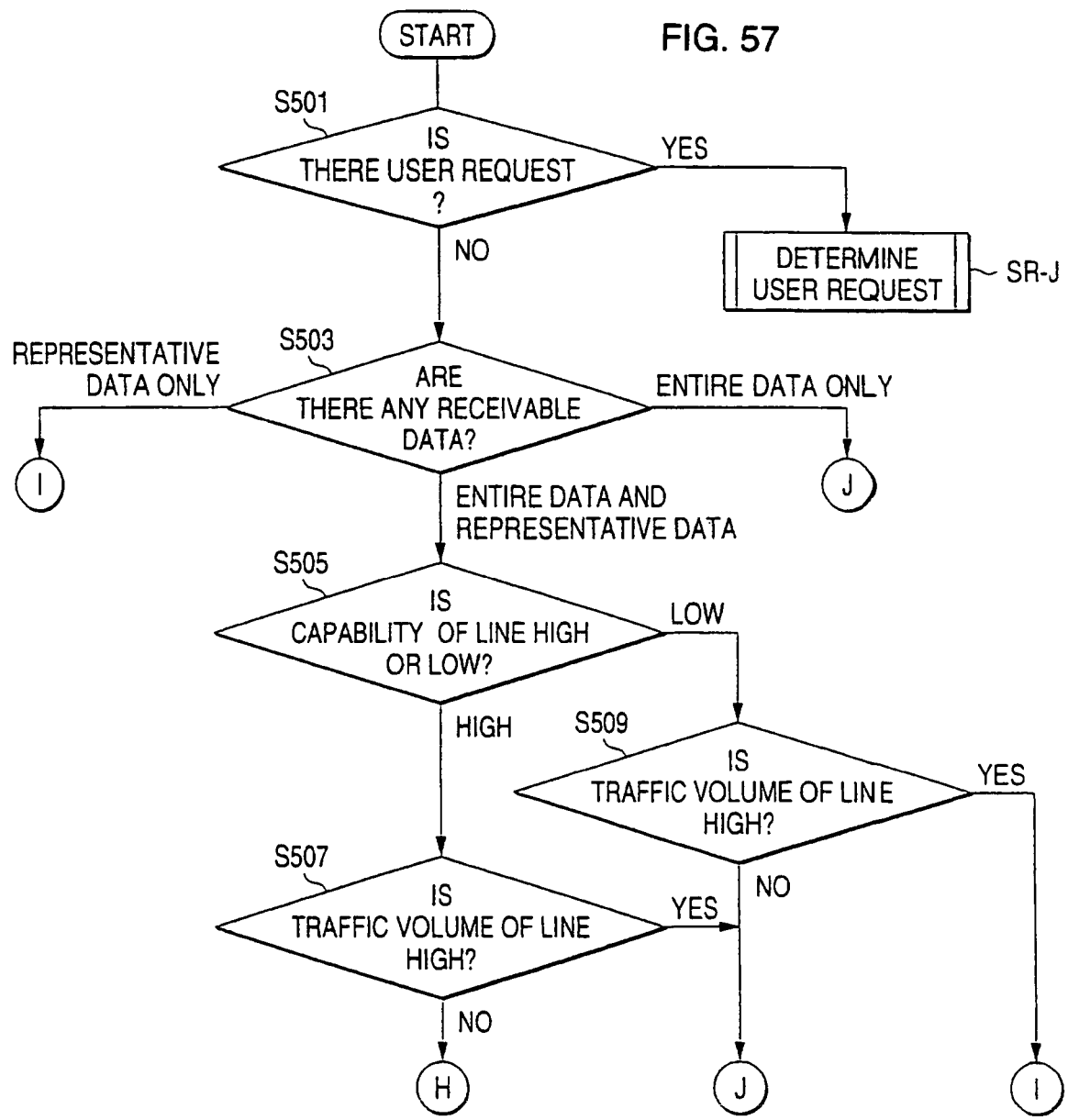
FIG. 57 is a flowchart showing a first half of processing pertaining to the determination step in example 5 according to a seventeenth embodiment of the present invention.
Figure 58:
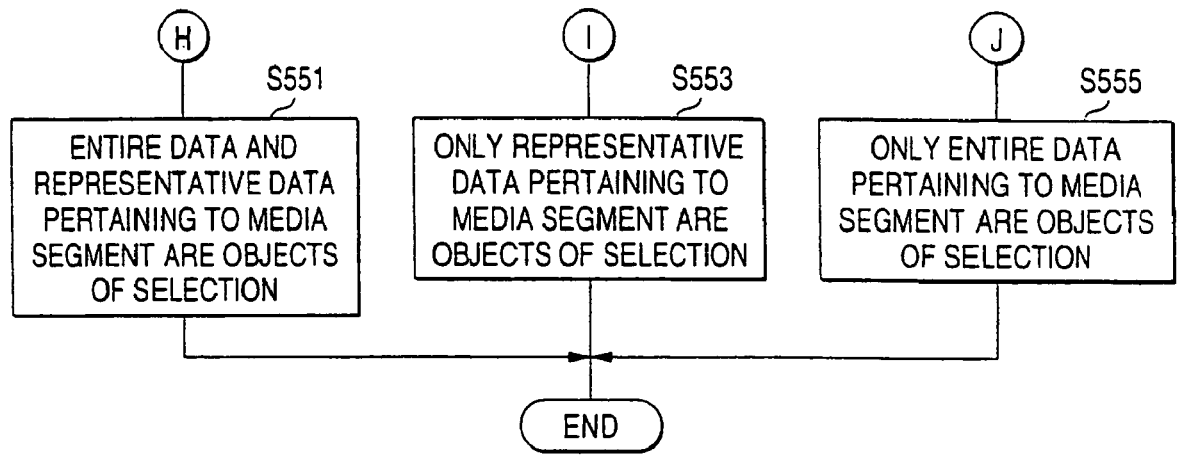
FIG. 58 is a flowchart showing a second half of processing pertaining to the determination step in example 5 according to a seventeenth embodiment of the present invention.
Figure 59:
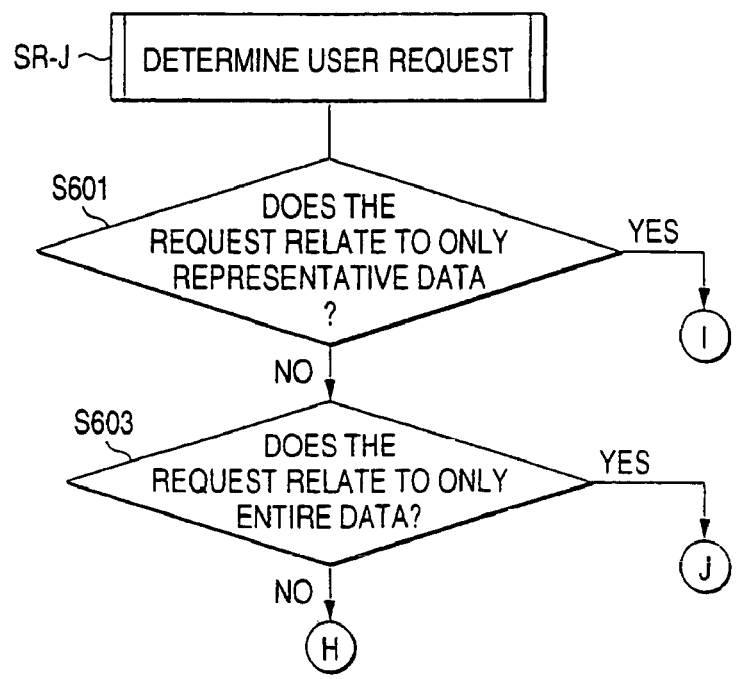
FIG. 59 is a flowchart showing determination processing to be performed, in response to a user request, in the determination step of example 5 according to the seventeenth embodiment.

Processing pertaining to the determination step 511 of the present example will now be described by reference to FIGS. 57 to 59. As shown in FIG. 57, in step S501 a determination is made as to whether or not a user request exists. If in step S501 a user request is determined to exist, determination processing SR-J relating to user request shown in FIG. 59 is executed.

In step S501 no user request is determined to exist, processing proceeds to step S503, where a determination is made as to whether only representative data pertaining to a media segment, only the entire data pertaining to the media segment, or both the representative data and the entire data pertaining to the media segment are receivable. If in step S503 only representative data are determined to be receivable, processing proceeds to step S553 shown in FIG. 58, wherein only representative data are determined to be taken as an object of selection. If only entire data are determined to be receivable, processing proceeds to step S555, wherein only the entire data are determined to be taken as an object of selection. If both the representative data and the entire data are determined to be receivable, processing proceeds to step S505.

In step S505, the capability of the line is determined. If the line is determined to have high capability, processing proceeds to step S507. In contrast, if the line is determined to have low capability, processing proceeds to step S509. In each of steps S507 and S509, the traffic volume of the line is determined. In step S507, if the line is determined to have low traffic volume, processing proceeds to step S551, where both the entire data and the representative data are determined to be taken as objects of selection. In step S509, the line is determined to have high traffic volume, processing proceeds to step S553, where representative data are taken as an object of selection. If in step S507 the line is determined to have high traffic volume and in step S509 the line is determined to have high traffic volume, processing proceeds to step S555, where the entire data are taken as an object of selection.

During determination processing SR-J relating to a user request, in step S601 a determination is made as to whether a user request corresponds to only representative data. If YES is chosen in step S601, processing proceeds to step S553, where only representative data are taken as an object of selection. If NO is selected in step S601, processing proceeds to step S603, where a determination is made as to whether or not the user request corresponds to only the entire data. If YES is chosen in step S603, processing proceeds to step S555, where only the entire data are taken as an object of selection. If NO is chosen in step S603, processing proceeds to step S551, where both the entire data and the representative data pertaining to the media segment are taken as objects of selection.

Eighteenth Embodiment

Figure 60:
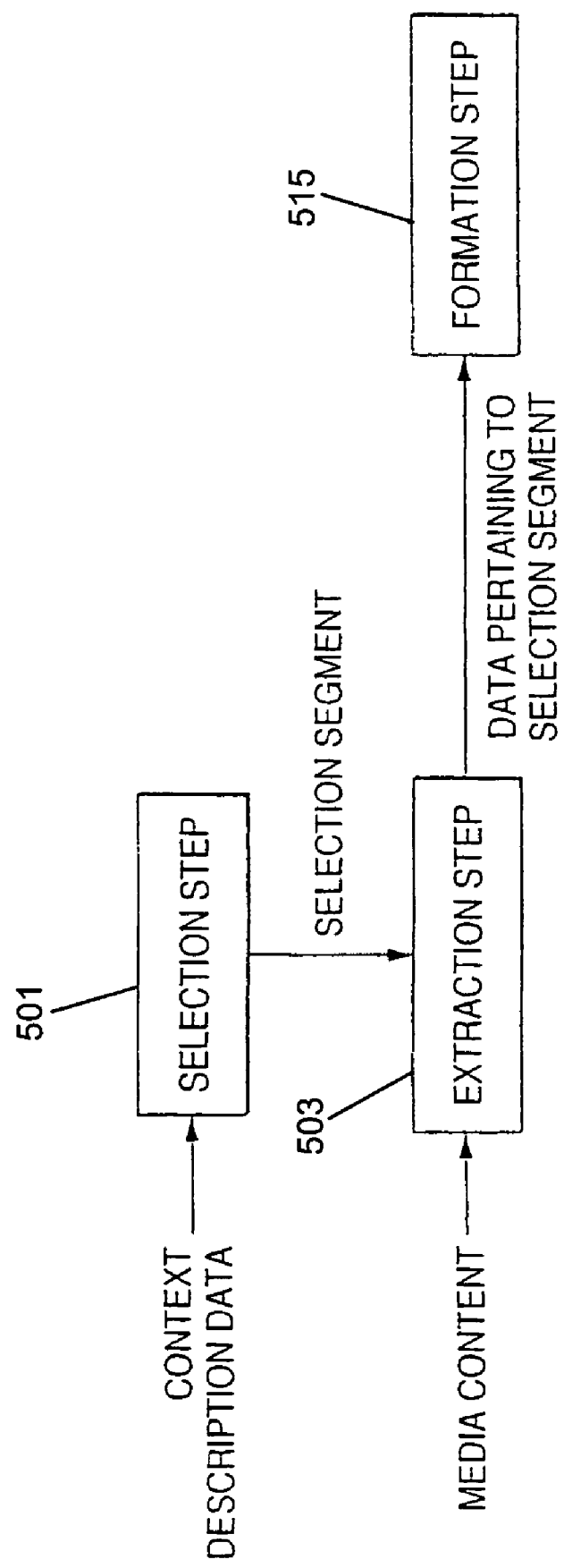
FIG. 60 is a block diagram showing a data processing method according to a eighteenth embodiment of the present invention.

An eighteenth embodiment of the present invention will now be described. FIG. 60 is a block diagram showing processing pertaining to a data processing method of the present embodiment. In the drawing, reference numeral 501 designates a selection step; 503 designates an extraction step; and 515 designates a formation step. Since the selection step 501 and the extraction step 503 are identical with those described in connection with the fourteenth embodiment, repetition of their explanations is omitted here.

In the formation step 515, a stream of media content is formed from the data pertaining to a selected segment extracted in the extraction step 503. Particularly, in the formation step 515 a stream is formed by multiplexing the data output in the extraction step 503.

Nineteenth Embodiment

Figure 61:
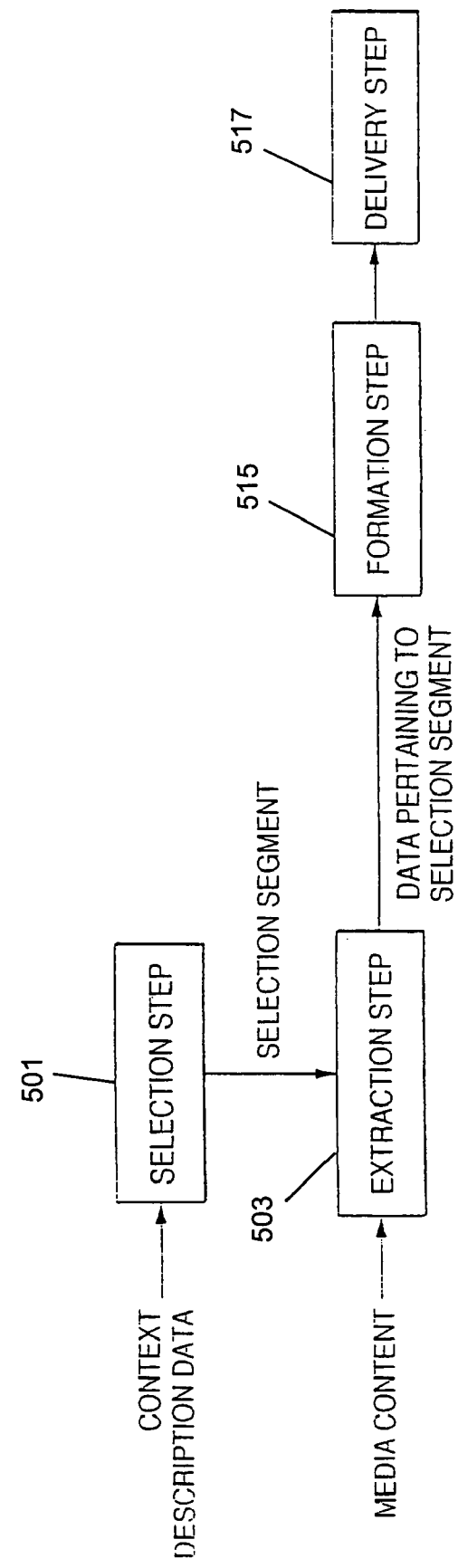
FIG. 61 is a block diagram showing a data processing method according to a nineteenth embodiment of the present invention.

A nineteenth embodiment of the present invention will now be described. FIG. 61 is a block diagram showing processing pertaining to a data processing method of the present embodiment. In the drawing, reference numeral 501 designates a selection step; 503 designates an extraction step; 515 designates a formation step; and 517 designates a delivery step. Since the selection step 501 and the extraction step 503 are identical with those described in connection with the fourteenth embodiment, repetition of their explanations is omitted here. Further, the formation step 515 is identical with the formation step described in connection with the eighteenth embodiment, and hence repetition of its explanation is omitted.

In the delivery step 517, the stream formed in the formation step 515 is delivered over a line. The delivery step 517 may include a step of determining the traffic volume of the line, and the formation step 515 may include a step of adjusting the amount of data constituting the file, on the basis of the traffic volume of the line determined in the delivery step 517.

Twentieth Embodiment

Figure 62:
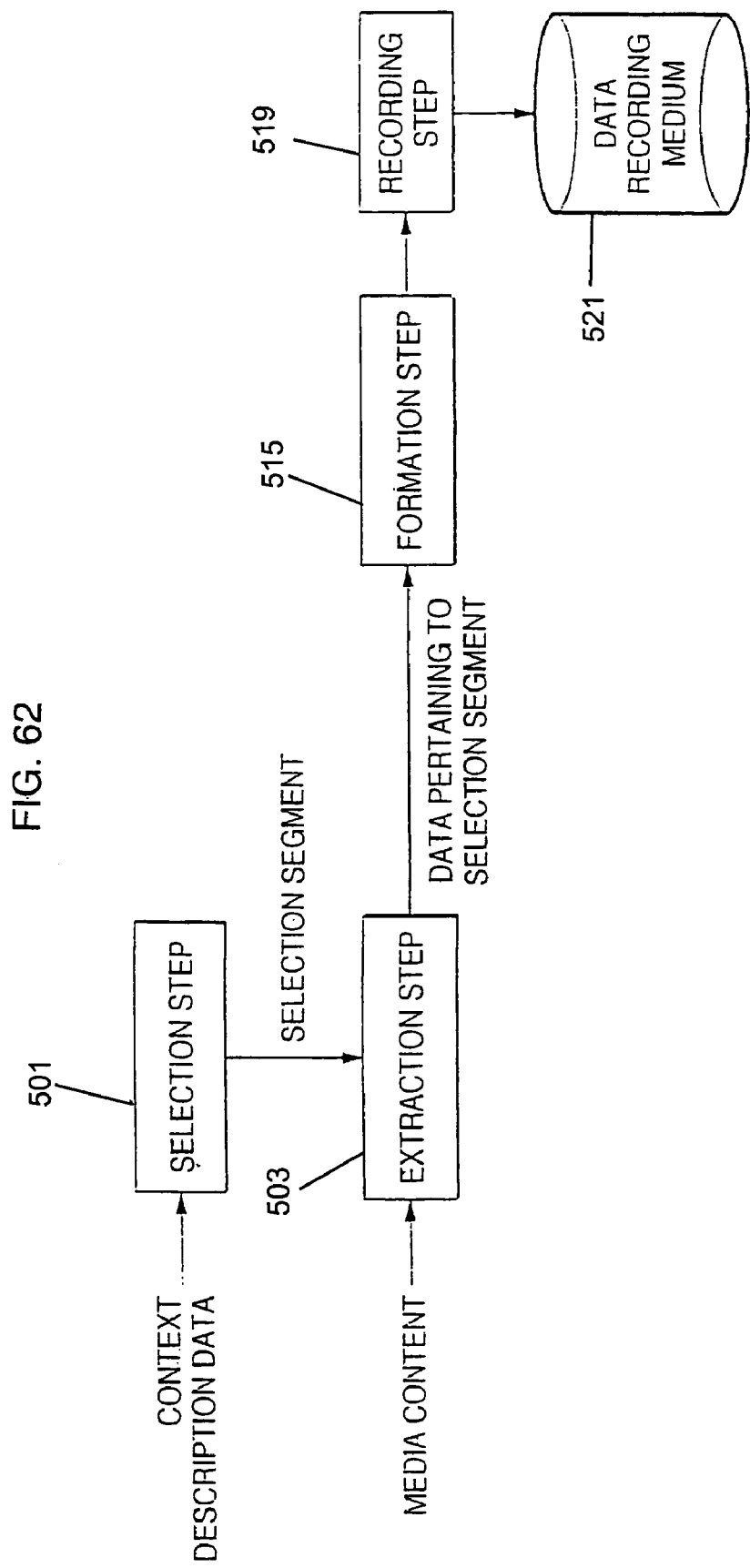
FIG. 62 is a block diagram showing a data processing method according to a twentieth embodiment of the present invention.

A twentieth embodiment of the present invention will now be described. FIG. 62 is a block diagram showing processing pertaining to a data processing method of the present embodiment. In the drawing, reference numeral 501 designates a selection step; 503 designates an extraction step; 515 designates a formation step; 519 designates a recording step; and 521 designates a data recording medium. In recording step 519, the stream formed in the formation step 515 is recorded on the data recording medium 521. The data recording medium 521 is used for recording a media content, context description data pertaining to the media content, and structure description data pertaining to the media content. The data recording medium 521 such as a hard disk, memory, or DVD-RAM and so on. Since the selection step 501 and the extraction step 503 are identical with those described in connection with the fourteenth embodiment, repetition of their explanations is omitted here. Further, the formation step 515 is identical with the formation step described in connection with the eighteenth embodiment, and hence repetition of its explanation is omitted.

Twenty-First Embodiment

Figure 63:
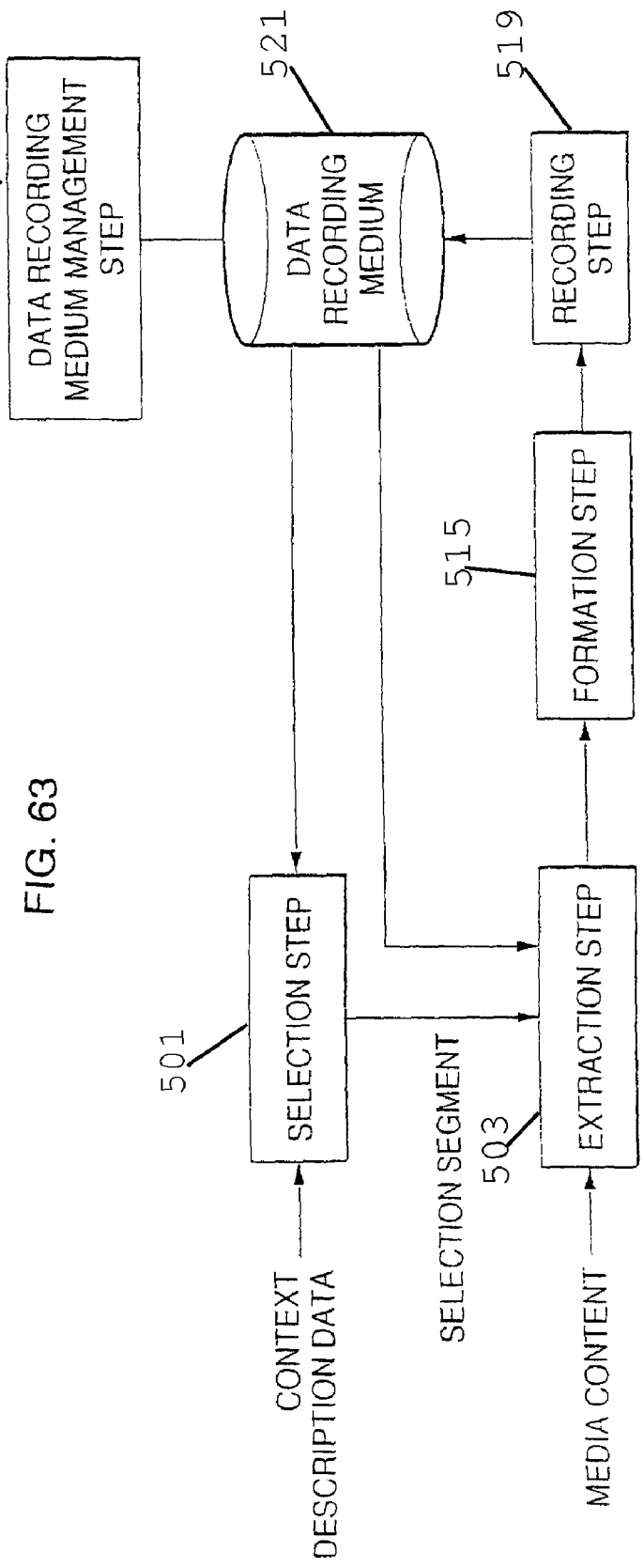
FIG. 63 is a block diagram showing a data processing method according to a twenty-first embodiment of the present invention.

A twenty-first embodiment of the present invention will now be described. FIG. 63 is a block diagram showing processing pertaining to a data processing method of the present embodiment. In the drawing, reference numeral 501 designates a selection step; 503 designates an extraction step; 515 designates a formation step; 519 designates a recording step; 521 designates a data recording medium; and 523 designates a data recording medium management step. In data recording medium management step 523, the media content which has already been stored and/or media content which is to be newly stored are reorganized according to the available disk space of the data recording medium 521. More specifically, in the data recording medium management step 523, at least one of the following processing operations is performed. When the available disk space of the data recording medium 521 is small, a media content to be newly stored is stored after having been subjected to edition. Context description data and structure description data, both pertaining to the media content which has already been stored, are sent to the selection step 501. The media content and the structure description data are sent to the extraction step 503. The media content is reorganized, and the thus-reorganized content is recorded on the data recording medium 521. Further, the media content which has not been reorganized is deleted.

Since the selection step 501 and the extraction step 503 are identical with those described in connection with the fourteenth embodiment, repetition of their explanations is omitted here. Further, the formation step 515 is identical with the formation step described in connection with the eighteenth embodiment, and hence repetition of its explanation is omitted. Moreover, since recording step 519 and data recording medium 521 are identical with those described in connection with the nineteenth embodiment, repetition of their explanations is omitted here.

Twenty-Second Embodiment

Figure 64:
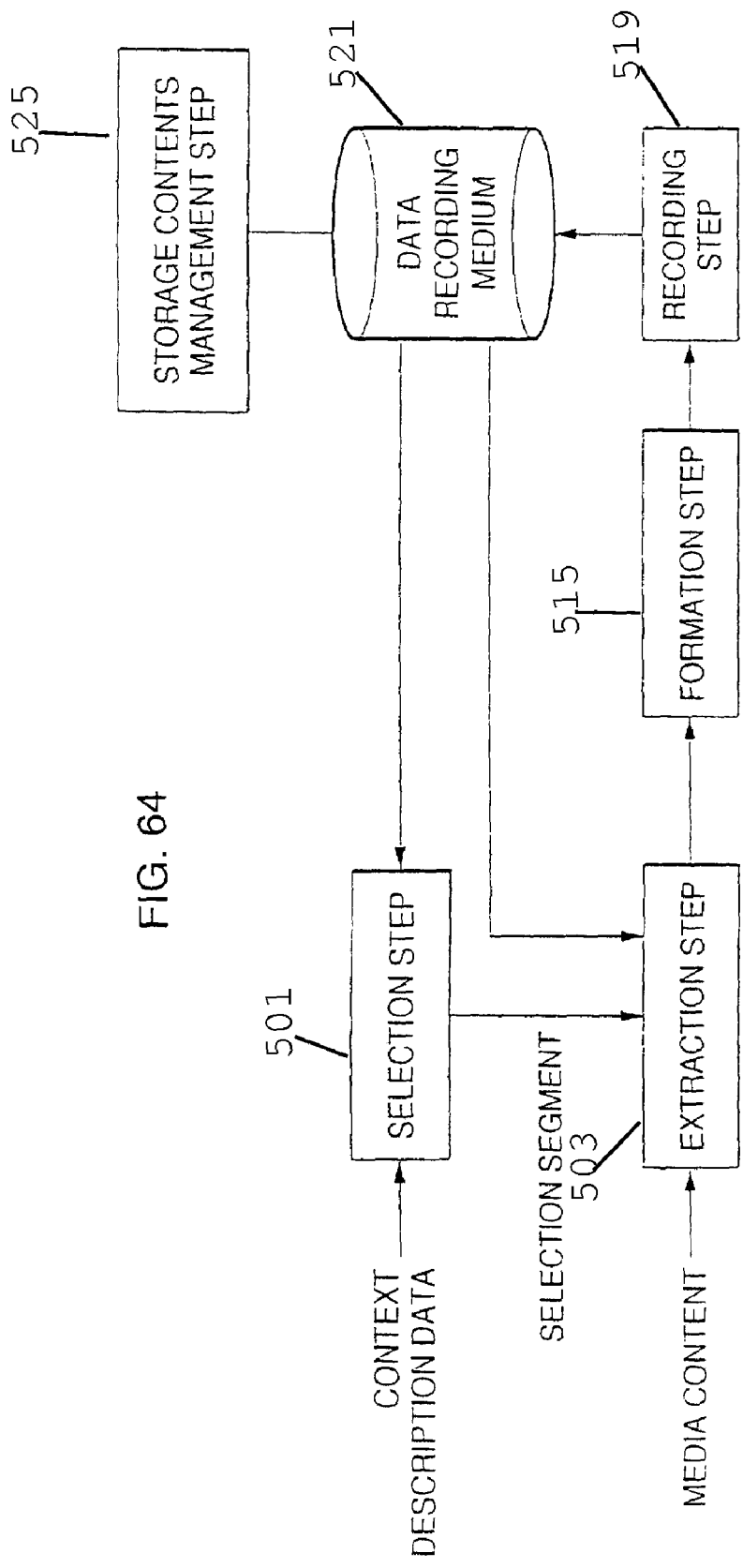
FIG. 64 is a block diagram showing a data processing method according to a twenty-second embodiment of the present invention.

A twenty-second embodiment of the present invention will now be described. FIG. 64 is a block diagram showing processing pertaining to a data processing method of the present embodiment. In the drawing, reference numeral 501 designates a selection step; 503 designates an extraction step; 515 designates a formation step; 519 designates a recording step; 521 designates a data recording medium; and 525 designates a stored content management step. In the stored content management step 525, the media content which have already been stored in the data recording medium 521 are reorganized according to the period of storage of the media content. More specifically, the stored content management step 525 comprises steps of: managing the media content stored in the data recording medium 521; sending context description data and physical content data, which pertain to a media content which have been stored over a predetermined period of time, to the selection step 501; sending the media content and the structure description data to the extraction step 503; re-organizing the media content; recording the thus-reorganized media content onto the data recording medium 521; and deleting the media content which has not been re-organized yet.

Since the selection step 501 and the extraction step 503 are identical with those described in connection with the fourteenth embodiment, repetition of their explanations is omitted here. Further, the formation step 515 is identical with the formation step described in connection with the eighteenth embodiment, and hence repetition of its explanation is omitted. Moreover, since recording step 519 and data recording medium 521 are identical with those described in connection with the nineteenth embodiment, repetition of their explanations is omitted here.

In the previously-described fourteenth through twenty-second embodiments, the selection steps 501 and 513 can be embodied as selection means; the video the selection step 507 can be embodied as video selection means; the audio the selection step 509 can be embodied as audio selection means; the determination step 511 can be embodied as determination means; the formation step 515 can be embodied as formation means; the delivery step 517 can be embodied as delivery means; the recording step 519 can be embodied as recording means; the data recording medium management step 523 can be embodied as data recording medium management means; and the stored content management step 525 can be embodied as stored content management means. There can be embodied a data processing device comprising a portion of these means or all of the means.

In the previous embodiments, the media content may include a data stream, such as text data, other than video and audio data. Further, individual steps of the previous embodiments may be embodied by storage, into a program storage medium, of a program for causing the computer to perform processing pertaining to all or a portion of the steps in the form of software or through use of a hardware circuit specifically designed so as to exhibit the features of the steps.

Figure 69:
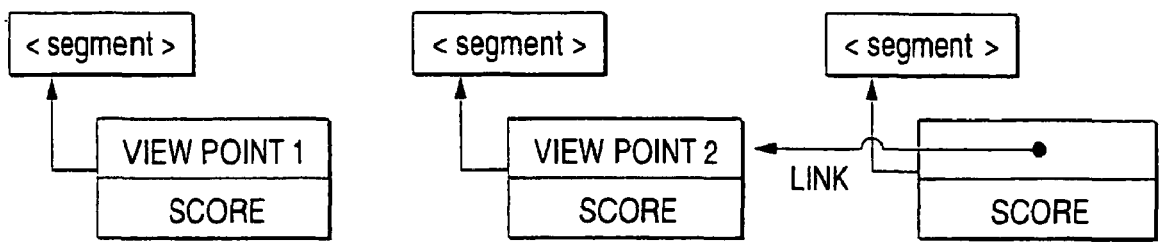
FIG. 69 is a diagram showing a link of a view point in the program expression of the context description data.

In the program expression of the context description data capable of being subjected to the software processing using a computer, when a view point added to a <section> or <segment> overlaps with a view point of another <section> or <segment>, as shown in FIG. 69, a view point may be added to one of the <sections> or <segments> and the another <section> or <segment> may be represented as being linked to the view point thus added.

Figure 70:
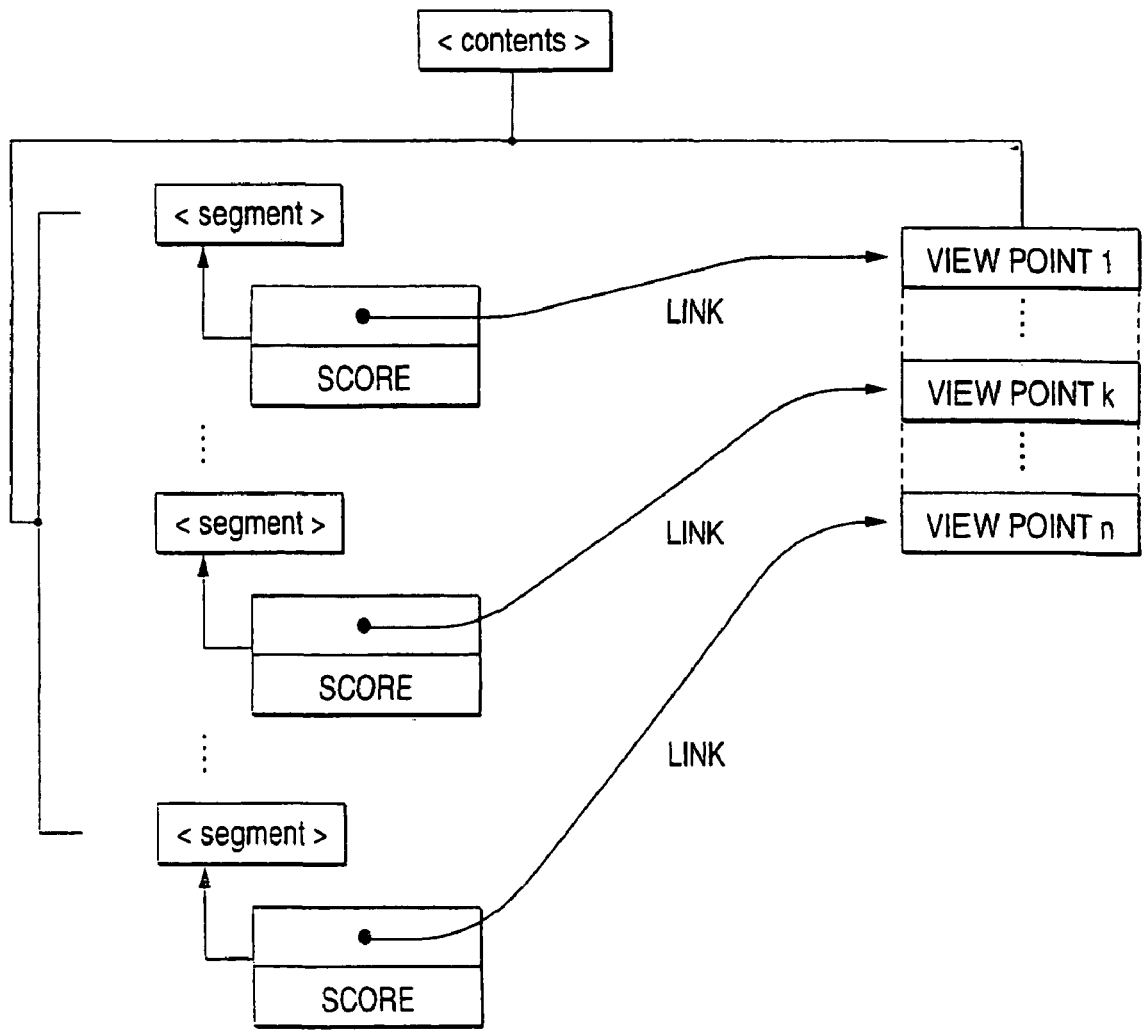
FIGS. 70 to 72 are diagrams showing a view point table and links of view points in the program expression of the context description data.

Further, as shown in FIG. 70, a view point table formed by collecting all the view points expressed in the context description data may be configured as a child element of the <contents> which are the root in the data structure of the context description data and may be arranged in a manner that each of the <sections> or <segments> is added with a set of a link to the corresponding view point in the view point table and a score for the view point thus linked. According to such a configuration, since it becomes easy to show a list of the view points having been registered (hereinafter called as a view point list) to a user in advance, the user can know the view points having been registered in advance before requesting a preferred view point. Thus, when a view point desired by a user exists in the view point list, the user can request the view point through the selecting procedure from the view point list. In this respect, the view point table may be configured not only as the child element of the <contents> but also as a child element of the <sections> or <segments>, or may be configured to be described separately.

Figure 71:
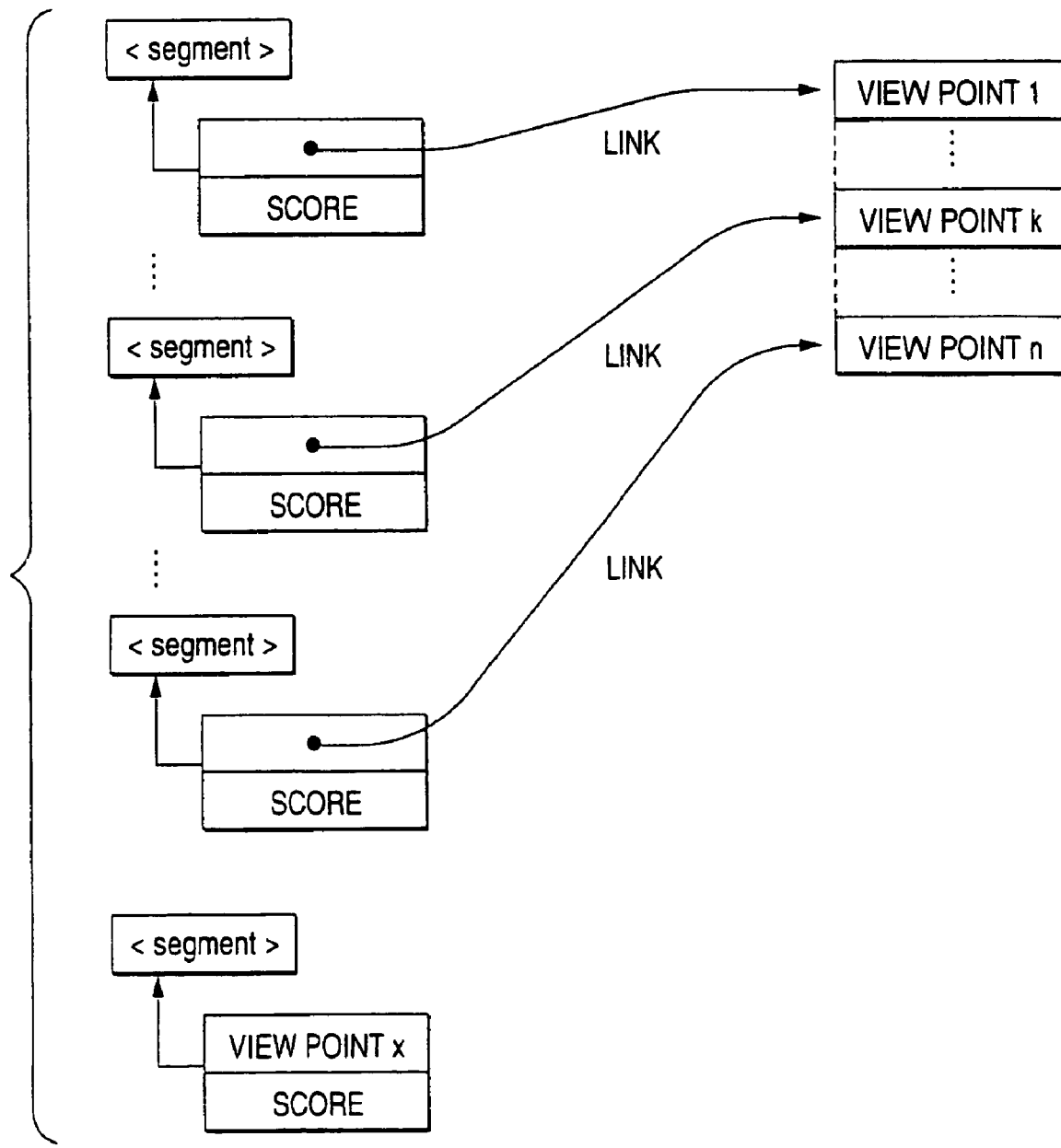

Further, as shown in FIG. 71, the view point table may be arranged as a mixed type view point table wherein all the view points are not expressed so as to be linked to the view point table but only a part of the view points is linked to the view point table. In this case, all the view points expressed in the context description data are not necessarily described in the view point table and only the view points referred by the links are registered in the view point table.

Figure 72:
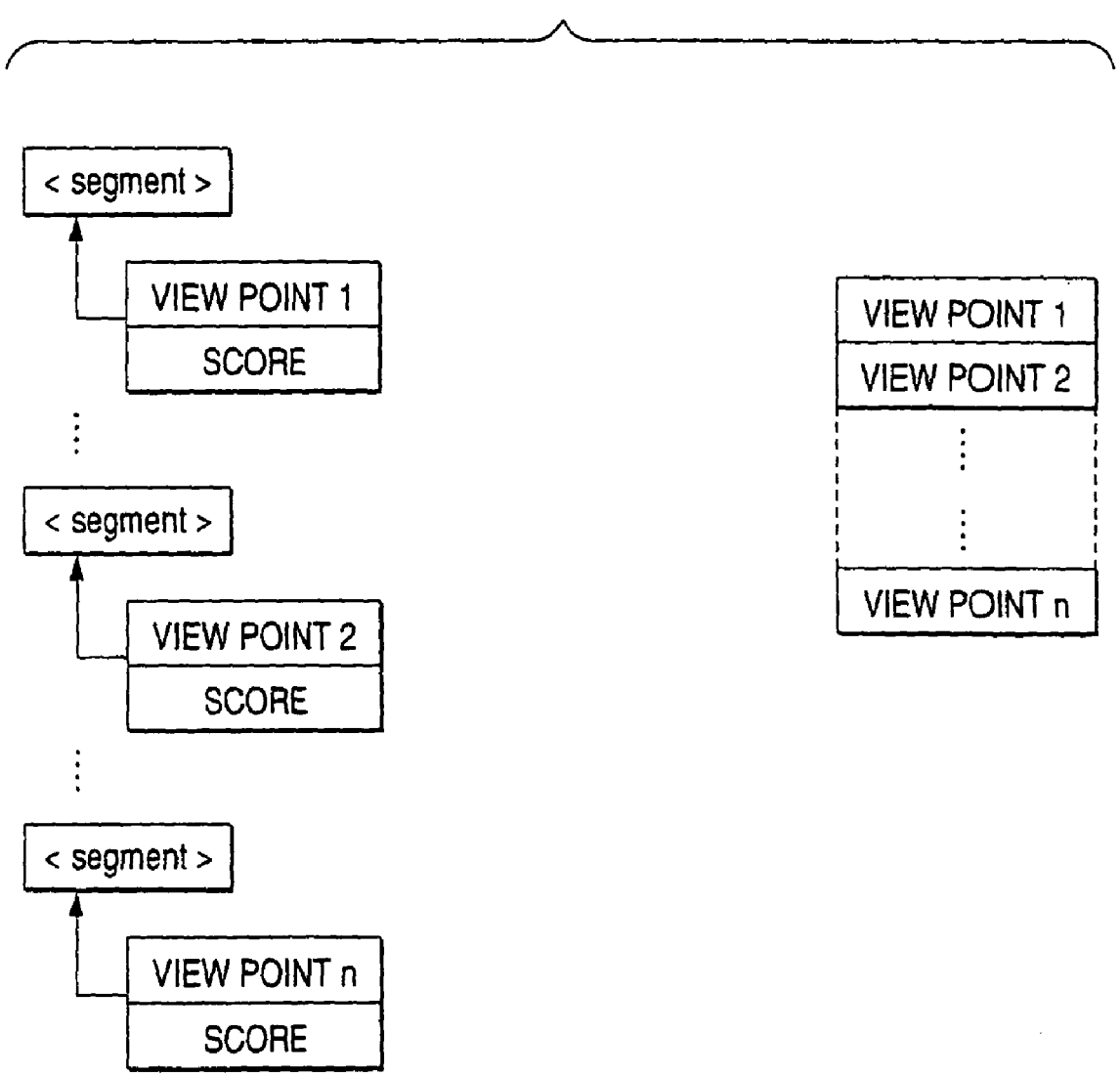

Further, when a view point table representing the list of the view points existing in the context description data is configured so as to be described separately as shown in FIG. 72, the view point list based on the view point table can be shown to a user before the user requests a preferred view point. In this case, the user can know the view points existing in the context description data before requesting the preferred view point, and also can request the view point by the selecting procedure from the view point list.

Figure 73A:
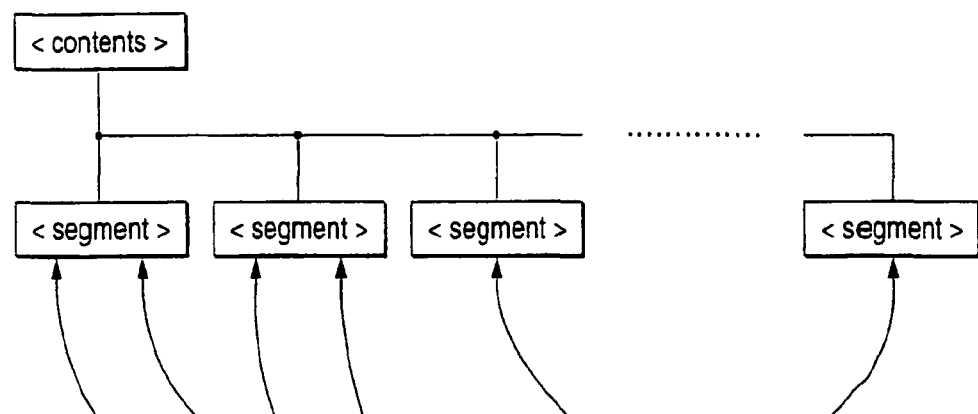
FIGS. 73 to 76 are diagrams showing the data structure of the context description data formed by a data structure portion and an attribute portion.
Figure 73B:
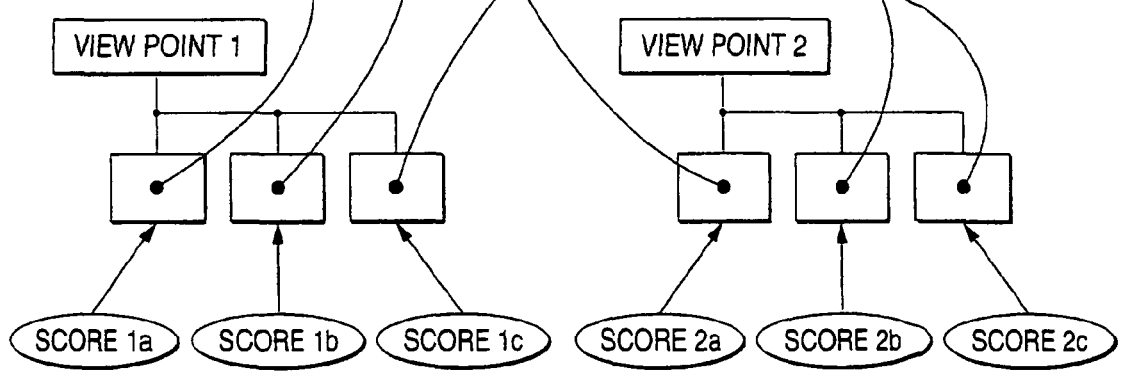

Further, as shown in FIG. 73, the context description data may be expressed in such a configuration that it is divided into a data structure portion describing the data structure and an attribute portion describing view points as attributes, links to the data structure portion and scores thereof. In FIG. 73, an upper portion (a) represents the data structure portion and a lower portion (b) represents the attribute portion. In this figure, although the data structure portion is described as the most simple configuration, the data structure portion may be arranged in the same configuration as the aforesaid embodiment. Further, the attribute portion is arranged in a manner that, at every view point, links to the subject <sections> or <segments> and scores related to the links of the view point are unified as a set.

Figure 74A:
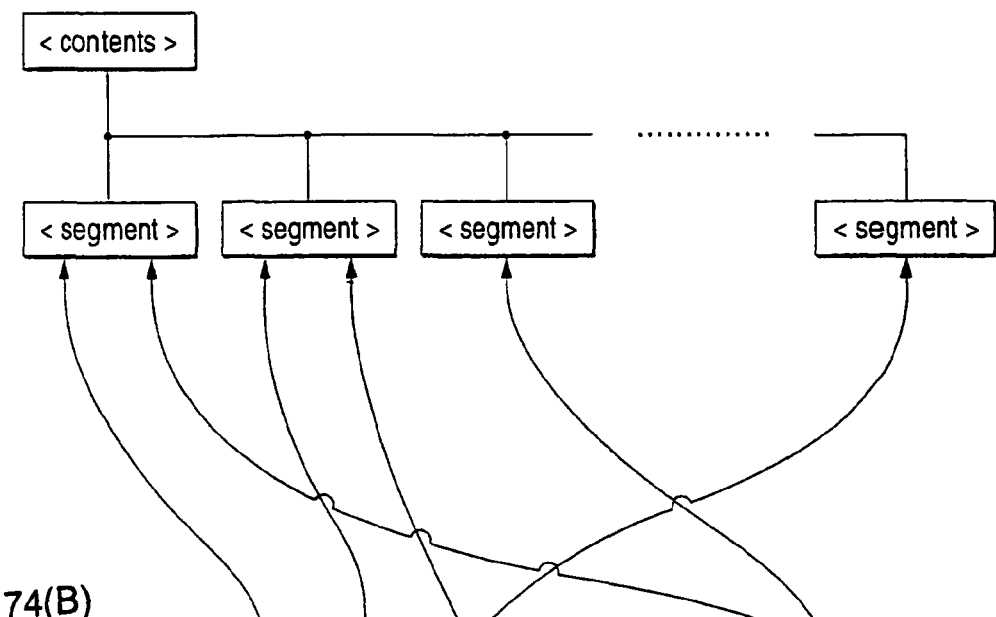
Figure 74B:
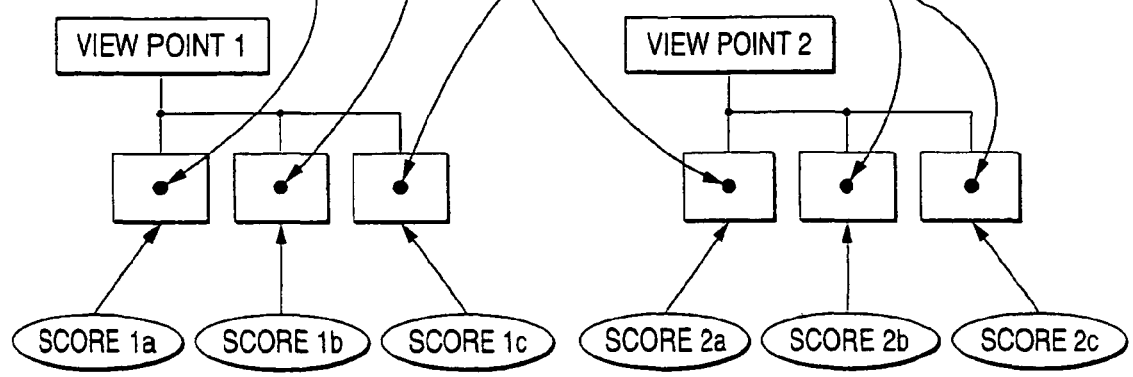

The data structure portion and the attribute portion may not be described in the same file but may be described in separate files. Further, in the context description data arranged to be divided into the data structure portion and the attribute portion, the selection step (selection means) selects the <segment> or <section> based on the score at every subject view point of the attribute portion. Further, as shown in FIG. 74, the respective view points of the attribute portion and the <sections> or <segments> of the data structure portion may be coupled by bi-directional links. In this case, the selecting process designating the view point by the selection step (selection means) may also be performed by the method described in the aforesaid embodiment.

Figure 75A:
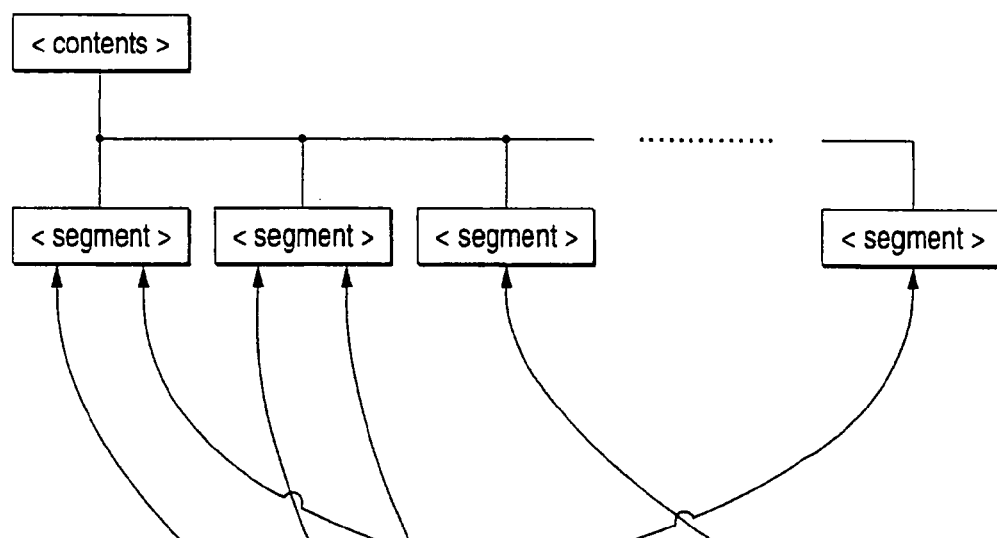
Figure 75B:
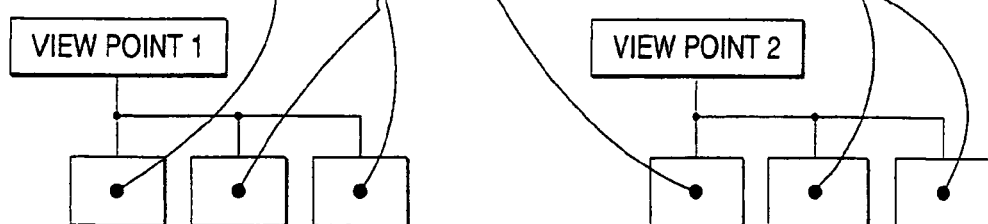

Further, as shown in FIG. 75, the context description data may be expressed in such a configuration that it is divided into a data structure portion describing the data structure and an attribute portion wherein at every view point the links to the data structure portion are described in the order of the higher score. However, according to such an expression, since there is a possibility that fine comparison becomes impossible in the case of comparing the scores among a plurality of the view points, the rough order of "high", "middle" and "low" is used.

Figure 76:
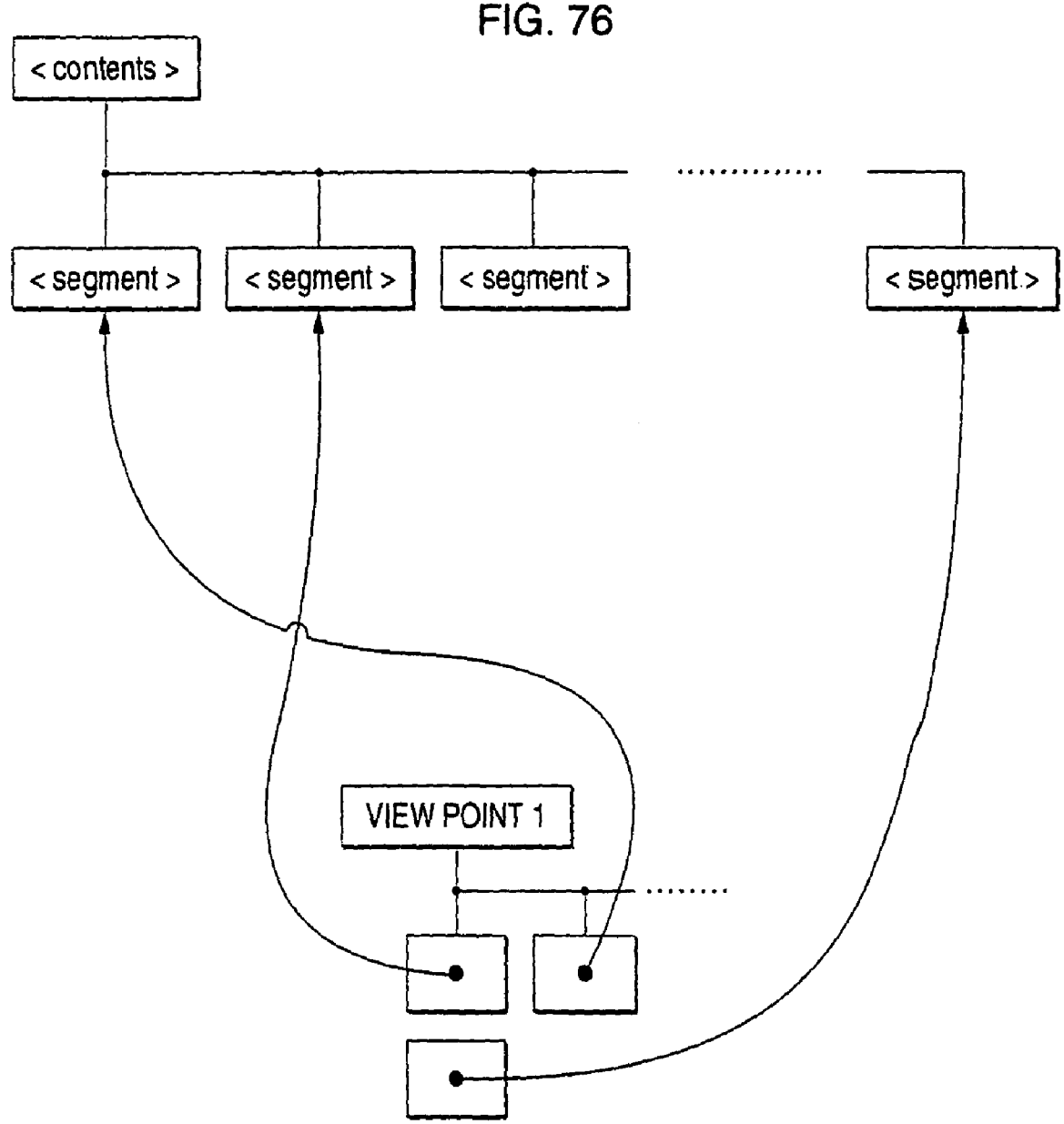

Furthermore, as shown in FIG. 76, the context description data may be expressed in such a configuration that it is divided into a data structure portion describing the data structure and an attribute portion wherein at every view point the links to the data structure portion are described in the order of the higher scores and the links of the same score are described so as to be arranged in two rows. In this case, the selecting process designating the view point by the selection step (selection means) may also be performed in the same manner as the processing performed as to the context description data shown in FIG. 74.

Then, explanation will be made as to a context date converting method for converting the context description data of a tree structure into context description data (hereinafter called second context description data) which differs in the data structure from the context description data of a tree structure. In this respect, the context description data of a tree structure is arranged in a manner as shown in FIG. 29 that it is configured by <contents> as a root, <sections> as nodes and <segments> as leaves, each of the <sections> and <segments> is added as an attribute with at least one set (keyword, priority) of a "keyword" which is a keyword representing contents or a person etc. of a scene and a "priority" representing the degree of importance, and each of the <segments> is further added as time information of the scene with "start" representing start time and "end" representing end time or "duration" representing duration time.

In this specification, three kinds of context date converting methods will be explained. Hereinafter, the explanation will be made as to the data structures of the second context description data which are prepared by the respective context date converting methods and then examples of the respective context date converting methods will be explained.

(First Embodiment of the Context Date Converting Method)

Figure 77:
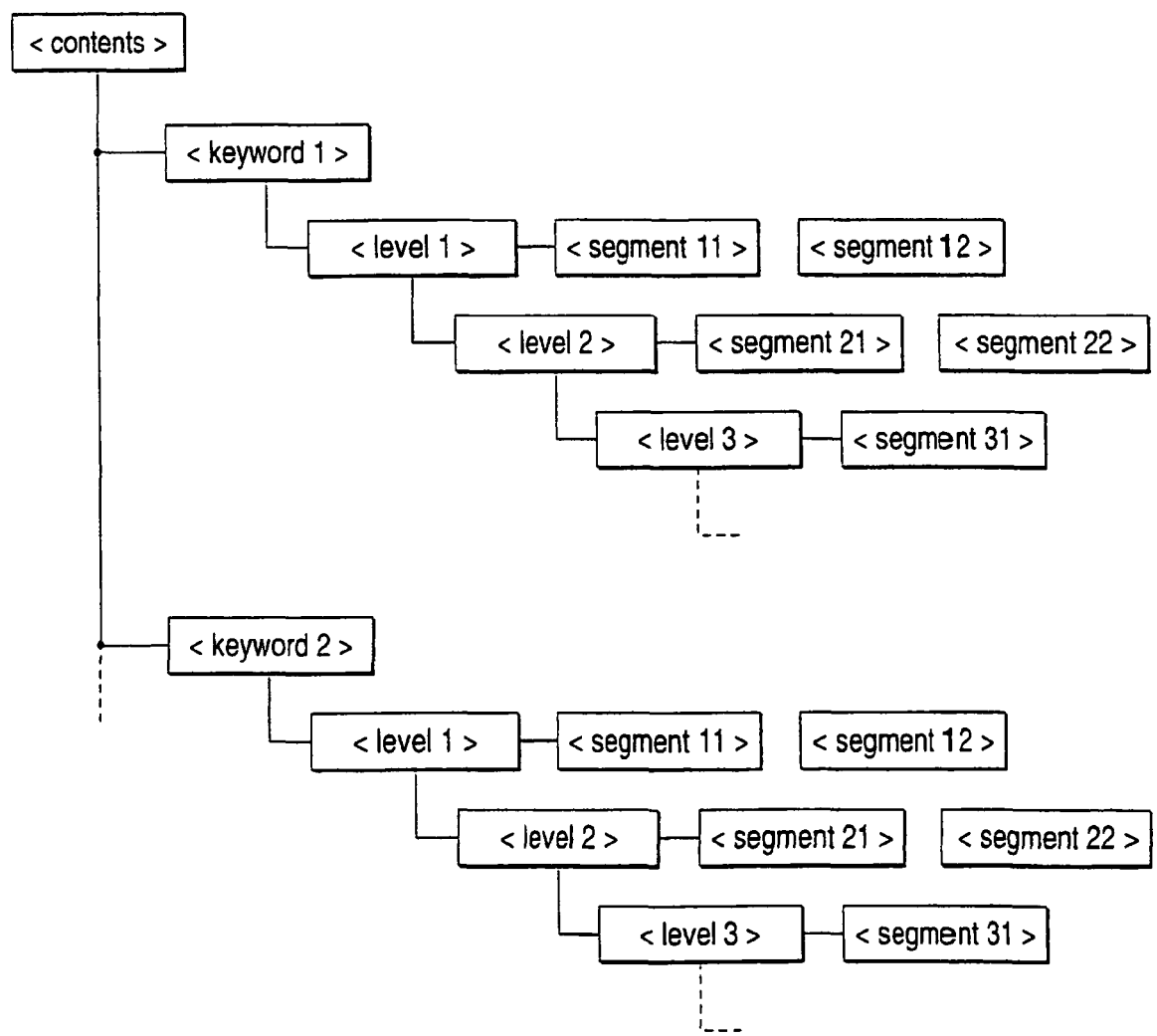
FIGS. 77 to 79 are diagrams showing the data structure of the second context description data formed by the first embodiment of the context description data converting method.
Figure 78:
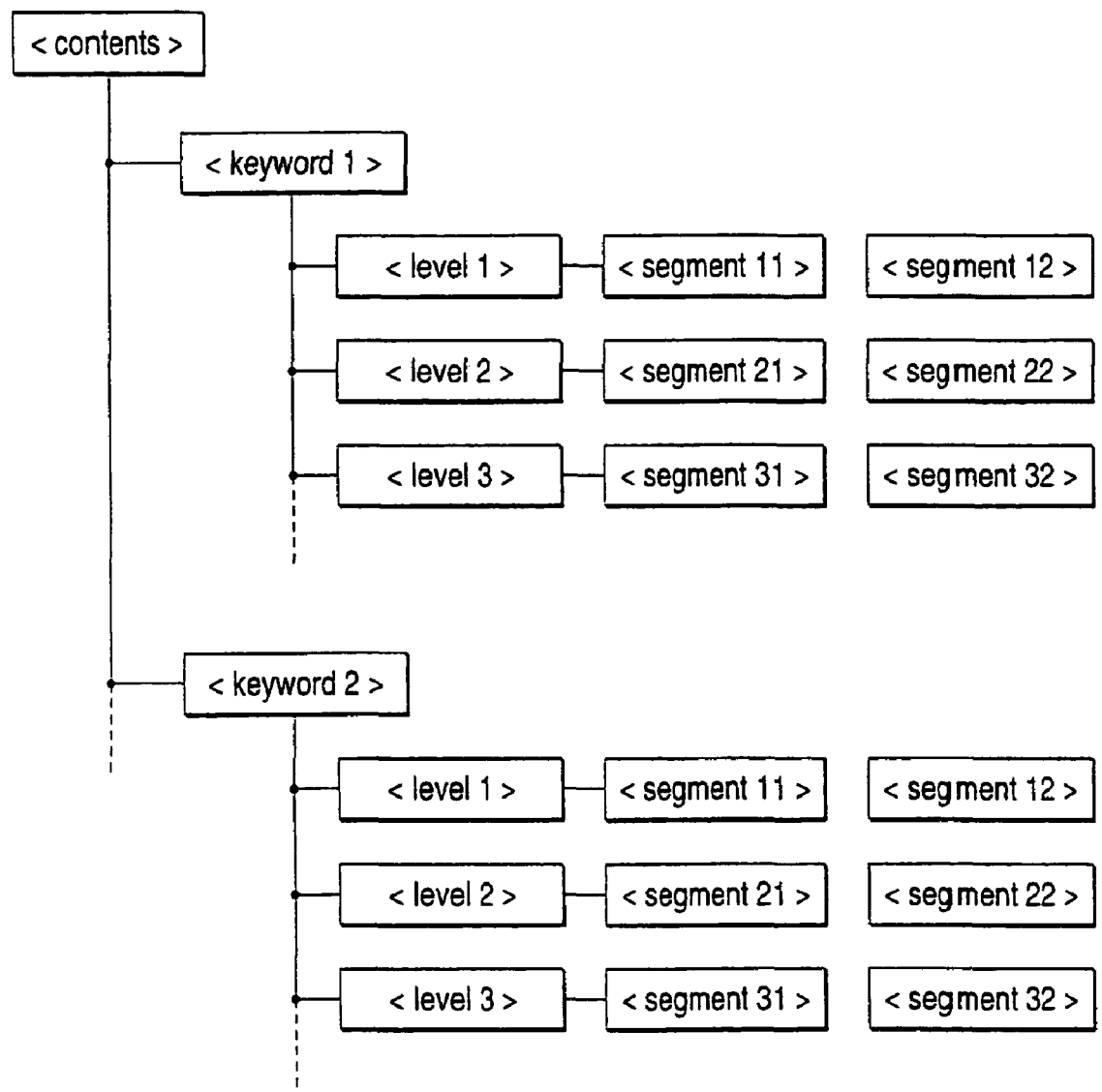

First, the second context description data prepared by the first embodiment of the context date converting method is configured in a tree structure as shown in FIGS. 77 and 78 by <contents> as a root, <keywords> as child elements of the <contents>, <levels> as child elements of each of the <keywords> and <segments> as a child element of a <level>. In this respect, the element (node) of the <section> existing in the original context description data shown in FIG. 29 is not described in the second context description data. In the second context description data, the brother relationship of the tree structure is also arranged in time sequence from the left side. Further, each of the <segments> is added with time information (start, end) which is originally added thereto.

The <level> of the second context description data is determined based on the "priority" used in the context description data shown in FIG. 29 and represents the degree of the importance. When the "priority" is expressed by an integer number, an integer number allotted to the "priority" is used as it is as the <level>. In contrast, when the "priority" is expressed by a decimal point, <level> is newly set in accordance with a level of a value allotted to the "priority" so that the degree of the importance can be compared easily. For example, when three "priorities" of 0.2, 0.5 and 1.0 exist in the original context description data, <level 1> with the lowest degree of the importance is allotted to the "priority" of 0.2, <level 2> with the middle degree of the importance is allotted to the "priority" of 0.5, and <level 3> with the highest degree of the importance is allotted to the "priority" of 1.0.

Figure 79:
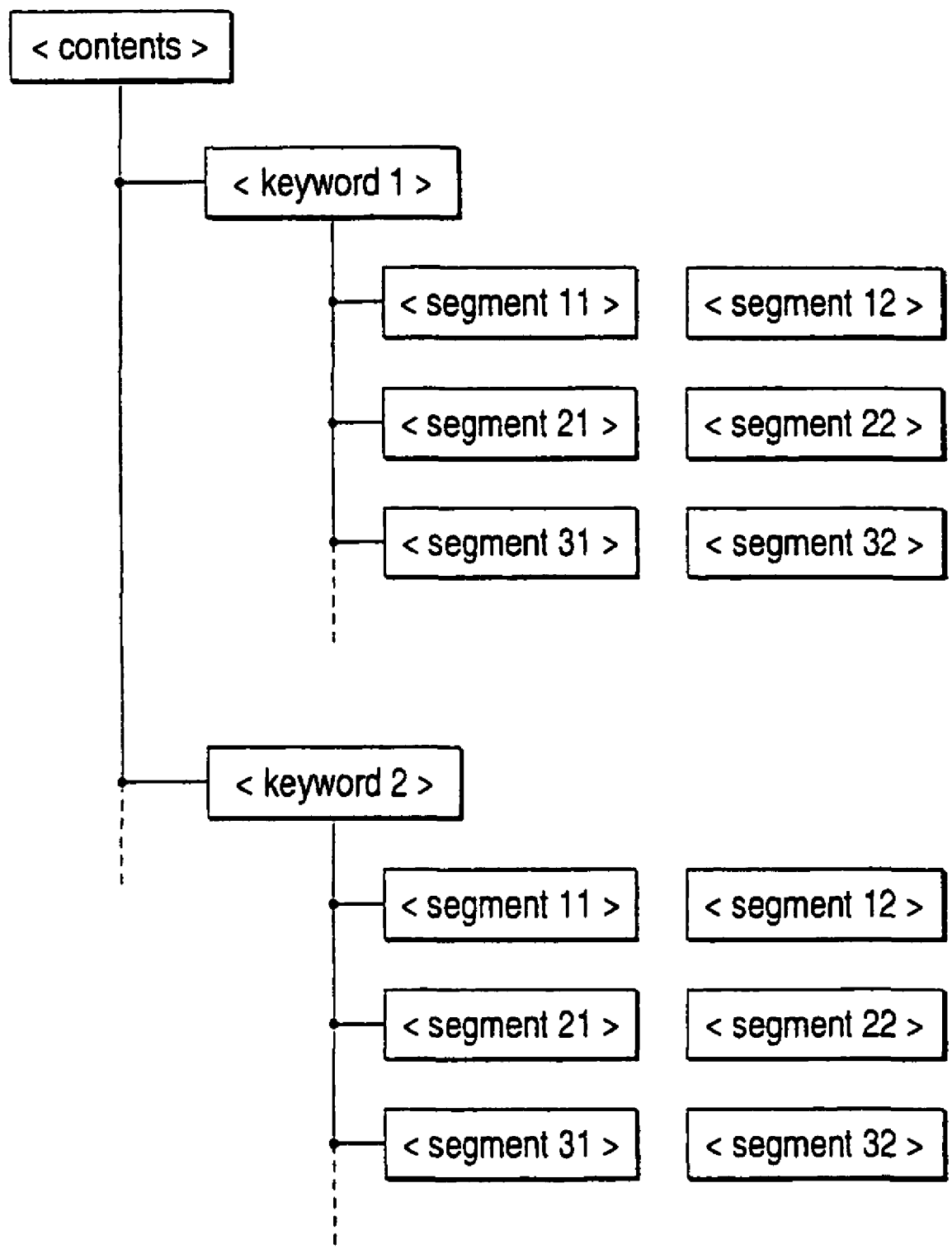

In this manner, the levels of the degree of the importance are set, and the data structure of the second context description data may be arranged in a nest form wherein the high-low relation of the <levels> is represented as a set relationship of the tree structure as it is as shown in FIG. 77, or may be arranged in a parallel form wherein the high-low relation of the <levels> is represented as the same layer as shown in FIG. 78. Further, the data structure of the second context description data may be arranged in a manner as shown in FIG. 79 that the child elements of the <keyword> except for the <level> information are set as <segments> and the degrees of the importance may be determined in accordance with the coupling order to the <keyword>. In this respect, since there is a possibility that fine comparison may not be performed at the time of comparing among a plurality of keywords, the comparison result may be represented roughly by "high", "middle" and "low", for example.

When a plurality of <segments> being continuously connected exist among the <segments> belonging to the same <keyword> and the same <level>, these plurality of <segments> may be collected as one set. For example, when there are the <segment 1> and the <segment 2> being continuously connected, these <segments> may be collected as a <segment A>. In this case, it is necessary to prepare time information to be added to the <segment A> thus collected on the basis of the time information (start, end) added to the respective <segments>.

Figure 80:
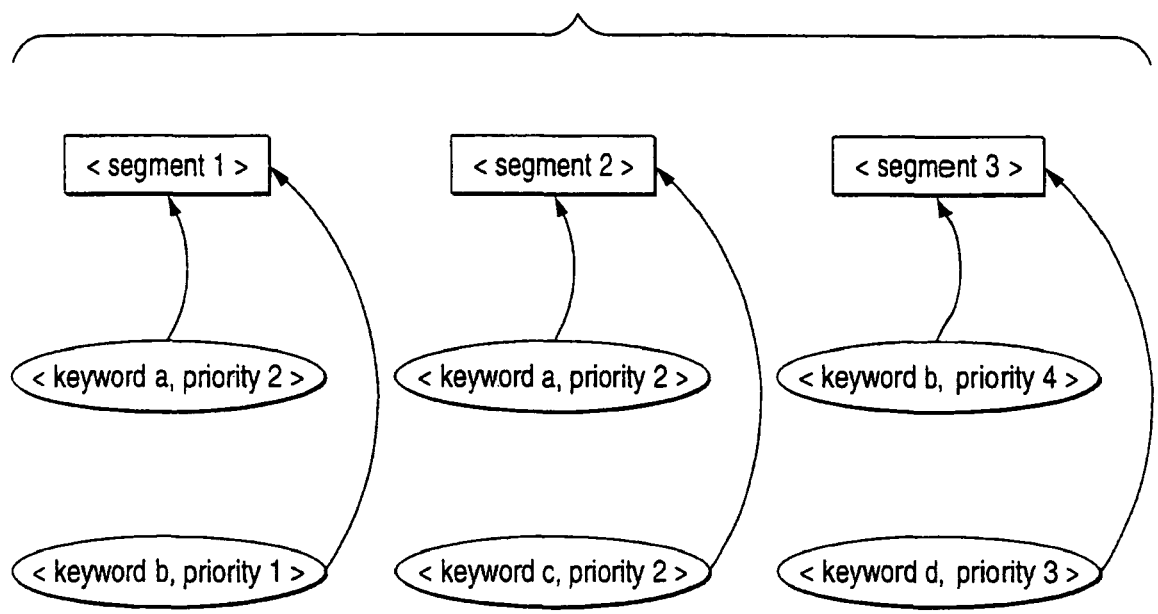
FIG. 80 is a diagram showing an example the <segments> and (keywords, priorities) of the original context description data.

Hereinafter, the first embodiment of the context date converting method will be explained by using an example of the original context description data. As shown in FIG. 80, the original context description data as an example used in the following explanation includes as leaves the <segment 1> added with (keyword a, priority 2) and (keyword b, priority 1) as attributes, the <segment 2> added with (keyword a, priority 2) and (keyword c, priority 2), and the <segment 3> added with (keyword b, priority 4) and (keyword d, priority 3).

First, a set of "keywords" added to the <segments> of the original context description data is obtained. {keyword a, keyword b, keyword c, keyword d} are obtained from an example of the original context description data (hereinafter merely called as an example). Then, a set of <segments> added with the same keyword is obtained at every keyword. In the example, a set formed by the <segment 1> (priority 2) and the <segment 2> (priority 2) is obtained as to the keyword a, a set formed by the <segment 1> (priority 1) and the <segment 3> (priority 4) is obtained as to the keyword b, a set formed by the <segment 2> (priority 2) is obtained as to the keyword c, and a set formed by the <segment 3> (priority 3) is obtained as to the keyword d.

Then, the sets of the segments are divided into groups at every priority. For example, in the set of the segments of the keyword a, since each of the segments is added with the priority 2, these two segments are collected as a group of the priority 2. As to the set of the segments of the keyword b, since the <segment 1> is added with the priority 1 and the <segment 3> is added with the priority 4, these segments are divided into a group of the priority 1 (only the <segment 1>) and a group of the priority 4 (only the <segment 3>). The segments of each of the keyword c and the keyword d are divided into groups in the same manner.

Then, the respective priorities are converted into "levels" representing the degrees of the importance. As described above, when the "priority" is expressed by an integer number, an integer number allotted to the "priority" is used as it is as the <level>. Thus, in the aforesaid example, the <segment> added with the priority N (N=1, 2, 3, 4, 5) is the segment of the level N.

Further, when the nest form is employed as the second context description data, the respective segments being grouped are set as a set relationship in accordance with the levels of the respective segments. In contrast, when the parallel form is employed, the respective segments being grouped are set as a brother relationship and arranged in the order of the higher level or the lower level.

Figure 81:
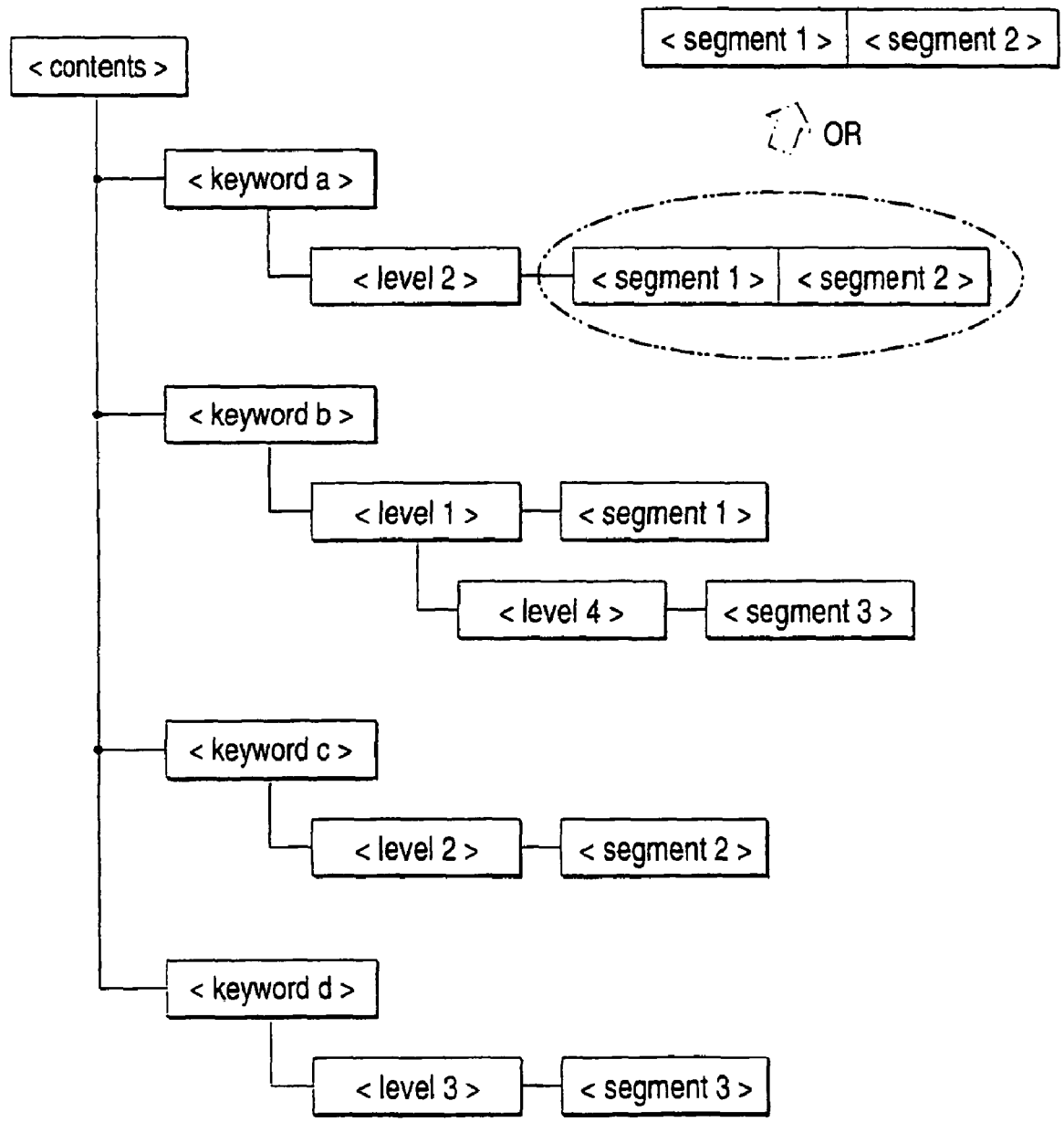
FIG. 81 is a diagram showing the data structure of the second context description data which is formed by converting the original context description data shown in FIG. 80 by the first embodiment of the context description data converting method.

The data structure of the second context description data thus prepared is shown in FIG. 81. In this figure, since there are the <segment 1> and the <segment 2> as the segments of the <keyword a> and the <level 2>, these segments may be collected as a <segment A>, for example, when these segments are continuously connected with no gap of time.

(Second Embodiment of the Context Date Converting Method)

Figure 82:
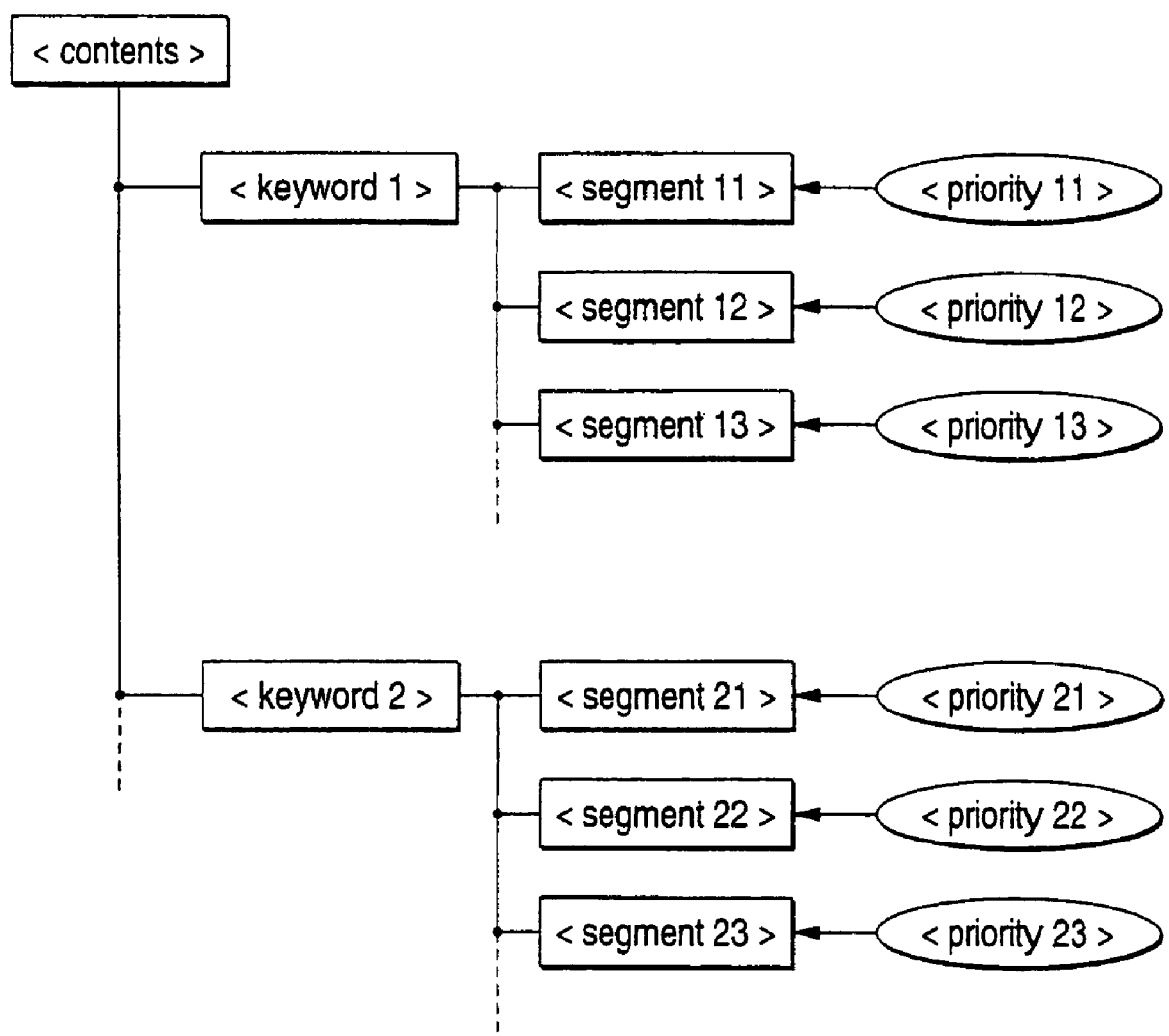
FIG. 82 is a diagram showing the data structure of the second context description data formed by the second embodiment of the context description data converting method.

The second context description data prepared by the second embodiment of the context date converting method is configured in a tree structure as shown in FIG. 82 by <contents> as a root, <keywords> as child elements of the <contents> and <segments> as child elements of each of the <keywords>. In this respect, each of the <segments> is added with a "priority" as an attribute.

In this second context description data, like the second context description data prepared by the first embodiment of the context date converting method, the <section> is not described and each of the <segments> is added with time information (start, end) in addition to the "priority". Since the second embodiment of the context date converting method does not convert the priority into the level, the context date converting method of this embodiment does not describe the <level> which is described in the second context description data prepared by the first embodiment of the context date converting method.

Hereinafter, the second embodiment of the context date converting method will be explained by using an example of the original context description data used above. First, like the first embodiment of the context date converting method, a set of "keywords" added to the <segments> of the original context description data is obtained. Then, a set of <segments> added with the same keyword is obtained at every keyword. Then, each of the <segments> is added with a priority which was added originally.

Figure 83:
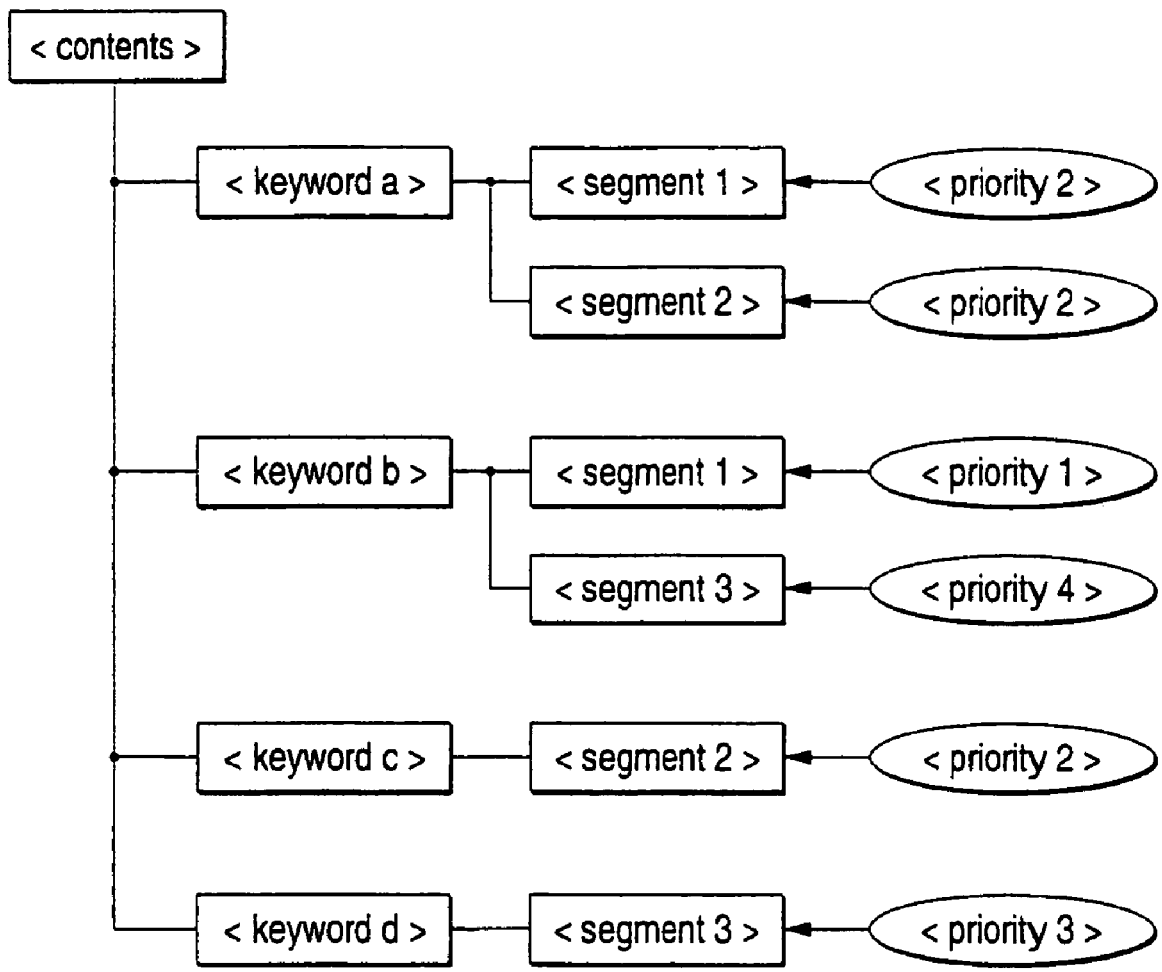
FIG. 83 is a diagram showing the data structure of the second context description data which is formed by converting the original context description data shown in FIG. 80 by the second embodiment of the context description data converting method.

The data structure of the second context description data thus prepared is shown in FIG. 83. In this figure, since there are the <segment 1> and the <segment 2> as the segments of the <keyword a>, these segments may be collected as a <segment A>, for example, when these segments are continuously connected with no gap of time and the priorities added to these segments are same.

(Third Embodiment of the Context Date Converting Method)

Figure 84:
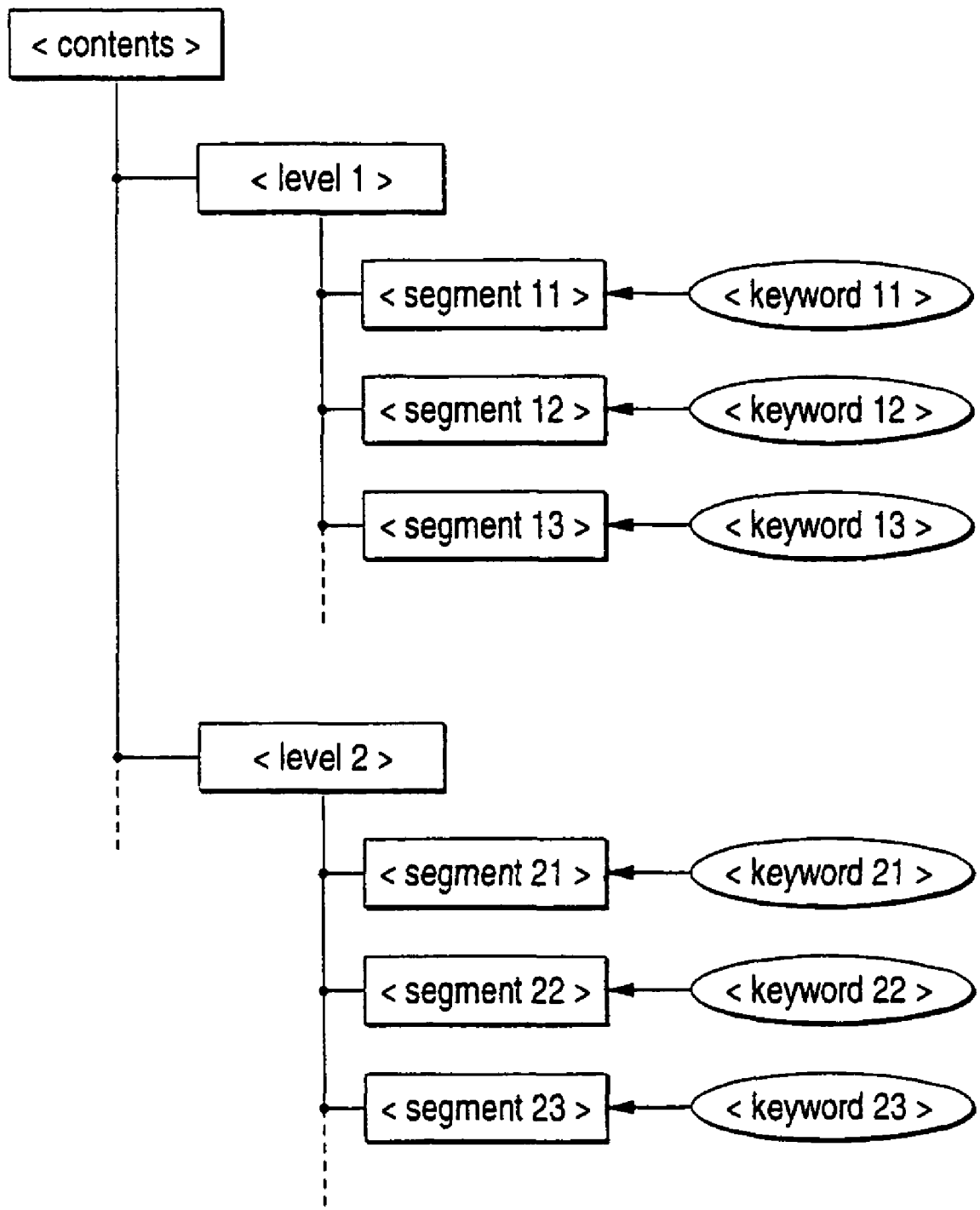
FIG. 84 is a diagram showing the data structure of the second context description data formed by the third embodiment of the context description data converting method.
Figure 85:
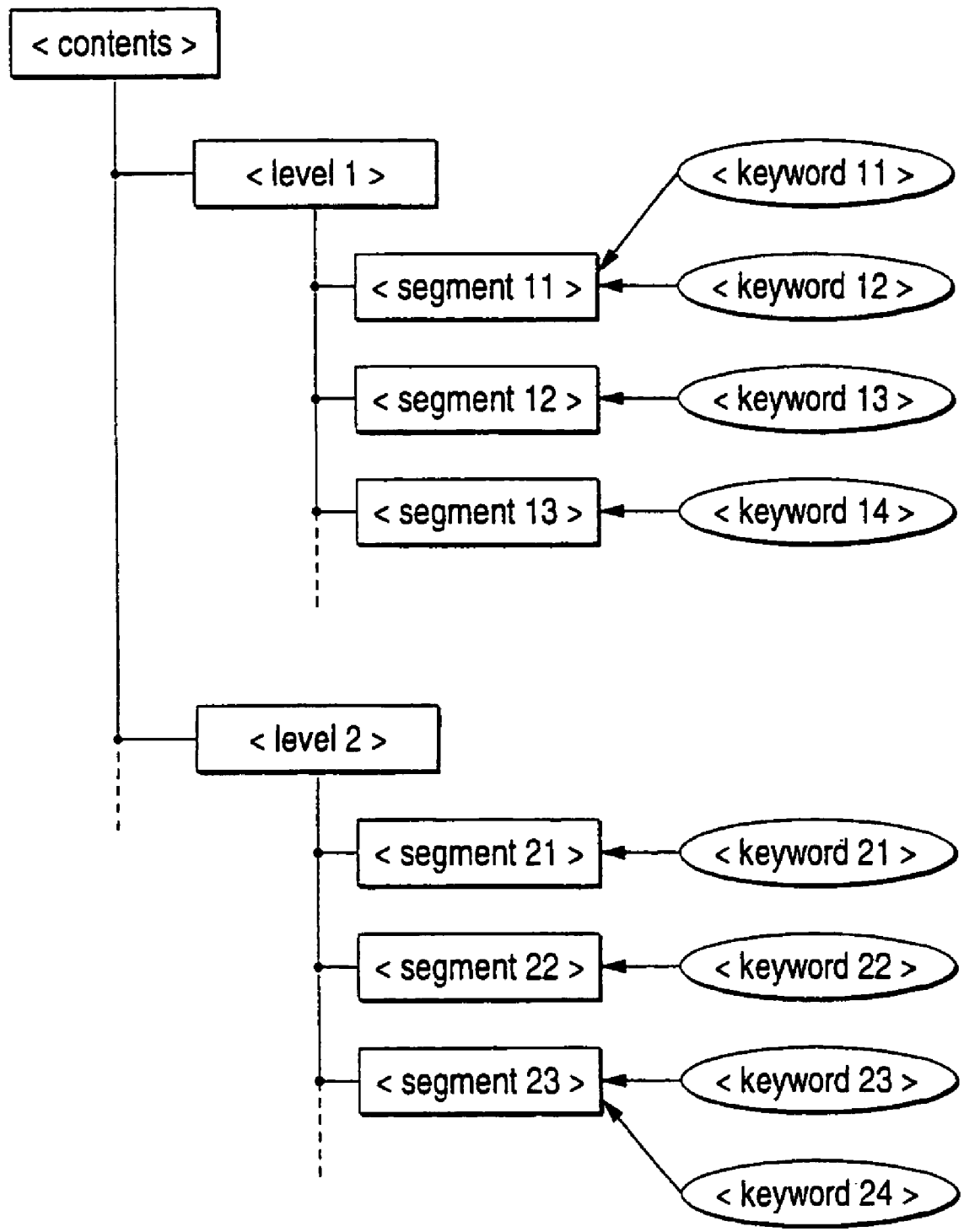
FIG. 85 is a diagram showing another data structure of the second context description data formed by the third embodiment of the context description data converting method.

The second context description data prepared by the third embodiment of the context date converting method is configured in a tree structure as shown in FIGS. 84 and 85 by <contents> as a root, <levels> as child elements of the <contents> and <segments> as child elements of each of the <levels>. In this respect, each of the <segments> is added with a "keyword" as an attribute.

In this second context description data, like the second context description data prepared by the first embodiment of the context date converting method, the <section> is not described and each of the <segments> is added with time information (start, end) in addition to the "priority".

Hereinafter, the third embodiment of the context date converting method will be explained by using an example of the original context description data used above. First, a set of <segments> added with the same priority is obtained at every priority based on the "priorities" added to the <segments> of the original context description data. In the example of the original context description data shown in FIG. 80, a set formed by the <segment 1>, the (keyword b) is obtained as to the priority 1, a set formed by the <segment 1>, the (keyword a) and a set formed by the <segment 2>, the (keyword a, keyword c) are obtained as to the priority 2, a set formed by the <segment 3>, the (keyword d) is obtained as to the priority 3, and, a set formed by the <segment 3>, the (keyword b) is obtained as to the priority 4.

Then, the respective priorities are converted into "levels" representing the degrees of the importance. As described above, when the "priority" is expressed by an integer number, an integer number allotted to the "priority" is used as it is as the <level>. Thus, in this example, the <segment> added with the priority N (N=1, 2, 3, 4, 5) is the segment of the level N.

Then, each of the segments is added with the "keyword" originally added to the corresponding priority. For example, the set of the segments of the level 1 has the <segment 1> and the <segment 1> is originally added with the keyword b, so that this segment is added with the keyword b. The set of the segments of the level 2 has the <segment 1> and the <segment 2>. In particular, since the <segment 2> added with the level 2 include the <segment 2> originally added with the keyword a and the <segment 2> originally added with the keyword c, another <segment 2> is newly prepared, and one of the two <segments 2> is added with the keyword a and the other of the <segments 2> is added with the keyword c. Similar processing is performed as to each of the <segment 1> of the level 2, the <segment 3> of the level 3 and the <segment 3> of the level 4.

Figure 86:
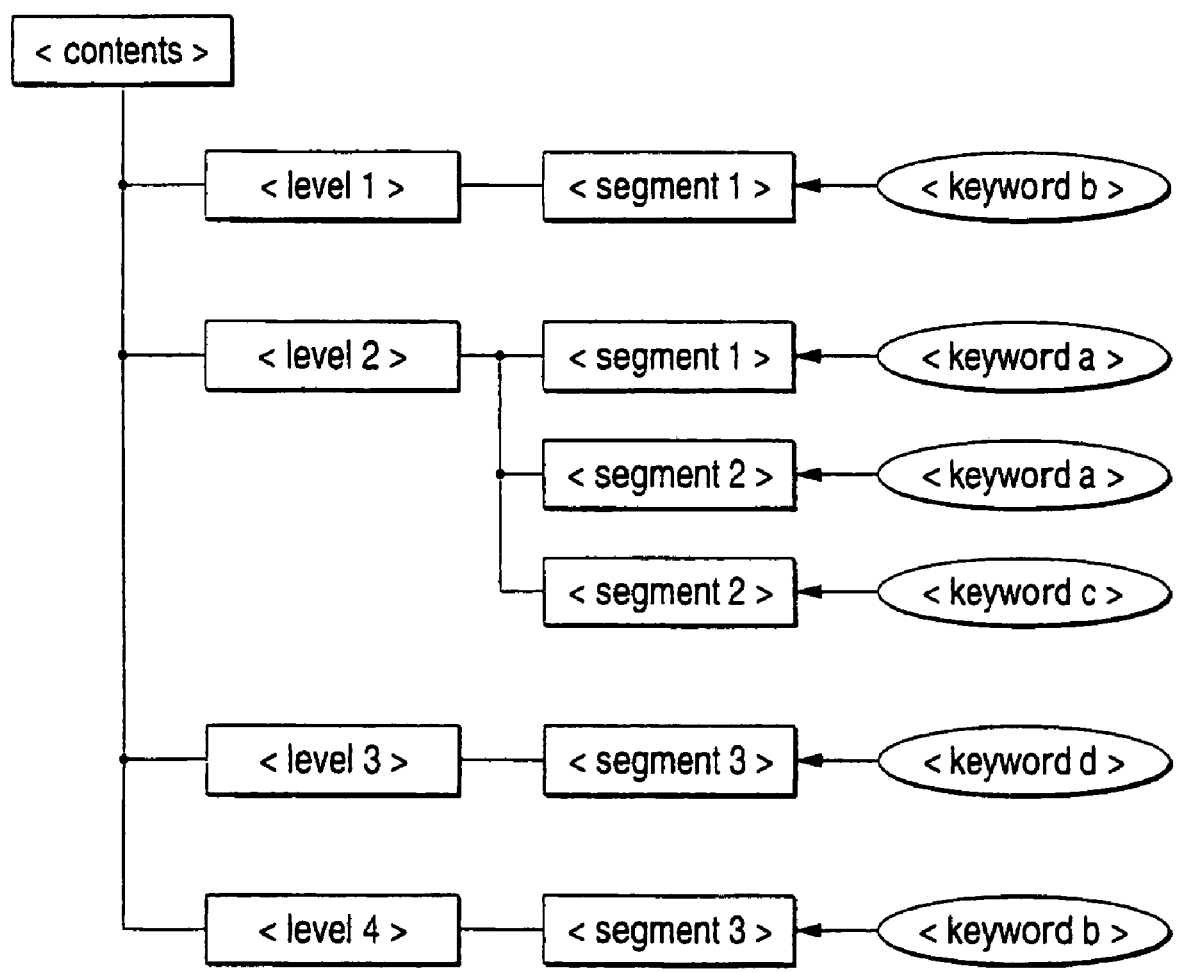
FIG. 86 is a diagram showing the data structure of the second context description data which is formed by converting the original context description data shown in FIG. 80 by the third embodiment of the context description data converting method.

The data structure of the second context description data thus prepared is shown in FIG. 86. In the case where the <segment> is added with a plurality of different keywords, the data structure may be arranged in a manner that the plurality of different keywords are added to the <segment> as shown in FIG. 85. Thus, in the second context description data shown in FIG. 86, the <segment 2> of the level 2 may be added with the priority a and the priority c. Further, in this figure, although the segments of the level 2 include the <segment 1> added with the priority a and the <segment 2> added with the priority a, these segments may be collected as a <segment A>, for example, when these segments are continuously connected with no gap of time.

The second context description data prepared by the first to third embodiments of the context description data converting method explained above is used in the processes of S5 to S9 in the flow chart of the selection step explained in the seventh embodiment. Although the selection step using the original context description data as shown in FIG. 29 has such flexibility of capable of coping with any request, the selection step using the second context description data is advantageous in that a corresponding <segment> can be obtained quickly in response to the request from a user.

Although in the aforesaid embodiments, the <section> or <segment> having a value equal to or larger than the threshold value is selected by using the threshold value of the degree of the importance, the <section> or <segment> having a particular vale of the degree of the importance may be selected.

Although in the previous embodiments context description data and structure description data have been described separately, they may be combined into a single data set, as shown in Program 09.

As has been described previously, according to the data processing method, the recording medium, and the program of the present invention, at least one segment is selected from a media content on the basis of a score appended to context description data by means of selection means (corresponding to the selection step), through use of context description data of hierarchical stratum. Particularly, only the data pertaining to a segment selected by the selection means (corresponding to the selection step) are extracted by means of the extraction means (corresponding to the extraction step). Alternatively, only the data pertaining to the segment selected by the selection means (corresponding to the selection step) are played back, by means of the playback means (corresponding to the playback step).

By means of the foregoing configuration, a more important scene can be freely selected from the media content, and the thus-selected important segment can be extracted or played back. Further, the context description data assume a hierarchical stratum comprising the highest hierarchical layer, the lowest hierarchical layer, and other hierarchical layers. Scenes can be selected in arbitrary units, such as on a per-chapter basis or a per-section basis. There may be employed various selection formats, such as selection of a certain chapter and deletion of unnecessary paragraphs from the chapter.

In the data processing method, the recording medium, and the program of the present invention, a score represents the degree of contextual importance of media content. So long as the score is set so as to select important scenes, a collection of important scenes of a program, for example, can be readily prepared. Further, so long as the score is set so as to represent the importance of a scene of interest from the viewpoint of keyword, segments can be selected with a high degree of freedom by determination of a keyword. For example, so long as a keyword is determined from a specific viewpoint, such as a character or an event, only the scenes desired by the user can be selected.

In the data processing method, the recording medium, and the program of the present invention, in a case where media content comprises a plurality of different media data sets within a single period of time, the determination means (corresponding to the determination step) determines which of the media data sets is to be taken as an object of selection, on the basis of determination conditions. The selection means (corresponding to the selection step) selects a media data set from only the data determined by the determination means (corresponding to the determination step). Since the determination means (corresponding to the determination step) can determine media data pertaining to an optimum segment according to determination conditions, the selection means (corresponding to the selection step) can select an appropriate amount of media data.

In the data processing method, the recording medium, and the program of the present invention, the determination means (corresponding to the determination step) determines whether only the video data, only the audio data, or both video and audio data are to be taken as an object of selection, on the basis of the determination conditions. As a result, the time required by the selection means (corresponding to the selection step) for selecting a segment can be shortened.

In the data processing method, the recording medium, and the program of the present invention, representative data are appended to the context description data as an attribute, and the determination means can determine media data of an optimum segment or representative data, according to determination conditions.

In the data processing method, the recording medium, and the program of the present invention, the determination means (corresponding to the determination step) determines whether only the entire data pertaining to a corresponding media segment, only the representative data, or both the entire data and representative data are to be taken as objects of selection, on the basis of the determination conditions. As a result, the determination means can shorten the time required by the selection means (corresponding to the selection step) for selecting a segment.

What is claimed:

1. A data processing method, using a data processing apparatus including a processor, for processing media content comprised of a plurality of scenes, said method comprising the steps of:

Inputting context description data into said data processing apparatus, said context description data including:
  a data structure portion including a plurality of segments each for describing one of said plurality of scenes of media content, and
  an attribute portion that is attribute information of the media contents, said attribute portion including:
    a context attribute having a value for describing a context of one of said segments, and
    a plurality of importance attributes each associated with one of said segments and having a value representing a degree of contextual importance of said corresponding one of said segments;
selecting, using said data processing apparatus, one or more of said plurality of segments based on at least one of said importance attributes; and
extracting, using said data processing apparatus, one or more scenes from said media content, wherein said extracted scenes are the scenes described by said one or more selected segments.

2. The method of claim 1, further comprising the step of forming a stream of media content from said extracted scenes.

3. The method of claim 2, further comprising the step of storing said stream of media content in a data recording medium.

4. The method of claim 1, wherein said context description data further includes link information showing linkage to at least one corresponding segment.

5. The method according to claim 4, wherein said context attributes and a plurality of importance attributes are associated with one segment by said link information.

6. The method of claim 1, wherein the segments are hierarchically described in the data structure portion.

7. A data processing method, using a data processing apparatus including a processor, for processing media content comprised of a plurality of scenes, said method comprising the steps of:
inputting context description data into said data processing apparatus, said context description data including:
  a data structure portion including a plurality of segments each for describing one of said plurality of scenes of media content, and
  an attribute portion that is attribute information of the media contents, said attribute portion including:
    a context attribute having a value for describing a context of one of said segments,
    a plurality of importance attributes each associated with one of said segments and having a value representing a degree of contextual importance of said corresponding one of said segments, and
    link information showing linkage to at least one corresponding segment, wherein
    said context attributes and a plurality of importance attributes are associated with one segment by said link information;
selecting, using said data processing apparatus, one or more of said plurality of segments based on at least one of said importance attributes; and
extracting, using said data processing apparatus, one or more scenes from said media content, wherein said extracted scenes are the scenes described by said one or more selected segments.

8. The method of claim 7, wherein the segments are hierarchically described in the data structure portion.

9. A data processing method, using a data processing apparatus including a processor, for processing media content comprised of a plurality of scenes, said method comprising the steps of:

inputting context description data into said data processing apparatus, for describing said plurality of scenes, said context description data including:

a hierarchically arranged data structure portion for describing the structure of said media content, said data structure portion including at least one section element and a plurality of segment elements as children of said at least one section element, each of said segment elements for describing a corresponding one of said plurality of scenes, and a hierarchically arranged attribute portion including:

a plurality of viewpoint elements each including at least one keyword for representing a particular viewpoint of said media content, one or more scores as a child for each of said plurality of viewpoints, each of said scores being an attribute associated with one or more of said segment elements for representing a degree of contextual importance of said parent viewpoint with respect to the scenes corresponding to said one or more segment elements, wherein portions of said attribute portion are linked to corresponding portions of said data structure portion;

selecting, using said data processing apparatus, one or more of said plurality of segment elements according to a desired one or more of said viewpoints based upon said scores; and extracting, using said data processing apparatus, one or more scenes from said media content, wherein said extracted scenes are the scenes described by said one or more selected segment elements.

10. The method of claim 9, further comprising the step of forming a stream of media content from said extracted scenes.

11. The method of claim 8, further comprising the step of storing said stream of media content in a data recording medium.

12. The method of claim 9, wherein said context description data further includes a plurality of additional segment elements, a plurality of additional viewpoints, and a plurality of additional scores.

13. The method of claim 12, wherein said segment elements are hierarchically arranged using a plurality of section elements each having one or more of said segment elements as children.

14. The method of claim 9, wherein said context description data is expressed in a language that is executable by a browser application.

15. The method of claim 9, wherein said viewpoint is associated with said segment element by linking said viewpoint to said score.

16. A data processing method, using a data processing apparatus including a processor, for performing the method comprising the steps of:

Inputting, into said data processing apparatus, previously generated context description data that describes a plurality of scenes of the media contents of one or more media files, said context description data including:

a plurality of segment elements each for describing one of said plurality of scenes, a plurality of viewpoints each being an attribute associated with one or more of said segment elements and each including at least one keyword for further describing the contents of the scenes described by the associated one or more of said segment elements, and a plurality of scores, each being an attribute associated with one of said segment elements representing a degree of contextual importance of one of said viewpoints that is associated with said one of said segment elements with respect to the scene described by said one of said segment elements;

selecting, using said data processing apparatus, one or more of said segment elements based on an analysis of said viewpoints and/or said scores; and extracting, using said data processing apparatus, one or more scenes from said media content, wherein said extracted scenes are the scenes described by said one or more selected segment elements.

17. The method of claim 16, further comprising the step of forming a stream of media content from said extracted scenes.

18. The method of claim 17, further comprising the step of storing said stream of media content in a data recording medium.

19. The method of claim 16, wherein said context description data further includes a plurality of section elements each having either a remaining one or more of said plurality of section elements as children, or having one or more of said plurality of segment elements as children, but not both.

20. The method of claim 19, wherein each one of said section elements is associated with one or more of said scenes.

* * * * *